(12) United States Patent
Choki et al.

(10) Patent No.: US 8,200,058 B2
(45) Date of Patent: Jun. 12, 2012

(54) LIGHT GUIDE AND LIGHT GUIDE STRUCTURE

(75) Inventors: Koji Choki, Kawasaki (JP); Tetsuya Mori, Kawasaki (JP); Keizo Takahama, Chigasaki (JP); Makoto Fujiwara, Yokohama (JP); Kei Watanabe, Kawasaki (JP); Hiroshi Owari, Yokohama (JP)

(73) Assignee: Sumitomo Bakelite Company, Ltd., Tokyo (JP)

( * ) Notice: Subject to any disclaimer, the term of this patent is extended or adjusted under 35 U.S.C. 154(b) by 484 days.

(21) Appl. No.: 12/447,355
(22) PCT Filed: Nov. 16, 2006
(86) PCT No.: PCT/JP2006/322895
§ 371 (c)(1), (2), (4) Date: Apr. 27, 2009
(87) PCT Pub. No.: WO2008/059577
PCT Pub. Date: May 22, 2008

(65) Prior Publication Data
US 2010/0067861 A1    Mar. 18, 2010

(51) Int. Cl.
G02B 6/10 (2006.01)
G02B 6/00 (2006.01)
(52) U.S. Cl. .................. 385/131; 385/145
(58) Field of Classification Search .......... 385/145, 385/131
See application file for complete search history.

(56) References Cited

U.S. PATENT DOCUMENTS
5,292,620 A    3/1994    Booth et al.
(Continued)

FOREIGN PATENT DOCUMENTS
JP    4-9807    1/1992
(Continued)

OTHER PUBLICATIONS

Supplementary European Search Report for Application No. EP 06 83 2775 dated Jul. 30, 2010.
(Continued)

Primary Examiner — Omar Rojas
(74) Attorney, Agent, or Firm — Smith, Gambrell & Russell, LLP

(57) ABSTRACT

An optical waveguide structure has excellent heat resistance and a low water absorbing property and can be manufactured with a low material cost. Such an optical waveguide structure includes: an optical waveguide having two surfaces, a core layer including core portions and cladding portions each having a refractive index lower than that of each of the core portions, the core layer having two surfaces, and cladding layers provided so as to make contact with the two surfaces of the core layer and having a refractive index lower than that of each of the core portions; and conductor layers provided on the two surfaces of the optical waveguide. In the optical waveguide structure, each of the cladding layers is formed of a norbornene-based polymer as a major component thereof. Further, it is preferred that the norbornene-based polymer is composed of molecules each represented by the following formula 1 as a major component thereof:

[formula 1]

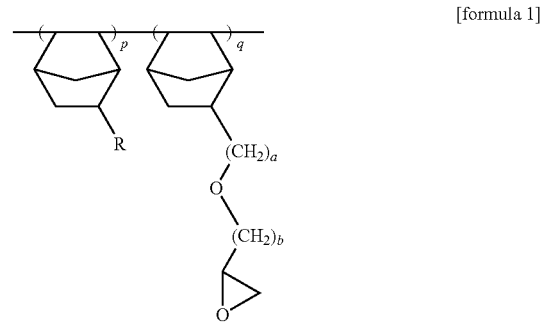

wherein R is an alkyl group having a carbon number of 1 to 10, "a" is an integer of 0 to 3, "b" is an integer of 1 to 3, and "p"/"q" is 20 or less.

60 Claims, 9 Drawing Sheets

U.S. PATENT DOCUMENTS

| | | | |
|---|---|---|---|
| 6,538,087 B2 * | 3/2003 | Zhao et al. | 526/280 |
| 6,677,175 B2 * | 1/2004 | Zhao et al. | 438/31 |

FOREIGN PATENT DOCUMENTS

| | | |
|---|---|---|
| JP | 9-258051 | 10/1997 |
| JP | 10-158337 | 6/1998 |
| JP | 10-251343 | 9/1998 |
| JP | 2002-173532 | 6/2002 |
| JP | 2004-35838 | 2/2004 |
| JP | 2004-505308 | 2/2004 |
| JP | 2004-157305 | 6/2004 |
| JP | 2004-277726 | 10/2004 |
| JP | 2005-70556 | 3/2005 |
| JP | 2005-164650 | 6/2005 |
| JP | 2006-126824 | 5/2006 |
| WO | 91/01505 | 2/1991 |
| WO | 2005/012966 | 2/2005 |
| WO | 2005/042147 | 5/2005 |
| WO | 2005/052641 A2 | 6/2005 |
| WO | 2005/052641 A3 | 6/2005 |

OTHER PUBLICATIONS

International Search Report, mailed Jan. 30, 2007 for International application No. PCT/JP2006/322895.

Fujiwara et al., New Opto/Electro Printed Circuit Board with Polynorbornene Optical Waveguide, 2006 (Heisei 18) Shuki Dai 67 Kai Extended abstracts, the Japan Society of Applied Physics, separate vol. 3, Aug. 28, 2006.

* cited by examiner

LIGHT GUIDE AND LIGHT GUIDE STRUCTURE

TECHNICAL FIELD

The present invention relates to a light guide (hereinafter, referred to as "optical waveguide") and a light guide structure (hereinafter, referred to as "optical waveguide structure").

BACKGROUND ART

Recently, optical communications in which data is transferred using optical frequency carrier waves are becoming increasingly important. In such optical communications, an optical waveguide is used as one means for conducting or guiding the optical frequency carrier waves from one point to another point.

For example, the optical waveguide includes a pair of cladding layers and a core layer provided between the cladding layers. The core layer includes core portions and cladding portions each having a linear shape. In the core layer, the core portions and the cladding portions are provided alternately. Each of the core portions is formed of a substantially transparent material for light to be used as the optical frequency carrier waves, and each of the cladding layers and the cladding portions is formed of a material having a refractive index lower than that of each of the core portions.

Such an optical waveguide has a structure in which each of the core portions is surrounded by the cladding portions and the cladding layers each having the refractive index lower than that of each of the core portions. Therefore, light input into an end of each of the core portions is transferred along an axis thereof while reflecting on boundaries between the core portions and the cladding portions and cladding layers.

Examples of a constitute material of the optical waveguide include a polymer and the like, as well as a glass which is conventionally used widely. Since the polymer is suitable for micromachining, it has an advantage for densification of a circuit substrate into which an optical waveguide is incorporated. Therefore, the polymer is promised as a material for manufacturing the optical waveguide.

As the material for manufacturing the optical waveguide, polymethyl methacrylate (see, e.g., Japanese Patent Application Laid-open No. H09-258051), epoxy resin (see, e.g., Japanese Patent Application Laid-open No. 2005-070556), fluorinated polyimide (see, e.g., Japanese Patent Application Laid-open No. H04-9807), polybenzoxazole (see, e.g., Japanese Patent Application Laid-open No. 2002-173532), cellulose acetate butyrate/acrylic monomer (see, e.g., U.S. Pat. No. 5,292,620) and the like are used.

However, each of the above polymers has the following problems. First, each of the polymethyl methacrylate and the epoxy resin has a heat resistant temperature of 200° C. or lower. Therefore, when an optical waveguide formed of these polymers is mounted on a circuit substrate, there is a fear that the optical waveguide is softened by a heat treatment such as a solder treatment or the like.

Further, the fluorinated polyimide is a polymer having a high heat resistant property, high transparency, a low water absorbing property by being fluorinated. However, since a fluorination step is included in a synthesis step of the fluorinated polyimide, a cost for synthesizing it is increased. Therefore, the fluorinated polyimide has a problem in its practicality.

In addition, a polymer to be synthesized through a polycondensation step such as the polyimide, the polybenzoxazole or the like needs to be subjected to a curing treatment having a high temperature (e.g., 250° C. or higher), in order to generate imide rings or benzoxazole rings in the polycondensation step. Therefore, there is a problem in that it has low workability.

Furthermore, since the cellulose acetate butyrate/acrylic monomer has a very low heat resistant temperature of 100° C. or lower, it is softened by a heat treatment such as a solder treatment or the like. Further, since the cellulose acetate butyrate has a large number of hydroxyl groups, it has a high water absorbing property. In the case where an optical waveguide formed of such a polymer is left under a high humidity environment, a dimensional change thereof occurs due to water absorption of the cellulose acetate butyrate.

DISCLOSURE OF THE INVENTION

It is therefore an object of the present invention to provide an optical waveguide and an optical waveguide structure, each of which has excellent heat resistance and a low water absorbing property and can be manufactured with a low material cost.

In order to achieve the object described above, the present invention is directed to an optical waveguide. The optical waveguide comprises a core layer including core portions each having a refractive index, and cladding portions each provided adjacent to the core portions and having a refractive index lower than that of each of the core portions, the core layer having two surfaces, and a cladding layer provided so as to make contact with at least one of the two surfaces of the core layer and having a refractive index lower than that of each of the core portions, the cladding layer formed of a norbornene-based polymer as a major component thereof.

This makes it possible to obtain an optical waveguide which has excellent heat resistance and a low water absorbing property and can be manufactured with a low material cost.

In the above optical waveguide, it is preferred that the norbornene-based polymer is an addition-type norbornene-based polymer.

In the above optical waveguide, it is preferred that the norbornene-based polymer is composed of molecules each including alkyl norbornene repeating units.

In the above optical waveguide, it is preferred that the norbornene-based polymer is composed of molecules each including alkyl norbornene repeating units, each of the alkyl norbornene repeating units having a substituent group including a polymerizable group.

In the above optical waveguide, it is preferred that the norbornene-based polymer is composed of molecules each represented by the following formula 1 as a major component thereof:

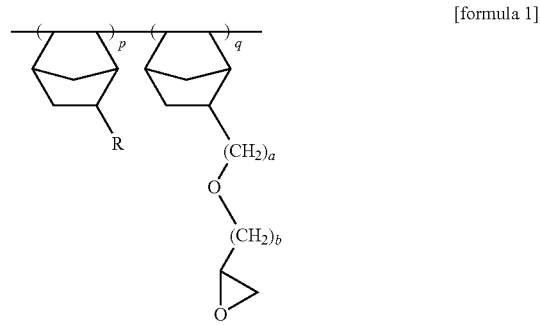

[formula 1]

wherein R is an alkyl group having a carbon number of 1 to 10, "a" is an integer of 0 to 3, "b" is an integer of 1 to 3, and "p"/"q" is 20 or less.

In the above optical waveguide, it is preferred that at least a part of the molecules of the norbornene-based polymer are cross-linked via the polymerizable groups (the epoxy groups).

In the above optical waveguide, it is preferred that an average thickness of the cladding layer is 0.1 to 1.5 times an average thickness of the core layer.

In the above optical waveguide, it is preferred that the core layer is formed through the steps: forming a layer containing a polymer having a refractive index, a monomer having compatibility with the polymer and a refractive index different from that of the polymer, a first substance that is activated by being irradiated with actinic radiation, a second substance that is activated by heating and can react molecules of the monomer due to activation thereof, wherein activation temperature of the second substance is changed under action of the activated first substance; irradiating selectively the actinic radiation onto the layer, so that the first substance is activated within irradiated regions of the layer onto which the actinic radiation is irradiated, to thereby change the activation temperature of the second substance under the action of the activated first substance within the irradiated regions; and subjecting the layer to a heat treatment at such a temperature that any one having a low activation temperature between the second substance and the second substance whose activation temperature is changed is activated, so that the molecules of the monomer are reacted within either the irradiated regions or non-irradiated regions onto which the actinic radiation is not irradiated, to thereby cause a refractive index difference therebetween due to reaction of the molecules of the monomer, whereby one of the irradiated regions and the non-irradiated regions becomes the core portions and the other regions become the cladding portions.

In the above optical waveguide, it is preferred that when the reaction of the molecules of the monomer progresses within one of the irradiated regions and the non-irradiated regions, the molecules of the monomer which are contained in the other regions and have not been reacted are diffused to the one regions.

In the above optical waveguide, it is preferred that the first substance contains compounds that produce cations and weakly coordinating anions by being irradiated with the actinic radiation, and the activation temperature of the second substance is changed under action of the weakly coordinating anions produced.

In the above optical waveguide, it is preferred that the activation temperature of the second substance is lowered under the action of the activated first substance, and the second substance is activated by heating at a temperature higher than that of the heat treatment without irradiating the actinic radiation.

In the above optical waveguide, it is preferred that the second substance contains compounds each represented by the following formula (Ia):

$$(E(R)_3)_2Pd(Q)_2 \tag{Ia}$$

wherein $E(R)_3$ is a Group 15 neutral electron donor ligand, E is an element selected from the group comprising elements of Group 15 of the Periodic Table, R is one of a hydrogen atom, an isotope thereof and a hydrocarbyl group-containing moiety, and Q is an anionic ligand selected from the group comprising carboxylate, thiocarboxylate and dithiocarboxylate.

In the above optical waveguide, it is preferred that the second substance contains compounds each represented by the following formula (Ib):

$$[(E(R)_3)_aPd(Q)(LB)_b]_p[WCA]_r \tag{Ib}$$

wherein $E(R)_3$ is a Group 15 neutral electron donor ligand, E is an element selected from the group comprising elements of Group 15 of the Periodic Table, R is one of a hydrogen atom, an isotope thereof and a hydrocarbyl group-containing moiety, Q is an anionic ligand selected from the group comprising carboxylate, thiocarboxylate and dithiocarboxylate, LB is a Lewis base, WCA is a weakly coordinating anion, "a" is an integer of 1 to 3, "b" is an integer of 0 to 2, a total number of "a" and "b" is 1 to 3, and "p" and "r" are integers for maintaining balance between an electronic charge of a palladium cation and an electronic charge of the weakly coordinating anion.

In the above optical waveguide, it is preferred that each of "p" and "r" is independently selected from an integer of 1 or 2.

In the above optical waveguide, it is preferred that the core layer is obtained by subjecting the layer to a heat treatment at a second temperature higher than that of the heat treatment after the heat treatment is carried out.

In the above optical waveguide, it is preferred that the core layer is obtained by subjecting the layer to a heat treatment at a third temperature higher than the second temperature after the heat treatment is carried out at the second temperature.

In the above optical waveguide, it is preferred that a difference between the second temperature and the third temperature is 20° C. or higher.

In the above optical waveguide, it is preferred that the monomer contains a cross-linkable monomer.

In the above optical waveguide, it is preferred that the monomer contains a norbornene-based monomer as a major component thereof.

In the above optical waveguide, it is preferred that the monomer contains a norbornene-based monomer as a major component thereof, and further contains dimethyl bis(norbornene methoxy)silane as the cross-linkable monomer.

In the above optical waveguide, it is preferred that the polymer is composed of molecules each including a main chain and cleavable groups each branching from the main chain and having a chemical structure in which at least a part of the chemical structure can be cleaved and removed from the main chain under the action of the activated first substance, and when the actinic radiation is selectively irradiated onto the irradiated regions of the layer, the cleavable groups of the molecules of the polymer are cleaved therewithin.

In the above optical waveguide, it is preferred that the first substance contains compounds that produce cations and weakly coordinating anions by being irradiated with the actinic radiation, and the cleavable groups are acid cleavable groups that can be cleaved under action of the cations.

In the above optical waveguide, it is preferred that the core layer is formed through the following steps: forming a layer containing a substance that is activated by being irradiated with actinic radiation, a polymer composed of molecules each including a main chain and cleavable groups each branching from the main chain and having a chemical structure in which at least a part of the chemical structure can be cleaved and removed from the main chain under action of the activated substance; and irradiating selectively the actinic radiation onto the layer, so that the substance is activated within irradiated regions of the layer onto which the actinic radiation is irradiated and the cleavable groups of the molecules of the polymer are cleaved under the action of the activated substance therewithin, to thereby cause a refractive index difference between the irradiated regions and non-irradiated regions onto which the actinic radiation is not irradiated due to cleavage of the cleavable groups of the molecules of the polymer, whereby one of the irradiated regions and the non-irradiated regions becomes the core portions and the other regions become the cladding portions.

In the above optical waveguide, it is preferred that the core layer is obtained by subjecting the layer to a heat treatment after the actinic radiation is irradiated thereonto.

In the above optical waveguide, it is preferred that the substance contains compounds that produce cations and weakly coordinating anions by being irradiated with the actinic radiation, and the cleavable groups are acid cleavable groups that can be cleaved under action of the cations.

In the above optical waveguide, it is preferred that each of the acid cleavable groups includes at least one of a chemical structure of —O—, a chemical structure of —Si-aryl and a chemical structure of —O—Si—.

In the above optical waveguide, it is preferred that the refractive index of the polymer is lowered due to cleavage of the cleavable groups of the molecules thereof.

In the above optical waveguide, it is preferred that each of the cleavable groups includes at least one of a chemical structure of —Si-diphenyl and a chemical structure of —O—Si-diphenyl.

In the above optical waveguide, it is preferred that the actinic radiation has a peak wavelength in the range of 200 to 450 nm.

In the above optical waveguide, it is preferred that an exposure dose of the actinic radiation is in the range of 0.1 to 9 $J/cm^2$.

In the above optical waveguide, it is preferred that the actinic radiation is irradiated onto the layer through a mask.

In the above optical waveguide, it is preferred that the layer further contains an anti-oxidizing agent.

In the above optical waveguide, it is preferred that the layer further contains a sensitizing agent.

In the above optical waveguide, it is preferred that the polymer contains a norbornene-based polymer as a major component thereof.

In the above optical waveguide, it is preferred that the norbornene-based polymer is an addition-type norbornene-based polymer.

In the above optical waveguide, it is preferred that each of the core portions is formed of a first norbornene-based material having a refractive index as a major component thereof, and each of the cladding portions is formed of a second norbornene-based material having a refractive index lower than that of the first norbornene-based material as a major component thereof.

In the above optical waveguide, it is preferred that the first and second norbornene-based materials contain an identical norbornene-based polymer having a refractive index and a reaction product of molecules of a norbornene-based monomer having a refractive index different from that of the norbornene-based polymer, and the refractive indexes of the first and second norbornene-based materials are different from each other due to a difference between amounts of the reaction products of the molecules of the norbornene-based monomer contained therein.

In the above optical waveguide, it is preferred that the reaction product contains at least one kind selected from the group comprising polymeric molecules each polymerizing the molecules of the norbornene-based monomer, cross-linking chemical structures each cross-linking molecules of the norbornene-based polymer, and branching chemical structures each branching from the molecules of the norbornene-based polymer.

In the above optical waveguide, it is preferred that the norbornene-based polymer is composed of molecules each including aralkyl norbornene repeating units.

In the above optical waveguide, it is preferred that the norbornene-based polymer is composed of molecules each including benzyl norbornene repeating units.

In the above optical waveguide, it is preferred that the norbornene-based polymer is composed of molecules each including phenyl ethyl norbornene repeating units.

In the above optical waveguide, it is preferred that the norbornene-based polymer is composed of molecules each including a main chain and cleavable groups each branching from the main chain and having a chemical structure in which at least a part of the chemical structure can be cleaved and removed from the main chain, and the refractive indexes of the first and second norbornene-based materials are different from each other due to a difference between the numbers of the cleavable groups, that have not been cleaved, in the molecules of the norbornene-based polymers contained therein and a difference between the amounts of the reaction products of the molecules of the norbornene-based monomers contained therein.

In the above optical waveguide, it is preferred that the core layer is formed of a norbornene-based polymer as a major component thereof, and the norbornene-based polymer is composed of molecules each including a main chain and cleavable groups each branching from the main chain and having a chemical structure in which at least a part of the chemical structure can be cleaved and removed from the main chain, and the refractive indexes of the first and second norbornene-based materials are different from each other due to a difference between the numbers of the cleavable groups, that have not been cleaved, in the molecules of the norbornene-based polymers contained therein.

In the above optical waveguide, it is preferred that the norbornene-based polymer is composed of molecules each including diphenyl methyl norbornene repeating units.

In the above optical waveguide, it is preferred that the norbornene-based polymer is composed of molecules each including alkyl norbornene repeating units.

In the above optical waveguide, it is preferred that the norbornene-based polymer is composed of molecules each including hexyl norbornene repeating units.

In the above optical waveguide, it is preferred that the norbornene-based polymer is an addition-type norbornene-based polymer.

Further, in order to achieve the object described above, the present invention is directed to an optical waveguide structure. The optical waveguide structure comprises the above optical waveguide having two surfaces, and a conductor layer provided on a side of at least one of the two surfaces of the optical waveguide.

This makes it possible to obtain an optical waveguide structure which has excellent heat resistance and a low water absorbing property and can be manufactured with a low material cost.

In the above optical waveguide structure, it is preferred that a ratio of an average thickness of the conductor layer with respect to an average thickness of the optical waveguide is in the range of 10 to 90%.

In the above optical waveguide structure, it is preferred that the conductor layer is formed using at least one method selected from the group comprising a dry plating method, a wet plating method and a method of bonding a conductive sheet member to the at least one of the two surfaces.

BEST MODE FOR CARRYING OUT THE INVENTION

Hereinafter, an optical waveguide and optical waveguide structure according to preferred embodiments of the present invention will be described with reference to the accompanying drawings.

Figure 1:
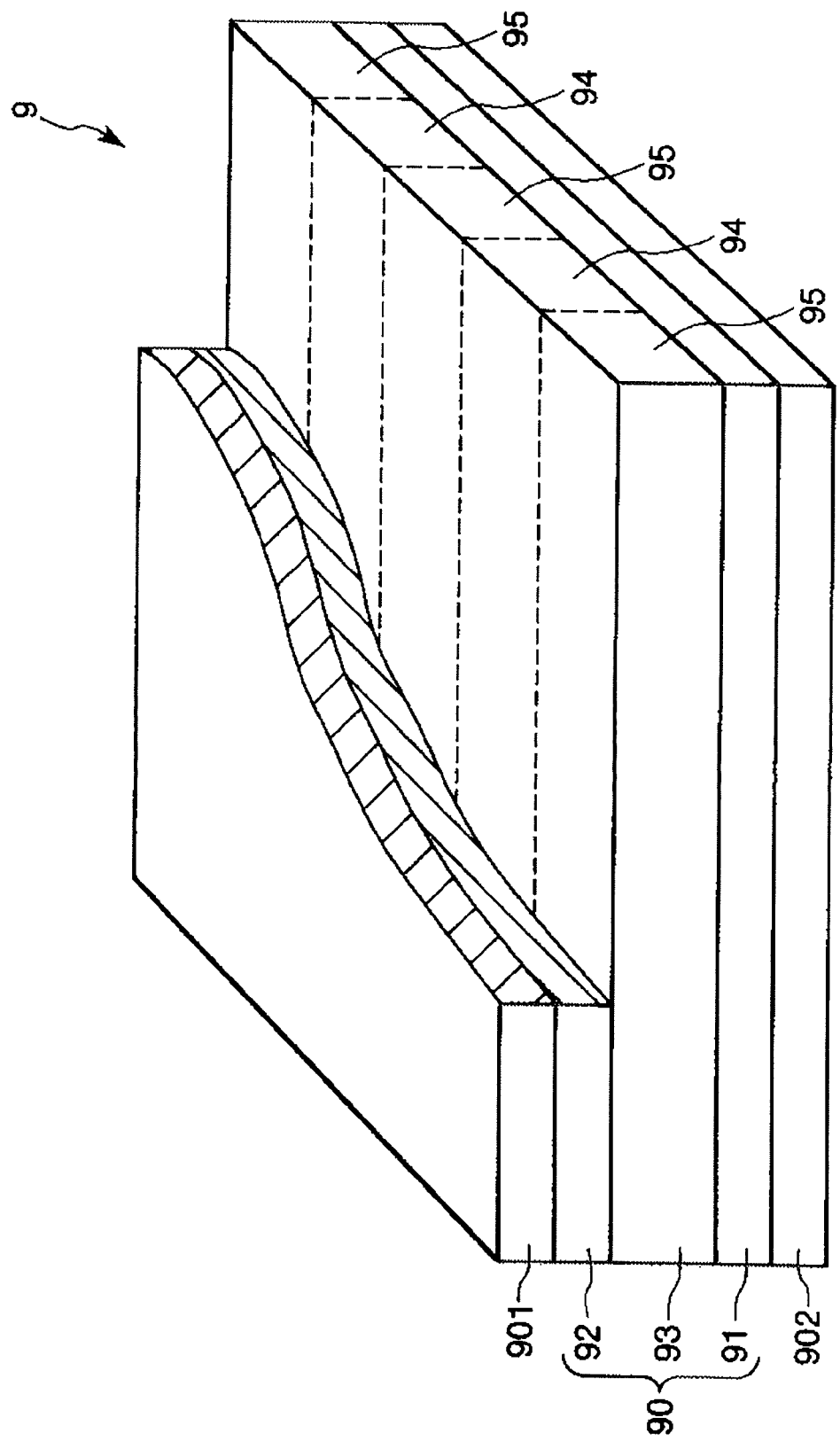
FIG. 1 is a perspective view showing one example of an optical waveguide structure of the present invention (a part thereof is lacked).

FIG. 1 is a perspective view showing one example of the optical waveguide structure of the present invention (a part thereof is lacked).

In the following description, an upper side in FIG. 1 will be referred to as "upper" or "upside" and a lower side in FIG. 1 will be referred to as "lower" or "downside" (it is same in the following FIGs).

Further, the respective FIGs. are drawn with exaggeration in a thickness direction (a vertical direction) thereof.

An optical waveguide structure 9 shown in FIG. 1 includes an optical waveguide 90 having an upper surface and a lower surface, a conductor layer 901 bonded to the upper surface of the optical waveguide 90, and a conductor layer 902 bonded to the lower surface of the optical waveguide 90.

Examples of a constitute material of each of the conductor layers 901 and 902 include various kinds of metal materials such as copper, copper-based alloy, aluminum and aluminum-based alloy, various kinds of ceramics materials such as indium tin oxide (ITO) and indium tin oxide containing fluorine (FTO), and the like.

A ratio of an average thickness of each of the conductor layers 901 and 902 with respect to an average thickness of the optical waveguide 90 is preferably in the range of about 10 to 90%, and more preferably in the range of about 20 to 80%. Specifically, the average thickness of each of the conductor layers 901 and 902 is not particularly limited to a specific value, but, in general, is preferably in the range of about 3 to 100 μm, and more preferably in the range of about 5 to 70 μm. This makes it possible to improve conductivity of each of the conductor layers 901 and 902 while preventing flexibility of the optical waveguide structure 9 from being lowered.

In a structure of FIG. 1, each of the conductor layers 901 and 902 has a plate shape (a sheet shape). In this case, after each of the conductor layers 901 and 902 is processed so as to have a predetermined pattern, optical elements such as a light emitting element, a light receiving element and the like are mounted at predetermined portions of the optical waveguide structure 9 to thereby manufacture a hybrid device including an optical circuit and an electrical circuit.

In this regard, it is to be noted that each of the conductor layers 901 and 902 may have been patterned in advance to form a wiring. Further, if needed, one of the conductor layers 901 and 902 may be omitted.

Furthermore, between the conductor layer 901 and the optical waveguide 90 and/or between the conductor layer 902 and the optical waveguide 90, one layer or two or more layers with an arbitrary purpose (e.g., a purpose for improving adhesion therebetween) may be provided.

The optical waveguide 90 includes a cladding layer (a lower cladding layer) 91, a core layer 93 and a cladding layer (an upper cladding layer) 92 which are laminated together in this order from the lower side of FIG. 1. In the core layer 93, core portions 94 each having a predetermined pattern and cladding portions 95 each provided adjacent to the core portions (waveguide channels) 94 are formed.

A difference (a refractive index difference) between a refractive index of each of the core portions 94 and a refractive index of each of the cladding portions 95 in not particularly limited to a specific value, but is preferably in the range of about 0.3 to 5.5%, and especially preferably in the range of about 0.8 to 2.2%. If the refractive index difference is smaller than the lower limit value, there is a case that an optical transfer efficiency of each of the core portions 94 is lowered. On the other hand, even if the refractive index difference exceeds the upper limit value, it cannot be expected that the optical transfer efficiency of each of the core portions 94 is further improved.

In this regard, it is to be noted that in the case where the refractive index of each of the core portions 94 is defined as "A" and the refractive index of each of the cladding portions 95 is defined as "B", the refractive index difference can be presented by the following formula:

$$\text{Refractive index difference (\%)} = |A/B - 1| \times 100.$$

Further, in the structure shown in FIG. 1, each of the core portions 94 is formed so as to have a linear shape in a planar view thereof. However, each of the core portions 94 may have an arbitrary shape such a shape provided with curved portions in a middle thereof or a shape provided with forked portions in a middle thereof. In this regard, it is to be noted that by using a manufacturing method of the optical waveguide structure 9, it is possible to easily form core portions 94 each having a complex and arbitrary shape with high dimensional accuracy.

Further, across-sectional shape of each of the core portions 94 is a quadrangular shape such a square shape or a rectangular shape.

Each of a width and a height of each of the core portions 94 is not particularly limited to a specific value, but is preferably in the range of about 1 to 200 μm, more preferably in the range of about 5 to 100 μm, and even more preferably in the range of about 10 to 60 μm.

Each of the core portions 94 is formed of a material having a refractive index higher than that of a constituent material of each of the cladding portions 95. Further, each of the core portions 94 is formed of a material having a refractive index higher than that of a constituent material of each of the cladding layers 91 and 92.

The cladding layer 91 constitutes a cladding portion located on a lower side of each of the core portions 94, and the cladding layer 92 constitutes a cladding portion located on an upper side of each of the core portions 94. In such a structure, each of the core portions 94 serves as a light guiding path which is surrounded by the cladding portions.

An average thickness of each of the cladding layers 91 and 92 is preferably in the range of about 0.1 to 1.5 times an average thickness of the core layer 93, and more preferably in the range of about 0.3 to 1.25 times the average thickness of the core layer 93. Specifically, the average thickness of each of the cladding layers 91 and 92 is not particularly limited to a specific value, but, in general, is preferably in the range of about 1 to 200 μm, more preferably in the range of about 5 to 100 μm, and even more preferably in the range of about 10 to 60 μm. Each of the cladding layers 91 and 92 can appropriately exhibit a function as a cladding layer while preventing a size (a thickness) of the optical waveguide 90 from becoming unnecessarily large (thick).

In this regard, it is to be noted that the constituent materials of the cladding layer 91, the cladding portions 95 and the cladding layer 92 may be the same (the same kind) or different from each other. However, it is preferred that these materials have the same or similar refractive index. The constituent materials of the cladding layers 91 and 92 and the core layer 93 will be described in detail below.

The optical waveguide structure 9 of the present invention is preferably used in a data communication utilizing light having a wavelength within a predetermined region. The wavelength to be utilized in the data communication is not particularly limited to a specific value, but is preferably in the range of 600 to 1,550 nm, although being slightly different depending on an optical property of the constituent material of each of the core portions 94 and the like.

Next, one example of a manufacturing method of the optical waveguide structure 9 will be described.

<First Manufacturing Method>

First, a first manufacturing method of the optical waveguide structure 9 will be described.

FIGS. 2 to 7 are sectional views schematically showing one process example of the first manufacturing method of the optical waveguide structure of the present invention, respectively.

Figure 2:
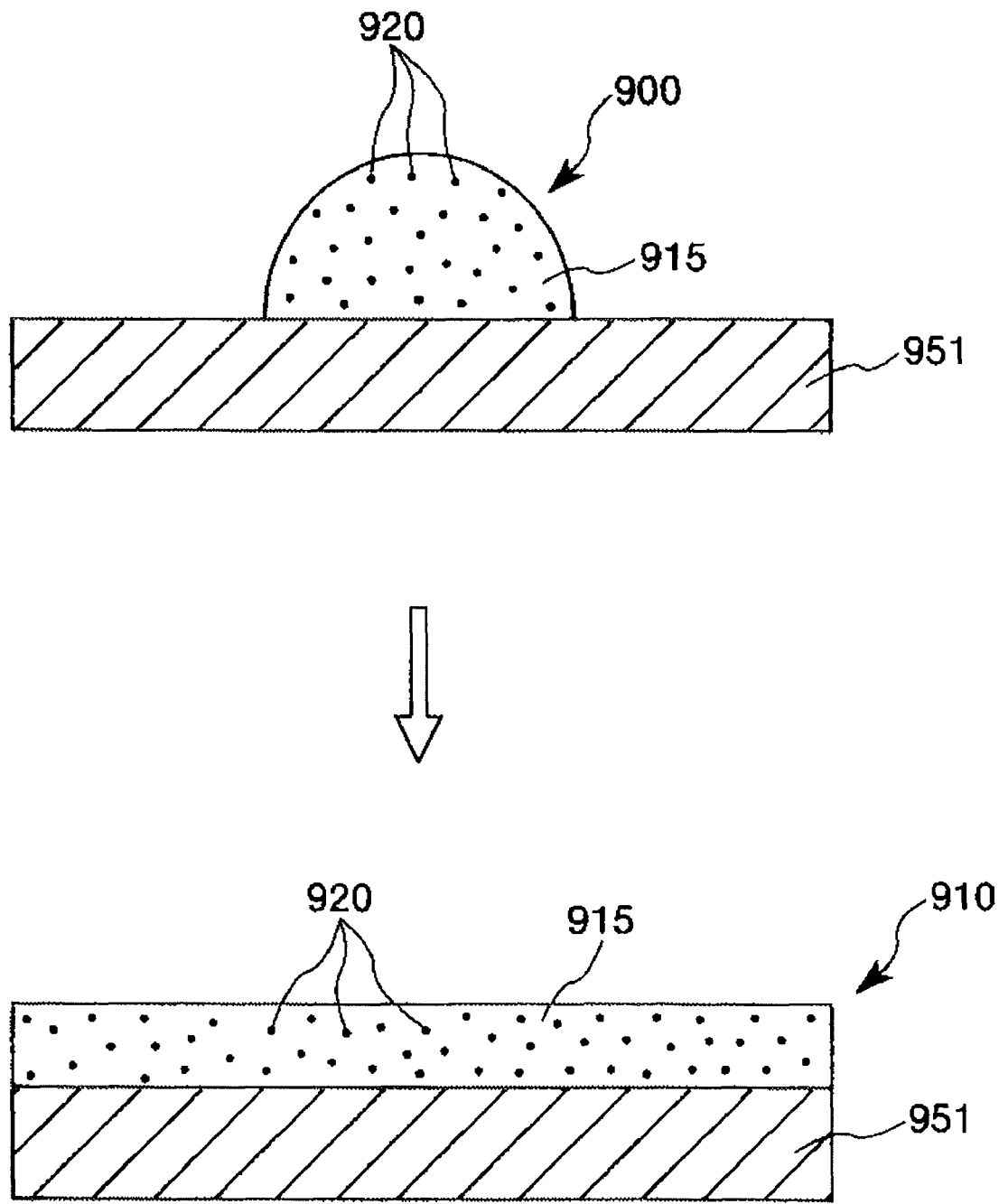
FIG. 2 is a sectional view schematically showing one process example of a first manufacturing method of the optical waveguide structure of the present invention.

[1A] First, a layer 910 is formed on a supporting substrate 951 (see FIG. 2).

The layer 910 can be formed by applying a core layer forming material (a varnish) 900 onto the supporting substrate 951, and then curing (hardening) the same.

Specifically, the layer 910 can be formed by applying the core layer forming material 900 onto the supporting substrate 951 to form a liquid coating thereon, and then placing the supporting substrate 951 on which the liquid coating has been formed on a level table under a ventilatory state to thereby evaporate (desolvate) a solvent contained in the liquid coating therefrom while leveling uneven portions existing on a surface thereof.

In the case where the layer 910 is formed using an application method, examples of the application method include a doctor blade method, a spin coating method, a dipping method, a table coating method, a spraying method, an applicator method, a curtain coating method, a die coating method and the like. However, the application method is not limited thereto.

As the supporting substrate 951, a silicon substrate, a silicon dioxide substrate, a glass substrate, a quartz substrate, a polyethylene terephthalate (PET) film and the like can be used.

The core layer forming material 900 is a material containing a photo-induced thermally developable material (hereinafter, referred to as "PITDM" on occasion) formed of a polymer 915 and an additive 920 (including at least a monomer, a cocatalyst and a procatalyst, in this embodiment). When the material is irradiated by actinic radiation and heating, reaction of molecules of the monomer occur in the polymer 915.

In the obtained layer 910, molecules of the polymer (a matrix) 915 are substantially uniformly distributed in a random order, and in the polymer 915, molecules (or compounds) of the additive 920 are substantially uniformly dispersed in a random order. As a result, in the layer 910, the molecules of the additive 920 are substantially uniformly dispersed in a random order.

Since an average thickness of such a layer 910 is appropriately set depending on a thickness of the core layer 93 to be formed, it is not particularly limited to a specific value, but is preferably in the range of about 5 to 200 μm, more preferably in the range of about 10 to 100 μm, and even more preferably in the range of about 15 to 65 μm.

It is preferable to use a polymer 915 having sufficiently high transparency (being transparent and colorless) and compatibility with the monomer which will be described below. In addition, it is also preferable to use a polymer 915 in which the molecules of the monomer can be reacted (polymerized or cross-linked) as described below, the polymer 915 that can maintain the sufficiently high transparency even after the molecules of the monomer are reacted.

Here, the expression "having compatibility" means that the monomer can be at least blended with the polymer 915 so as to cause no phase separation between the monomer and the polymer 915 in the core layer forming material 900 and the layer 910.

Examples of such a polymer 915 include cyclic olefin-based resin such as norbornene-based resin and benzo cyclobutene-based resin, acryl-based resin, methacryl-based resin, polycarbonate, polystyrene, epoxy resin, polyamide, polyimide, polybenzoxazole and the like, and one or more of which may be used independently or in combination (e,g., a polymer alloy, a polymer blended body (a mixture), a copolymer or the like).

Among them, it is especially preferred that the polymer 915 contains the norbornene-based resin (a norbornene-based polymer) as a major component thereof. By using the polymer 915 containing the norbornene-based polymer as the major component thereof, it is possible to obtain a core layer 93 having an excellent optical transmission property and superior heat resistance.

Further, since the norbornene-based polymer has a high hydrophobic property, it is possible to obtain a core layer 93 whose dimensional change hardly occurs due to water absorption thereof.

The norbornene-based polymer may be either a homopolymer composed of molecules including single repeating units or a copolymer composed of molecules including two or more kinds of repeating units.

Examples of such a norbornene-based polymer include addition-type polymers such as (1) an addition-type (co)polymer composed of molecules each obtained by addition (co) polymerization reaction between molecules of a norbornene-based monomer, (2) an addition-type copolymer composed of molecules each obtained by addition copolymerization reaction between the molecules of the norbornene-based monomer and molecules of ethylene or α-olefin, and (3) an addition-type copolymer composed of molecules each obtained by addition copolymerization reaction between the molecules of the norbornene-based monomer, molecules of non-conjugated diene, and, if needed, molecules of another monomer; and ring opening-type polymers such as (4) a ring opening-type norbornene-based (co)polymer or a (co)polymer obtained by hydrogenating, if needed, the ring opening-type norbornene-based (co)polymer, (5) a ring opening-type norbornene-based copolymer composed of molecules each obtained by ring opening copolymerization reaction between the molecules of the norbornene-based monomer and the molecules of the ethylene or α-olefin or a copolymer obtained by hydrogenating, if needed, the ring opening-type norbornene-based copolymer, and (6) a ring opening-type norbornene-based copolymer composed of molecules each obtained by ring opening copolymerization reaction between the molecules of the norbornene-based monomer and the molecules of the non-conjugated diene or another monomer or a copolymer obtained by hydrogenating, if needed, the ring opening-type norbornene-based copolymer. In this regard, examples of these copolymers include a random copolymer, a block copolymer, an alternating copolymer and the like.

These norbornene-based polymers can be obtained using various kinds of well known polymerizations such as ring opening metathesis polymerization (ROMP), a combination of ROMP and hydrogenation, polymerization via radicals or cations, polymerization using a cationic palladium polymerization initiator and polymerization using another polymerization initiator (e.g., a nickel polymerization initiator or another transition metal polymerization initiator).

Among them, it is preferable to use a norbornene-based polymer composed of molecules each including at least repeating units each represented by the following formula 2 (structural formula B), that is, the addition-type norbornene-based (co)polymer. This is because the norbornene-based (co)polymer abounds in transparency, heat resistance and plasticity.

[formula 2]

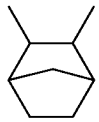

B

Such a norbornene-based polymer can be appropriately synthesized using a norbornene-based monomer which will be described (e.g. a norbornene-based monomer represented by the below described formula 4 or a cross-linkable norbornene-based monomer).

In this regard, in order to obtain a polymer 915 having a relatively high refractive index, the polymer 915 can be, in general, synthesized using a monomer composed of molecules each having aromatic ring(s) (aromatic group(s)), nitrogen atom(s), bromine atom(s) or chlorine atom(s). On the other hand, in order to synthesize a polymer 915 having a relatively low refractive index, the polymer 915 can be, in general, synthesized using a monomer composed of molecules each having alkyl group(s), fluorine atom(s) or ether chemical structure(s) (ether group(s)).

As the polymer 915 having the relatively high refractive index, a norbornene-based polymer composed of molecules each including aralkyl norbornene repeating units is preferably used. Such a norbornene-based polymer has an especially high refractive index.

Examples of an aralkyl group (an aryl alkyl group) included in each of the aralkyl norbornene repeating units include a benzyl group, a phenyl ethyl group, a phenyl propyl group, a phenyl butyl group, a naphthyl ethyl group, a naphthyl propyl group, a fluorenyl ethyl group, a fluorenyl propyl group and the like. Among them, it is especially preferred that the aralkyl group is the benzyl group or the phenyl ethyl group.

This is because the norbornene-based polymer including composed of the molecules each including such repeating units has a extremely high refractive index.

Further, a norbornene-based polymer composed of molecules each including alkyl norbornene repeating units is preferably used. Since the norbornene-based polymer composed of the molecules each including the alkyl norbornene repeating units has high plasticity, use of such a norbornene-based polymer makes it possible to impart high flexibility to the optical waveguide 90.

Examples of an alkyl group included in each of the alkyl norbornene repeating units include a propyl group, a butyl group, a pentyl group, a hexyl group, a heptyl group, an octyl group, a nonyl group, a decyl group and the like. Among them, it is especially preferred that the alkyl group is the hexyl group. In this regard, it is to be noted that these alkyl groups may be either a linear type or a branched type.

In the case where the norbornene-based polymer is composed of the molecules each including the hexyl norbornene repeating units, it can maintain the high plasticity thereof while preventing the refractive index thereof from being lowered. In addition, since such a norbornene-based polymer has excellent permeability for a light having a wavelength within the above mentioned long wavelength region (especially, near 850 nm), it is preferably used.

The norbornene-based polymer is not limited to a specific kind, but preferred examples of the norbornene-based polymer include a hexyl norbornene homopolymer, a phenyl ethyl norbornene homopolymer, a benzyl norbornene homopolymer, a hexyl norbornene/phenyl ethyl norbornene copolymer, a hexyl norbornene/benzyl norbornene copolymer and the like.

The core layer forming material 900 of this embodiment contains a monomer, a cocatalyst (a first substance) and a procatalyst (a second substance) as the additive 920.

As described below, when actinic radiation is irradiated onto the layer 910, molecules of the monomer are reacted to produce a reaction product within irradiated regions of the layer 910 onto which the actinic radiation is irradiated. As a result, a refractive index difference between the irradiated regions of the layer 910 and non-irradiated regions thereof onto which the actinic radiation is not irradiated is caused due to existence of the reaction product.

Here, the reaction product contains at least one kind selected from the group comprising a polymer composed of polymeric molecules each obtained by polymerizing the molecules of the monomer in the polymer (the matrix) 915, cross-linking chemical structures each cross-linking molecules of the polymer 915, and branching chemical structures each branching from the molecules of the polymer which are obtained by bonding the molecules of the monomer thereto. Examples of the branching chemical structures include branch polymers and side chains (pendant groups).

In the case where it is required that the refractive index of each of the irradiated regions of the layer 910 becomes high, a polymers 915 having a relatively low refractive index is used in combination with a monomer each having a refractive index higher than that of the polymer 915. On the other hand, in the case where it is required that the refractive index of each of the irradiated regions of the layer 910 becomes low, a polymer 915 each having a relatively high refractive index is used in combination with a monomer each having a refractive index lower than that of the polymer 915.

In this regard, it is to be noted that the term "high" or "low" for the refractive index does not mean an absolute value of the refractive index, but means a relative relation between refractive indexes of two certain materials.

In the case where the refractive index of each of the irradiated regions of the layer 910 is lowered due to reaction of the molecules of the monomer (production of the reaction product), each of the irradiated regions becomes the cladding portion 95. On the other hand, in the case where the refractive index of each of the irradiated regions of the layer 910 is raised due to the reaction of the molecules of the monomer, each of the irradiated regions becomes the core portion 94.

Such a monomer are not particularly limited to a specific kind, as long as it contains compounds each having polymerizable chemical structure(s). Examples of the monomer include a norbornene-based monomer, an acrylic acid (methacrylic acid)-based monomer, an epoxy-based monomer and a styrene-based monomer, and one or more of which may be used independently or in combination.

Among them, it is preferred that the norbornene-based monomer is used as the monomer. Use of the norbornene-based monomer makes it possible to obtain a core layer 93 (an optical waveguide 90) having an excellent optical transmission property and superior heat resistance and flexibility.

Here, the norbornene-based monomer gives a generic name of a monomer composed of molecules each including at least one norbornene chemical structure represented by the following formula 3 (structural formula A). Examples of the norbornene-based monomer include a monomer composed of molecules (compounds) each represented by the following formula 4 (structural formula C) and the like.

[formula 3]

A

[formula 4]

-continued

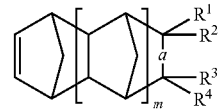

C wherein "a" is a single bond or a double bond, each of $R^1$ to $R^4$ is independently a hydrogen atom, a substituted hydrocarbyl group, an unsubstituted hydrocarbyl group or a functional substituent group, "m" is an integer of 0 to 5, and in the case where a is the double bond, one of $R^1$ and $R^2$ and one of $R^3$ and $R^4$ are not present.

Examples of the unsubstituted hydrocarbyl group include a linear or branched alkyl group having a carbon number of 1 to 10 ($C_1$-$C_{10}$), a linear or branched alkenyl group having a carbon number of 2 to 10 ($C_2$-$C_{10}$), a linear or branched alkynyl group having a carbon number of 2 to 10 ($C_2$-$C_{10}$), a cycloalkyl group having a carbon number of 4 to 12 ($C_4$-$C_{12}$), a cycloalkenyl group having a carbon number of 4 to 12 ($C_4$-$C_{12}$), a aryl group having a carbon number of 6 to 12 ($C_6$-$C_{12}$), and an aralkyl group (an aryl alkyl group) having a carbon number of 7 to 24 ($C_7$-$C_{24}$). Further, each of $R_1$ and $R_2$ or each of $R_3$ and $R_4$ may be an alkyl idenyl group having a carbon number of 1 to 10 ($C_1$-$C_{10}$).

Concrete examples of the alkyl group include a methyl group, an ethyl group, a propyl group, an isopropyl group, a butyl group, an isobutyl group, a sec-butyl group, a tert-butyl group, a pentyl group, a neopentyl group, a hexyl group, a heptyl group, an octyl group, a nonyl group and a decyl group, but the alkyl group is not limited thereto.

Concrete examples of the alkenyl groups include a vinyl group, an allyl group, a butenyl group and a cyclohexenyl group, but the alkenyl group is not limited thereto.

Concrete examples of the alkynyl group include an ethynyl group, a 1-propynyl group, a 2-propynyl group, a 1-butynyl group and a 2-butynyl group, but the alkynyl group is not limited thereto.

Concrete examples of the cycloalkyl group include a cyclopentyl group, a cyclohexyl group and a cyclooctyl group, but the cycloalkyl group is not limited thereto.

Concrete examples of the aryl group include a phenyl group, a naphthyl group and an anthracenyl group, but the aryl group is not limited thereto.

Concrete examples of the aralkyl group include a benzyl group and a phenyl ethyl group (a phenethyl group), but the aralkyl group is not limited thereto.

Further, concrete examples of the alkylidenyl group include a methylidenyl group and an ethylidenyl group, but the alkylidenyl group is not limited thereto.

Examples of the substituted hydrocarbyl group include groups in which all or some hydrogen atoms included in the above hydrocarbyl group are substituted by halogen atoms. Concrete examples of the substituted hydrocarbyl group include halogenated hydrocarbyl groups such as a halohydrocarbyl group, a perhalohydrocarbyl group and a perhalocarbyl group.

In these halogenated hydrocarbyl groups, as the halogen atoms to be substituted with the hydrogen atoms, at least one kind selected from chlorine atoms, fluorine atoms and bromine atoms is preferable, and the fluorine atoms are more preferable.

Concrete examples of perhalogenated hydrocarbyl groups (e.g., the perhalohydrocarbyl group and the perhalocarbyl group) include a perfluorophenyl group, a perfluoromethyl group (a trifluoromethyl group), a perfluoroethyl group, a perfluoropropyl group, a perfluorobutyl group and a perfluorohexyl group.

In this regard, halogenated alkyl groups each having a carbon number of 11 to 20 are preferably used in addition to the halogenated alkyl groups each having the carbon number of 1 to 10. Specifically, halogenated alkyl groups each partially or fully halogenated, being linear or branched and represented by the following general formula: —$C_zX''_{2z+1}$, wherein each of X"s is independently a halogen atom or a hydrogen atom and z is an integer of 1 to 20, can be selected.

Further, examples of the substituted hydrocarbyl group include a cycloalkyl group, an aryl group and an aralkyl group each further substituted with linear or branched alkyl group(s) having a carbon number 1 to 5 ($C_1$-$C_5$), linear or branched haloalkyl group(s) having a carbon number 1 to 5 ($C_1$-$C_5$), aryl group(s) or cycloalkyl group(s), in addition to the halogen atom(s).

Furthermore, examples of the functional substituent group include —$(CH_2)_n$—$CH(CF_3)_2$—O—$Si(Me)_3$, —$(CH_2)_n$—$CH(CF_3)_2$—O—$CH_2$—O—$CH_3$, —$(CH_2)_n$—$CH(CF_3)_2$—O—C(O)—O—$C(CH_3)_3$, —$(CH_2)_n$—$C(CF_3)_2$—OH, —$(CH_2)_n$—C(O)—$NH_2$, —$(CH_2)_n$—C(O)—Cl, —$(CH_2)_n$—C(O)—O—$R^5$, —$(CH_2)_n$—O—$R^5$, —$(CH_2)_n$—O—C(O)—$R^5$, —$(CH_2)_n$—C(O)—$R^5$, —$(CH_2)_n$—O—C(O)—$OR^5$, —$(CH_2)_n$—$Si(R^5)_3$, —$(CH_2)_n$—$Si(OR^5)_3$, —$(CH_2)_n$—O—$Si(R^5)_3$, and —$(CH_2)_n$—C(O)—$OR^6$.

In this regard, in the above respective formulas, n is an integer of 0 to 10, and each of $R^5$s is independently a hydrogen atom, a linear or branched alkyl group having a carbon number of 1 to 20 ($C_1$-$C_{20}$), a linear or branched halogenated or perhalogenated alkyl group having a carbon number of 1 to 20 ($C_1$-$C_{20}$), a linear or branched alkenyl group having a carbon number of 2 to 10 ($C_2$-$C_{10}$), a linear or branched alkynyl group having a carbon number of 2 to 10 ($C_2$-$C_{10}$), a cycloalkyl group having a carbon number of 5 to 12 ($C_5$-$C_{12}$), an aryl group having a carbon number of 6 to 14 ($C_6$-$C_{14}$), a halogenated or perhalogenated aryl group having a carbon number of 6 to 14 ($C_6$-$C_{14}$) or an aralkyl group having a carbon number of 7 to 24 ($C_7$-$C_{24}$).

The hydrocarbyl group represented by $R^5$ is the same one as represented by each of $R^1$ to $R^4$. As shown in each of $R^1$ to $R^4$, the hydrocarbyl group represented by $R^5$ may be halogenated and perhalogenated.

For example, in the case where $R^5$ is a halogenated or perhalogenated alkyl group having a carbon number of 1 to 20 ($C_1$-$C_{20}$), $R^5$ can be represented by the general formula: —$C_zX''_{2z+1}$, wherein "z" and X" are defined as above, and at least one of X"s is a halogen atom (e.g., a bromine atom, a chlorine atom or a fluorine atom).

In this regard, it is to be noted that the perhalogenated alkyl group is a group in which all X"s are halogen atoms in the above general formula. Concrete examples of the perhalogenated alkyl group include a trifluoromethyl group, a trichloromethyl group, —$C_7F_{15}$ and —$C_{11}F_{23}$, but the perhalogenated alkyl group is not limited thereto.

Concrete examples of the perhalogenated aryl group include a pentachlorophenyl group and a pentafluorophenyl group, but the perhalogenated aryl group is not limited thereto.

Further, examples of $R^6$ include —$C(CH_3)_3$, —$Si(CH_3)_3$, —$CH(R^7)$—O—$CH_2CH_3$, —$CH(R^7)OC(CH_3)_3$, cyclic groups each shown in the following formula 5 and the like.

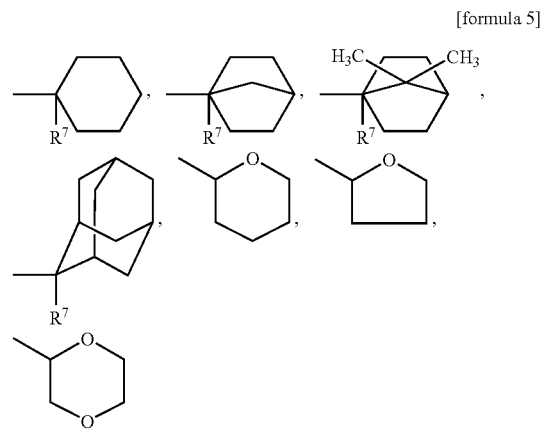

[formula 5]

In this regard, $R^7$ is a hydrogen atom or a linear or branched alkyl group having a carbon number of 1 to 5 ($C_1$-$C_5$).

Examples of the alkyl group include a methyl group, an ethyl group, a propyl group, an i-propyl group, a butyl group, an i-butyl group, a t-butyl group, a pentyl group, a t-pentyl group and a neopentyl group.

In the above cyclic groups each shown in the formula 5, the single bond extending from each of the cyclic groups is bonded to the acid substituent group to form the ester bond.

Concrete examples of $R^6$ include a 1-methyl-1-cyclohexyl group, an isobornyl group, a 2-methyl-2-isobornyl group, a 2-methyl-2-adamantyl group, a tetrahydrofuranyl group, a tetrahydropyranoyl group, a 3-oxocyclohexanonyl group, a mevalonic lactonyl group, a 1-ethoxy ethyl group, a 1-t-butoxy ethyl group and the like.

Further, examples of another $R^6$ include a dicyclopropyl methyl (Dcpm) group and a dimethyl cyclopropyl methyl (Dmcp) group each represented by the following formula 6, and the like.

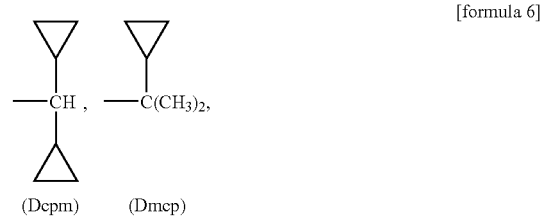

[formula 6]

As the monomer, a cross-linkable monomer (a cross-linking agent) can be used instead of the above mentioned monomer or in combination with the above mentioned monomer. The cross-linkable monomer is composed of molecules (compounds) which can be cross-linked in the presence of the procatalyst described below.

By using the cross-linkable monomer, the following advantages can be obtained. Namely, since the molecules of the cross-linkable monomer can be polymerized more rapidly, a required time for forming (processing) the core layer 93 (the optical waveguide 90) can be shortened. Further, since the cross-linkable monomer is hard to be evaporated even if it is heated, rise in a vapor pressure thereof can be suppressed. In addition, since the cross-linkable monomer has excellent heat resistances, it is possible to improve the heat resistance of the core layer 93.

Among the cross-linkable monomers, a cross-linkable norbornene-based monomer is a compound (molecule) having the norbornene-type chemical structure represented by the above formula 3 (the above structural formula A), that is, a norbornene-type double bond.

As the cross-linkable norbornene-based monomer, there are a fused multicyclic ring systems compound and a linked multicyclic ring systems compound.

Examples of the fused multicyclic ring systems compound (a fused multicyclic ring systems cross-linkable norbornene-based monomer) include compounds each represented by the following formula 7.

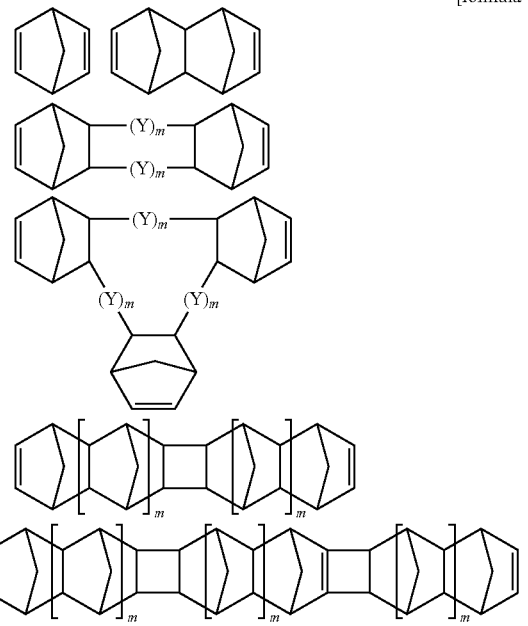

[formula 7]

wherein Y is a methylene (—CH$_2$—) group and "m" is an integer of 0 to 5, and when "m" is 0, Y is a single bond.

For brevity, it decides to consider that norbornadiene is classified as the fused multicyclic ring systems compound and contains a polymerizable norbornene-type double bond.

Concrete examples of the fused multicyclic ring systems compound include compounds each represented by the following formula 8, but the fused multicyclic ring systems compound is not limited thereto.

[formula 8]

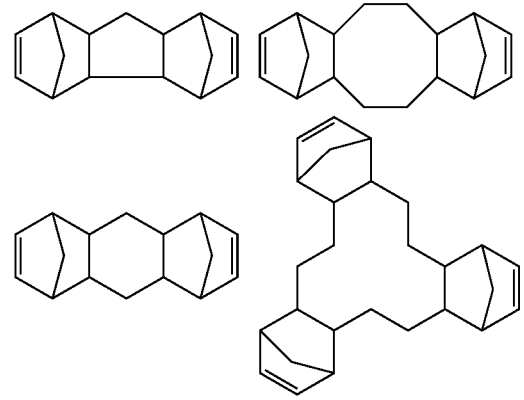

-continued

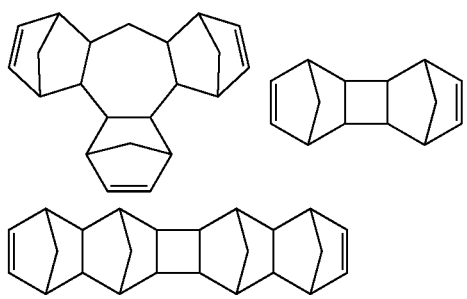

On the other hand, examples of the linked multicyclic ring systems compound (a linked multicyclic ring systems cross-linkable norbornene-based monomer) include a compound represented by the following formula 9.

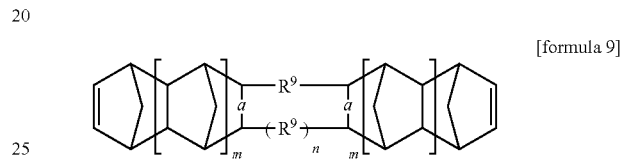

[formula 9]

wherein each of "a"s is independently a single bond or a double bond, each of "m"s is independently an integer of 0 to 5, $R^9$s is a divalent hydrocarbyl group, a divalent ether group or a divalent silyl group, and "n" is 0 or 1.

Here, the divalent substituent group is a group having two bonding hands at both ends thereof, each of the bonding hands that can be bonded to the norbornene chemical structure.

Concrete examples of the divalent hydrocarbyl group include an alkylene group represented by the general formula: —(C$_d$H$_{2d}$)— (wherein "d" is preferably an integer of 1 to 10) and a divalent aromatic group (aryl group).

The divalent alkylene group is preferably a linear or branched alkylene group having a carbon number of 1 to 10 (C$_1$-C$_{10}$). Examples of the divalent alkylene group include a methylene group, an ethylene group, a propylene group, a butylene group, a pentylene group, a hexylene group, a heptylene group, an octylene group, a nonylene group and a decylene group.

In this regard, it is to be noted that the branched alkylene group is a group in which hydrogen atom(s) included in a main chain thereof is (are) substituted with linear or branched alkyl group(s).

On the other hand, as the divalent aromatic group, a divalent phenyl group or a divalent naphthyl group is preferable.

Further, the divalent ether group is a group represented by —R$^{10}$—O—R$^{10}$—.

In this regard, each of R$^{10}$s is independently the same as R$^9$.

Concrete examples of the linked multicyclic ring systems compound include compounds each represented by the following formula 10, formula 11, formula 12, formula 13 and formula 14, fluorine containing compounds (fluorine containing cross-linkable norbornene-based monomers) each represented by the following formula 15 and formula 16, but the linked multicyclic ring systems compound is not limited thereto.

[formula 10]
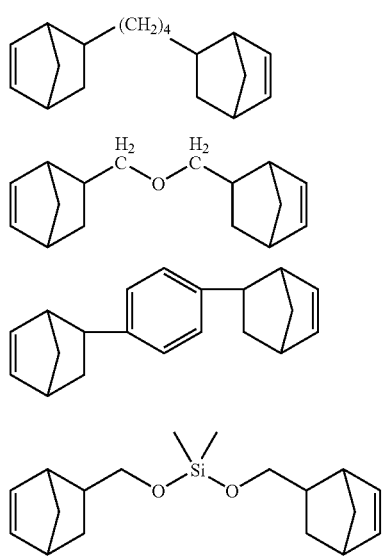
[formula 11]
The compound represented by the formula 11 is dimethyl bis[bicyclo[2.2.1]hept-2-ene-5-methoxy]silane, and is also referred to as dimethyl bis(norbornene methoxy)silane (abbreviated as "SiX").
[formula 12]
wherein "n" is an integer of 0 to 4.
[formula 13]
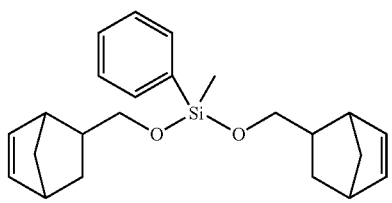
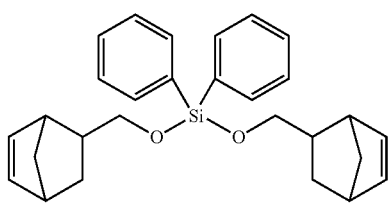
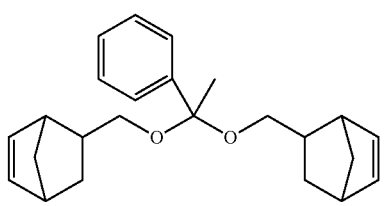
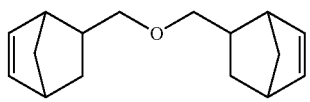
[formula 14]
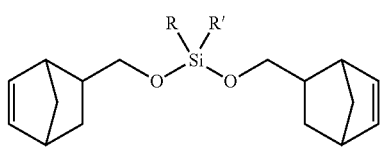
R and R' = alkyl or aryl
a
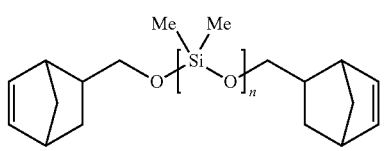
b
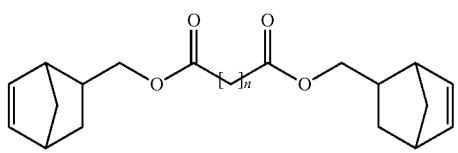
c

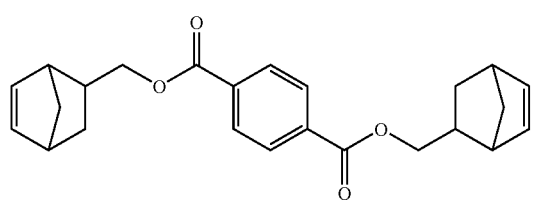
d
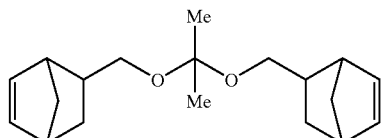
i
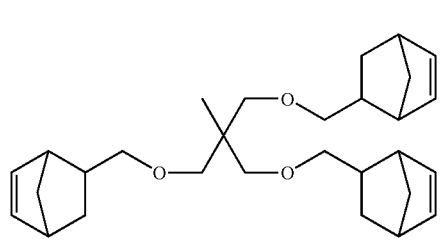
e
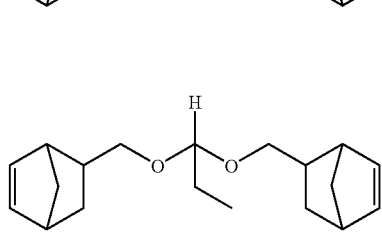
j
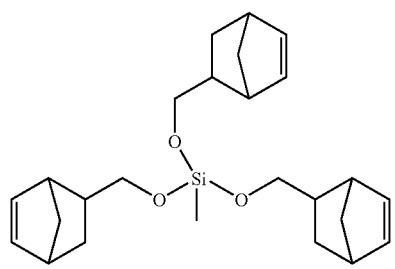
f
k
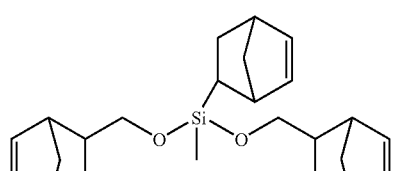
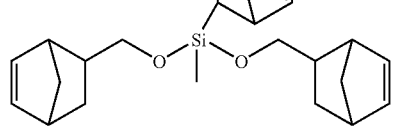
g
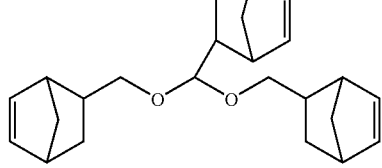
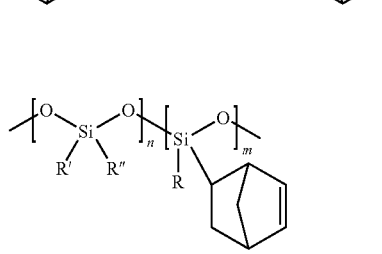
l
R, R', R" = alkyl or aryl
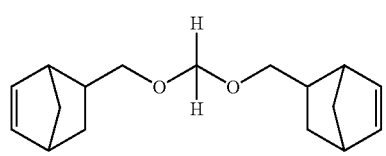
h
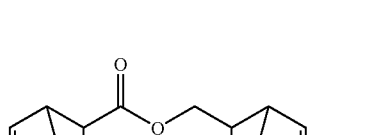
m
wherein each of "m" and "n" is an integer of 1 to 4.
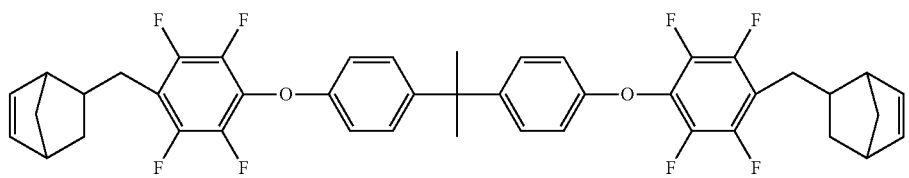
[formula 15]
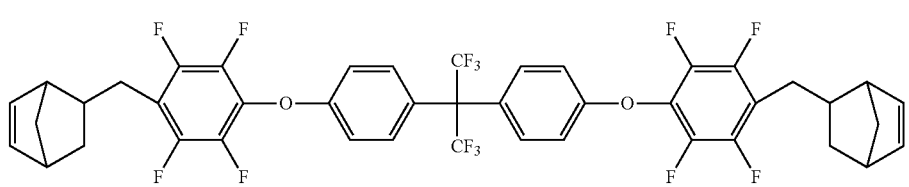
[formula 16]

Among various kinds of the cross-linkable norbornene-based monomers, the dimethyl bis(norbornene methoxy) silane (the SiX) is especially preferable. The SiX has a sufficient low refractive index with respect to the norbornene-based polymer composed of molecules each including the alkyl norbornene repeating units and/or the aralkyl norbornene repeating units. Therefore, when the actinic radiation described below is irradiated onto the layer 910, the refractive index of each of the irradiated regions thereof can be reliably lowered so that each of them becomes the cladding portion 95. Further, the refractive index difference between the core portions 94 and the cladding portions 95 can be enhanced. This makes it possible to improve properties such as the optical transmission property of the core layer 93 (the optical waveguide 90).

In this regard, it is to be noted that the above monomers may be used independently or in arbitrary combination.

The procatalyst (the second substance) is a substance that can initiate reaction (polymerization reaction, cross-linking reaction or the like) of the molecules of the monomer, wherein the activation temperature of the substance is changed under action of an activated cocatalyst (first substance) by being irradiated with the actinic radiation described below.

Any substance whose activation temperature is changed (raised or lowered) according to irradiation of the actinic radiation can be used as the procatalyst, but a substance whose activation temperature is lowered according to the irradiation of the actinic radiation is especially preferably used. In the case where such a substance is used as the procatalyst, it is possible to form the core layer 93 (the optical waveguide 90) by carrying out a heat treatment at a relatively low temperature. This makes it possible to prevent layers other than the core layer 93 from being heated unnecessarily. As a result, lowering of the properties such as the optical transmission property of the optical waveguide 90 can be prevented.

It is preferable to use a procatalyst containing (mainly composed of) at least one kind of compounds each represented by the following formula (Ia) and compounds each represented by the following formula (Ib).

[formula 17]

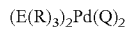

$(E(R)_3)_2Pd(Q)_2$ (Ia)

$[(E(R)_3)_aPd(Q)(LB)_b]_p[WCA]_r$ (Ib)

In the formulas (Ia) and (Ib), $E(R)_3$ is a Group 15 neutral electron donor ligand, E is an element selected from the group comprising elements of Group 15 of the Periodic Table, and R is one of a hydrogen atom, an isotope thereof and a hydrocarbyl group-containing moiety, Q is an anionic ligand selected from the group comprising carboxylate, thiocarboxylate and dithiocarboxylate. Further, in the formula (Ib), LB is a Lewis base, WCA is a weakly coordinating anion, "a" is an integer of 1 to 3, "b" is an integer of 0 to 2, a total number of "a" and "b" is 1 to 3, and "p" and "r" are integers for maintaining balance between an electronic charge of a palladium cation and an electronic charge of the weakly coordinating anion.

Examples of an exemplary compound in accordance with the formula (Ia) include $Pd(OAc)_2(P(i-Pr)_3)_2$, $Pd(OAc)_2(P(Cy)_3)_2$, $Pd(O_2CCMe_3)_2(P(Cy)_3)_2$, $Pd(OAc)_2(P(Cp)_3)_2$, $Pd(O_2CCF_3)_2(P(CY)_3)_2$ and $Pd(O_2CC_6H_5)_3(P(Cy)_3)_2$, wherein Cp is a cyclopentyl group and Cy is a cyclohexyl group, but the exemplary compound in accordance with the formula (Ia) is not limited thereto.

Further, a procatalyst containing compounds each represented by the formula (Ib), in which each of "p" and "q" is selected from an integer of 1 or 2, is preferably used.

Examples of an exemplary compound in accordance with the formula (Ib) include $Pd(OAc)_2(P(Cy)_3)_2$, wherein Cy is a cyclohexyl group and Ac is an acetyl group.

Use of these procatalysts makes it possible the molecules of the monomer to be effectively reacted. In the case where the monomer are the norbornene-based monomer, the use of them makes it possible the molecules of the monomer to be effectively polymerized or cross-linked via the addition polymerization reaction.

Further, in a state that the activation temperature of the procatalyst is lowered (an active but latent state of the procatalyst), a difference between the lowered activation temperature and an original activation temperature thereof is preferably in the range of about 10 to 80° C., and more preferably in the range of about 10 to 50° C. This makes it possible to reliably cause the refractive index difference between the core portions 94 and the cladding portions 95.

It is preferable to use the procatalyst containing (mainly composed of) at least one kind of the compounds each represented by the $Pd(OAc)_2(P(i-Pr)_3)_2$ and the compounds each represented by the $Pd(OAc)_2(P(Cy)_3)_2$.

Hereinafter, on occasion, the $Pd(OAc)_2(P(i-Pr)_3)_2$ will be abbreviated as "Pd545" and the $Pd(OAc)_2(P(Cy)_3)_2$ will be abbreviated as "Pd785".

The cocatalyst (the first substance) is a substance that is activated by being irradiated with the actinic radiation and can change the activation temperature of the procatalyst (that is, a polymerization initiation temperature of the molecules of the monomer).

As such a cocatalyst, any substance can be used as long as it is activated due to change (reaction or cleavage) of a chemical structure thereof by being irradiated with the actinic radiation. A cocatalyst (a photoinitiator) containing (mainly composed of) compounds that are cleaved by being irradiated with actinic radiation having a predetermined wavelength so that they produce cations such as protons or other positive ions and weakly coordinating anions (hereinafter, referred to as "WCA"s) can be preferably used. In this regard, each of the weakly coordinating anions can substitute for a cleavable group included in the compounds of the procatalyst.

Examples of the weakly coordinating anion include a tetrakis(pentafluorophenyl) boric acid ion (hereinafter, referred to as "FABA$^-$"), a hexafluoro antimonic acid ion (hereinafter, referred to as "SbF$_6^-$") and the like.

Examples of the cocatalyst (a photo acid generator or a photo base generator) include tetrakis(pentafluorophenyl) gallate, aluminates, antimonates, other borates, other gallates, other carboranes and other halocarboranes in addition to tetrakis(pentafluorophenyl)borates and hexafluoro antimonate each represented by the following formula 18.

[formula 18]

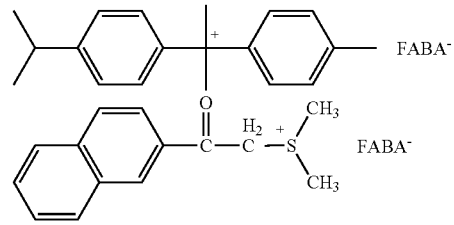

-continued

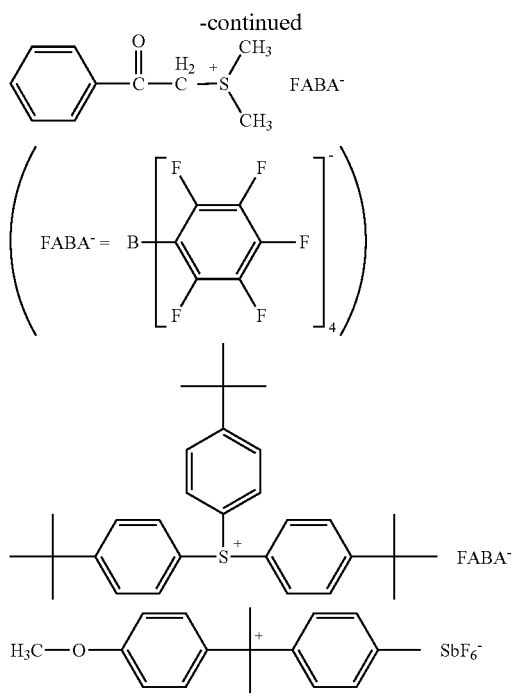

Examples of a marketed production of such a cocatalyst include RHODORSIL (which is a registered trademark and is same below) PHOTOINITIATOR 2074 (CAS 178233-72-2, available from Rhodia USA Inc., Cranbury, N.J.), TAG-372R (dimethyl(2-(2-naphthyl)-2-oxo ethyl)sulfonium tetrakis (pentafluorophenyl)borate, CAS 193957-54-9, available from Toyo Ink Mfg. Co., Ltd., Tokyo, Japan), MPI-103 (CAS 87709-41-9, available from Midori Kagaku Co., Ltd., Tokyo, Japan), TAG-371 (CAS 193957-53-8, available from Toyo Ink Mfg. Co., Ltd., Tokyo, Japan), TTBPS-TPFPB (tris(4-tert-butyl phenyl)sulphonium tetrakis(pentafluorophenyl) borate, available from Toyo Gosei Co., Ltd., Tokyo, Japan), NAI-105 (CAS 85342-62-7, available from Midori Kagaku Co., Ltd., Tokyo, Japan), and the like.

In this regard, in the case where the RHODORSIL PHOTOINITIATOR 2074 is used as the cocatalyst (the first substance), an ultraviolet ray (an UV light) is preferably used as the actinic radiation (an actinic radiation) and a mercury lamp (a high pressure mercury lamp) is preferably used as a means for irradiating the ultraviolet ray. This makes it possible to irradiate an ultraviolet ray (an actinic radiation) having a wavelength of less than 300 nm and sufficient energy onto the layer 910. As a result, it is possible to cleave the RHODORSIL PHOTOINITIATOR 2074 to produce the above cations and the WCAs.

Further, the core layer forming material 900 may contain a sensitizing agent, if needed.

The sensitizing agent has a function of reducing a time and energy required for the activation (the reaction or the cleavage) of the cocatalyst by enhancing sensitivity thereof for the actinic radiation and/or a function of changing the wavelength of the actinic radiation to a wavelength suitable for the activation of the cocatalyst.

Such a sensitizing agent is not particularly limited to a specific type because it is appropriately selected depending on the sensitivity of the cocatalyst, a peak wavelength which the sensitizing agent can absorb and the like. Examples of the sensitizing agent include anthracenes such as 9,10-dibutoxy anthracene (CAS 76275-14-4), xanthones, anthraquinones, phenanthrenes, chrysenes, benzpyrenes, fluoranthenes, rubrenes, pyrenes, indanthrenes, thioxanthen-9-ones, and one of them may be singly used and mixtures thereof may be used.

Concrete examples of the sensitizing agent include 2-isopropyl-9H-thioxanthen-9-one, 4-isopropyl-9H-thioxanthen-9-one, 1-chloro-4-propoxy thioxanthone, phenothiazine, and mixtures thereof.

In this regard, it is to be noted that the 9,10-dibutoxy anthracene (hereinafter, referred to as "DBA") is available from Kawasaki-kasei Co., Ltd., Kanagawa, Japan.

An amount of the sensitizing agent contained in the core layer forming material 900 is not particularly limited to a specific value, but is preferably 0.01 wt % or more, more preferably 0.5 wt % or more, and even more preferably 1 wt % or more. On the other hand, an upper limit value of the amount of the sensitizing agent contained in the core layer forming material 900 is preferably 5 wt % or less.

Furthermore, the core layer forming material 900 may contain an anti-oxidizing agent. This makes it possible to prevent generation of undesirable free radicals and/or natural oxidation of the polymer 915. As a result, it is possible to improve properties of the obtained core layer 93 (optical waveguide 90).

As the anti-oxidizing agent, Ciba (which is a registered trademark and is same below) IRGANOX (which is a registered trademark and is same below) 1076 and Ciba IRGAFOS (which is a registered trademark and is same below) 168, each being available from Ciba Specialty Chemicals Corporation, Tarrytown, N.Y., can be preferably used.

As another anti-oxidizing agent, Ciba Irganox (which is a registered trademark and is same below) 129, Ciba Irganox 1330, Ciba Irganox 1010, Ciba Cyanox (which is a registered trademark and is same below) 1790, Ciba Irganox 3114, Ciba Irganox 3125 and the like can also be used.

In this regard, for example, in the case where the layer 910 is not placed under an oxidation ambiance or is placed under the oxidation ambiance for a very short period of time, the anti-oxidizing agent may be omitted.

Examples of a solvent to be used for preparing the core layer forming material 900 include various kinds of organic solvents such as an ether-based solvent (e.g., diethyl ether, diisopropyl ether, 1,2-dimethoxyethane (DME), 1,4-dioxane, tetrahydrofuran (THF), tetrahydropyran (THP), anisole, diethylene glycol dimethyl ether (diglyme) or diethylene glycol ethyl ether (carbitol)), a cellosolve-based solvent (e.g., methyl cellosolve, ethyl cellosolve or phenyl cellosolve), an aliphatic hydrocarbon-based solvent (e.g., hexane, pentane, heptane or cyclohexane), an aromatic hydrocarbon-based solvent (e.g., toluene, xylene, benzene or mesitylene), a heteroaromatic ring compound-based solvent (e.g., pyridine, pyrazine, furan, pyrrole, thiophene or methylpyrrolidone), an amide-based solvent (e.g., N,N-dimethyl formamide (DMF) or N,N-dimethyl acetamide (DMA)), a halogen compound-based solvent (e.g., dichloromethane, chloroform or 1,2-dichloroethane), an ester-based solvent (e.g., ethyl acetate, methyl acetate or ethyl formate), an sulfur compound-based solvent (dimethyl sulfoxide (DMSO) or sulfolane), mixture solvents thereof and the like.

In the meanwhile, examples of a method of removing (desolvating) the solvent from the liquid coating formed on the supporting substrate 951 include a natural drying method, a forced drying method such as a method of placing the liquid coating under a heating or reduced pressure condition or a method of blowing inert gas to the liquid coating, and the like.

In this way, the layer 910 formed from a film-like solidified product (or a film-like cured product) of the core layer forming material 900 is formed on the supporting substrate 951.

At this time, the layer (a dried film of the PITDM) 910 has a first refractive index (RI). This first refractive index is obtained under actions of the polymer 915 and the monomer each dispersed (distributed) uniformly in the layer 910.

Figure 3:
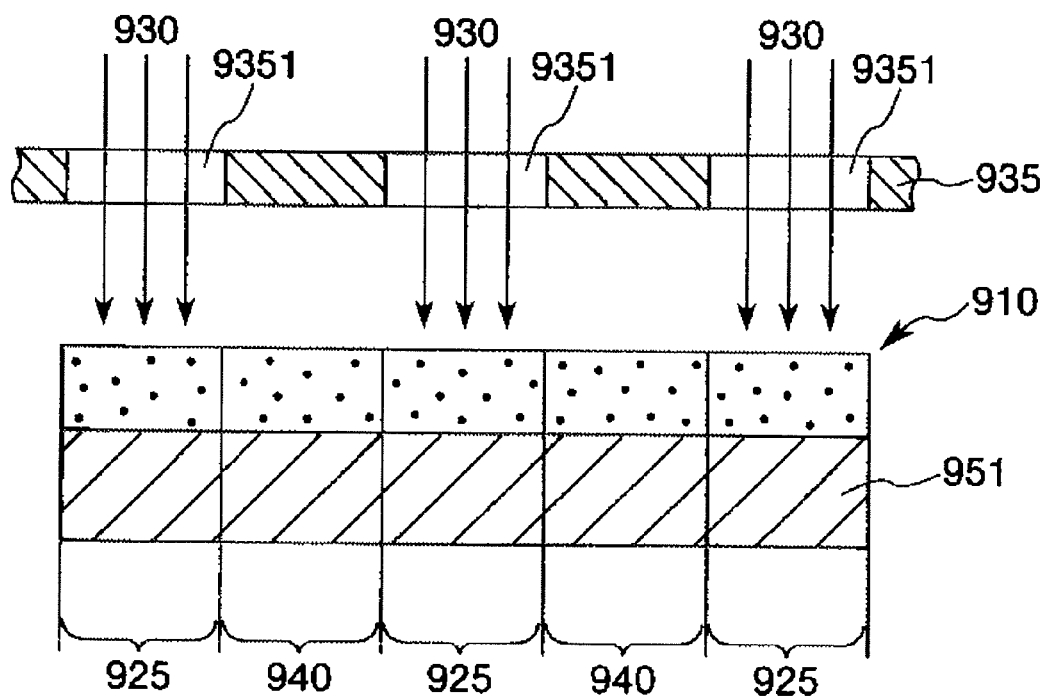
FIG. 3 is a sectional view schematically showing one process example of the first manufacturing method of the optical waveguide structure of the present invention.
Figure 4:
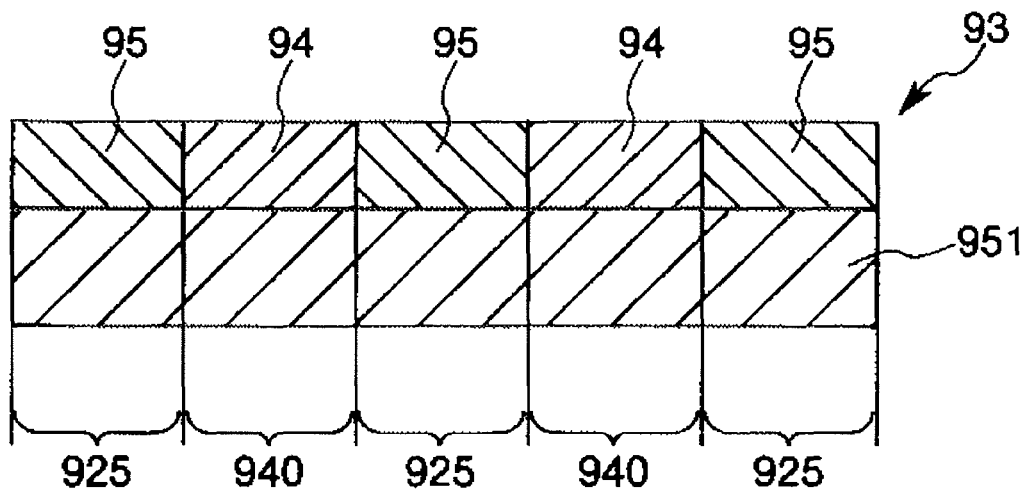
FIG. 4 is a sectional view schematically showing one process example of the first manufacturing method of the optical waveguide structure of the present invention.

[2A] Next, a mask (masking) 935 provided with openings (windows) 9351 is prepared, and then the actinic radiation (an activated energy beam) 930 is irradiated onto the layer 910 through the mask 935 (see FIG. 3).

Hereinafter, description will be made on a case that monomer having a refractive index lower than that of the polymer 915 and a procatalyst whose activation temperature is lowered by being irradiated with the actinic radiation 930 are used.

Namely, in this case, the irradiated regions 925 onto which the actinic radiation 930 has been irradiated become the cladding portions 95.

Therefore, in this case, the mask 935 has openings (windows) 9351 each having a pattern corresponding to that of each of the cladding portions 95 to be formed. Each of these openings 9351 defines a transmission portion through which the actinic radiation 930 to be irradiated is passed.

The mask 935 may be either a mask which has been made in advance (independently) such as a mask having a plate shape or a mask which is formed on the layer 910 using, for example, a vapor phase deposition method or an application method.

Preferred examples of the mask 935 include a photo mask made of quartz glass, PET or the like, a stencil mask, a metal thin film formed using the vapor phase deposition method (e.g., an evaporation method, a sputtering method or the like), and the like. Among them, the photo mask or the stencil mask is particularly preferably used. This is because cladding portions 95 (or core portions 94) each having a fine pattern can be formed with high accuracy. Further, since handling of such a mask is easy, it is of advantage to improve productivity of the optical waveguide 90.

Further, in FIG. 3, the openings (the windows) 9351 each having the pattern corresponding to that of each of the cladding portions 95 to be formed are formed by partially removing a base substrate so as to allow portions corresponding to the non-irradiated regions 940 onto which the actinic radiation 930 is not irradiated to remain. Alternatively, in the case where the base substrate is made of quartz glass, PET or the like, the mask can be obtained by forming shielding portions made of a shielding material composed of metal such as chromium on the base substrate. In such a mask, portions of the base substrate on which the shielding portions are not formed serve as the openings (transmission portions) 9351.

The actinic radiation 930 to be used has only to be able to cause optical reaction (change) of the cocatalyst. For example, an electron ray, an X ray or the like can be used in addition to a visible light, an UV light, an infrared light and a laser beam.

Such an actinic radiation 930 is not particularly limited to a specific type, because it is appropriately selected depending on kinds of the cocatalyst, kinds of the sensitizing agent (in the case where it is contained) and the like. It is preferred that the actinic radiation 930 has a peak wavelength in the range of 200 to 450 nm. This makes it possible to activate the cocatalyst relatively easily.

Further, an exposure dose of the actinic radiation 930 is preferably in the range of about 0.1 to 9 $J/cm^2$, more preferably in the range of about 0.2 to 6 $J/cm^2$, and even more preferably in the range of about 0.2 to 3 $J/cm^2$. This makes it possible to reliably activate the cocatalyst.

When the actinic radiation 930 is irradiated onto the layer 910 through the mask 935, the compounds of the cocatalyst (the first substance) existing within each of the irradiated regions 925 onto which the actinic radiation 930 has been irradiated are reacted (bonded) or cleaved under the action of the actinic radiation 930, to thereby extricate (produce) the cations (protons or other positive ions) and the weakly coordinating anions (the WCAs).

At this time, the cations or the weakly coordinating anions change (cleave) chemical structures of the compounds of the procatalyst (the second substrate) existing within each of the irradiated regions 925. As a result, the procatalyst is brought into the active but latent state (a latent active state).

Here, in the active but latent state (the latent active state), although the procatalyst has the activation temperature lower than the original activation temperature, it cannot allow the molecules of the monomer to be reacted without temperature rise, that is, at room temperature.

Therefore, even after the actinic radiation 930 is irradiated onto the layer 910, in the case where the layer 910 is stored at a temperature of, for example, about −40° C., it can maintain a state that the molecules of the monomer are not reacted in the layer 910. For this reason, the core layers 930 can be obtained at a time by preparing a plurality of the layers 910 onto which the actinic radiation 930 has been irradiated, and then subjecting the layers 910 to a heat treatment. This process is of high utility value.

In this regard, it is to be noted that in the case where a light having high directivity such as the laser beam is used as the actinic radiation 930, use of the mask 935 may be omitted.

[3A] Next, the layer 910 is subjected to a heat treatment (a first heat treatment).

At this time, the procatalyst in the active but latent state is activated (brought into an active state) within each of the irradiated regions 925, as a result of which the molecules of the monomer are reacted (polymerized or cross-linked) due to activation of the procatalyst.

When reaction of the molecules of the monomer progresses within each of the irradiated regions 925, a concentration of the monomer therein is gradually lowered. In this way, a difference between the concentration of the monomer in each of the irradiated regions 925 and a concentration of the monomer in each of the non-irradiated regions 940 is caused. In order to eliminate the difference, the monomer contained in each of the non-irradiated regions 940 is diffused and assembled to each of the irradiated regions 925. This phenomenon is referred to as "monomer diffusion".

As a result, the molecules of the monomer and/or a reaction product thereof (polymeric molecules, cross-linking chemical structures or branching chemical structures) are increased within each of the irradiated regions 925. Chemical structures each derived from the molecules of the monomer remarkably have an effect on the refractive index of each of the irradiated regions 925 so that it is lowered up to a second refractive index lower than the first refractive index. In this case, addition-type (co)polymeric molecules are mainly produced as the polymeric molecules.

On the other hand, since the monomer is diffused from each of the non-irradiated regions 940 to each of the irradiated regions 925, an amount of the molecules of the monomer contained in each of the non-irradiated regions 940 is lowered. The molecules of the polymer 915 remarkably have an effect on the refractive index of each of the non-irradiated regions 940 so that it is increased up to a third refractive index higher than the first refractive index.

In this way, a refractive index difference between the irradiated regions 925 and the non-irradiated regions 940 (the second refractive index<the third refractive index) is caused. As a result, the core portions 94 (corresponding to the non-irradiated regions 940) and the cladding portions 95 (corresponding to the irradiated regions 925) are formed (see FIG. 4).

A heating temperature in the heat treatment is not particularly limited to a specific value, but is preferably in the range of about 30 to 80° C., and more preferably in the range of about 40 to 60° C.

Further, a heating time in the heat treatment is preferably set so as to substantially complete the reaction of the molecules of the monomer existing in each of the irradiated regions 925. Specifically, the heating time is preferably in the range of about 0.1 to 2 hours, and more preferably in the range of about 0.1 to 1 hour.

[4A] Next, the layer 910 is subjected to a second heat treatment.

By doing so, the procatalyst remaining in each of the irradiated regions 925 and each of the non-irradiated regions 940 is activated (brought into the active state) directly or via activation of the cocatalyst. As a result, the molecules of the monomer remaining in each of the irradiated and non-irradiated regions 925 and 940 are reacted.

In this way, by reacting the molecules of the monomer remaining in each of the irradiated and non-irradiated regions 925 and 940, it is possible to stabilize the obtained core portions 94 and cladding portions 95.

A heating temperature in the second heat treatment is not particularly limited to a specific value as long as it is a temperature at which the procatalyst and the cocatalyst can be activated, but is preferably in the range of about 70 to 100° C., and more preferably in the range of about 80 to 90° C.

Further, a heating time in the second heat treatment is preferably in the range of about 0.5 to 2 hours, and more preferably in the range of about 0.5 to 1 hour.

[5A] Next, the layer 910 is subjected to a third heat treatment.

This makes it possible to reduce internal stress which would occur in the obtained core layer 93 and to further stabilize the core portions 94 and cladding portions 95.

It is preferred that the heating temperature in the third heat treatment is higher than the heating temperature in the second heat treatment and a difference therebetween is 20° C. or more. Specifically, the difference therebetween is preferably in the range of about 90 to 180° C., and more preferably in the range of about 120 to 160° C.

Further, a heating time in the third heat treatment is preferably in the range of about 0.5 to 2 hours, and more preferably in the range of about 0.5 to 1 hour.

Through the above steps, the core layer 93 is obtained.

In this regard, it is to be noted that in the case where the refractive index difference between the core portions 94 and the cladding portions 95 is sufficiently caused before the layer 910 is subjected to the second heat treatment and/or the third heat treatment, this step [5A] and/or the above step [4A] may be omitted.

Figure 5:
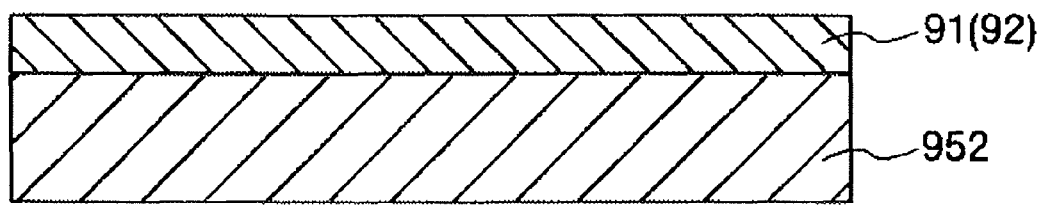
FIG. 5 is a sectional view schematically showing one process example of the first manufacturing method of the optical waveguide structure of the present invention.

[6A] Next, the cladding layer 91 (92) is formed on a supporting substrate 952 (see FIG. 5).

Examples of a forming method of the cladding layer 91 (92) include various methods such as a method in which a vanish containing a clad material (a cladding layer forming material) is applied onto the supporting substrate 952 and the same is cured (hardened) and a method in which a monomer composition having a curing property is applied onto the supporting substrate 952 and the same is cured (hardened).

In the case where the cladding layer 91 (92) is formed using an application method, examples of the application method include a spin coating method, a dipping method, a table coating method, a spraying method, an applicator method, a curtain coating method, a die coating method and the like.

As the supporting substrate 952, the same one as the supporting substrate 951 can be used.

As a constituent material of the cladding layer 91 (92), a material containing a norbornene-based polymer as a major component thereof is used. The norbornene-based polymer has excellent heat resistance. Therefore, by manufacturing the optical waveguide 90 using the norbornene-based polymer as a constituent material thereof, even if the optical waveguide 90 is heated when the conductor layers 901 and 902 are formed thereon, when the conductor layers 901 and 902 are processed to form wirings, when optical elements are mounted on the optical waveguide 90, or the like, it is possible to prevent deformation of the optical waveguide 90 due to softening of the cladding layer 91 (92).

Further, since the norbornene-based polymer has a high hydrophobic property, it is possible to obtain a cladding layer 91 (92) in which dimensional change or the like is hard to occur.

Furthermore, since the norbornene-based polymer and a norbornene-based monomer which is a raw material of the norbornene-based polymer are relatively inexpensive and accessible, they are preferably used.

Moreover, in the case where the material containing the norbornene-based polymer as the major component thereof is used as the constituent material of the cladding layer 91 (92), it becomes the same kind as the material to be preferably used as the constituent material of the core layer 93. Therefore, adhesion between the cladding layer 91 (92) and the core layer 93 is further improved so that delamination therebetween can be prevented. For this reason, it is possible to obtain an optical waveguide 90 having excellent durability.

Examples of such a norbornene-based polymer include addition-type polymers such as (1) an addition-type (co)polymer composed of molecules each obtained by addition (co) polymerization reaction between molecules of a norbornene-based monomer, (2) an addition-type copolymer composed of molecules each obtained by addition copolymerization reaction between the molecules of the norbornene-based monomer and molecules of ethylene or α-olefin, and (3) an addition-type copolymer composed of molecules each obtained by addition copolymerization reaction between the molecules of the norbornene-based monomer, molecules of non-conjugated diene, and, if needed, molecules of another monomer; and ring opening-type polymers such as (4) a ring opening-type norbornene-based (co)polymer or a (co)polymer obtained by hydrogenating, if needed, the ring opening-type norbornene-based (co)polymer, (5) a ring opening-type norbornene-based copolymer composed of molecules each obtained by ring opening copolymerization reaction between the molecules of the norbornene-based monomer and the molecules of the ethylene or α-olefin or a copolymer obtained by hydrogenating, if needed, the ring opening-type norbornene-based copolymer, and (6) a ring opening-type norbornene-based copolymer composed of molecules each obtained by ring opening copolymerization reaction between the molecules of the norbornene-based monomer and the molecules of the non-conjugated diene or another monomer or a copolymer obtained by hydrogenating, if needed, the ring opening-type norbornene-based copolymer. In this regard, examples of these copolymers include a random copolymer, a block copolymer, an alternating copolymer and the like.

These norbornene-based polymers can be obtained using various kinds of well known polymerizations such as ring opening metathesis polymerization (ROMP), a combination of ROMP and hydrogenation, polymerization via radicals or cations, polymerization using a cationic palladium polymerization initiator and polymerization using another polymerization initiator (e.g., a nickel polymerization initiator or another transition metal polymerization initiator).

Among them, it is preferable to use the addition-type norbornene-based (co)polymer. This is because the norbornene-based (co)polymer abounds in transparency, heat resistance and plasticity.

It is preferred that the norbornene-based polymer is composed of molecules each including norbornene repeating units, each of the norbornene repeating units having a substituent group including a polymerizable group. This makes it possible to cross-link the polymerizable groups of at least apart of the molecules of the norbornene-based polymer directly or via compounds of a cross-linking agent within the cladding layer 91 (92). Further, the molecules of the norbornene-based polymer and the molecules of the polymer 915 used for forming the core layer 93 can be cross-linked depending on kinds of the polymerizable group, kinds of the cross-linking agent, kinds of the polymer 915 used for forming the core layer 93 or the like. In other words, it is preferred that at least a part of the molecules of the norbornene-based polymer are cross-linked via the polymerizable groups.

As a result, it is possible to improve strength of the cladding layer 91 (92) itself and to improve the adhesion between the cladding layer 91 (92) and the core layer 93.

Examples of the polymerizable groups include an epoxy group, a (meth)acryl group, an alkoxysilyl group and a combination of two or more kinds of them, but the epoxy group is particularly preferable. This is because the epoxy group has high reactivity among various kinds of the polymerizable groups.

It is preferred that the norbornene-based polymer is composed of molecules each including alkyl norbornene repeating units. In this regard, it is to be noted that the alkyl group may be a linear type or a branched type. Since the norbornene-based polymer composed of the molecules each including the alkyl norbornene repeating units has high plasticity, use of such a norbornene-based polymer makes it possible to impart high flexibility to the optical waveguide 90.

since the norbornene-based polymer composed of the molecules each including the alkyl norbornene repeating units has excellent permeability for a light having a wavelength within the above mentioned long wavelength region (especially, near 850 nm), it is preferably used.

For these reasons, a norbornene-based polymer composed of molecules each represented by the following formula 19 is preferably used as the norbornene-based polymer to be used for forming the cladding layer 91 (92).

[formula 19]

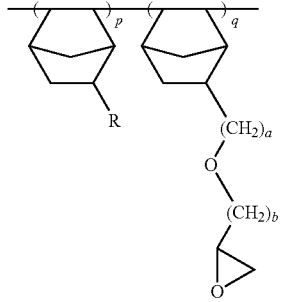

wherein R is an alkyl group having a carbon number of 1 to 10, "a" is an integer of 0 to 3, "b" is an integer of 1 to 3, and "p"/"q" is 20 or less.

Such a norbornene-based polymer has a relatively low refractive index in addition to the above properties. By forming the cladding layer 91 (92) using a material containing the norbornene-based polymer as a major component thereof, it is possible to further improve the optical transmission property of the optical waveguide 90.

In this regard, among the norbornene-based polymer composed of the molecules each represented by the above formula 19, a norbornene-based polymer composed of the molecules each represented by the above formula 19, in which R is an alkyl group having a carbon number of 4 to 10 ($C_4$-$C_{10}$) and each of "a" and "b" is 1, is preferable. Examples of such a norbornene-based polymer include a butyl norbornene/methyl glycidyl ether norbornene copolymer, a hexyl norbornene/methyl glycidyl ether norbornene copolymer, a decyl norbornene/methyl glycidyl ether norbornene copolymer, and the like.

Further, "p"/"q" has only to be 20 or less, but is preferably 15 or less, and more preferably in the range of about 0.1 to 10. This makes it possible to sufficiently exhibit the effect to be obtained by including two kinds of the norbornene repeating units.

In the norbornene-based polymers is composed of the molecules each including norbornene repeating units, each of the norbornene repeating units having the substituent group including the epoxy group, in the case where the epoxy groups are directly cross-linked, by mixing a substance like the above cocatalyst (that is, the photo acid generator or the photo base generator) with the cladding layer forming material, they may be cleaved and cross-linked under action of the substance.

Further, in the case where the epoxy groups are cross-linked via the cross-linking agent, a substance composed of molecules each having at least one epoxy group as the cross-linking agent may be mixed with the cladding layer forming material.

As such a substance (cross-linking agent), for example, 3-glycidoxy propyl trimethoxy silane (γ-GPS), silicone epoxy resin or the like is preferably used.

This cross-linking reaction of the epoxy groups may be carried out at a final stage of this step [6A] or after the optical waveguide 90 is obtained in the following step [7A].

Various kinds of additive may be added to (mixed with) the cladding layer forming material.

For example, as the additive, the monomer, the procatalyst and the cocatalyst each described in the core layer forming material may be mixed with the cladding layer forming material. This makes it possible to allow the molecules of the monomer to be reacted in the same manner as described above within the cladding layer 91 (92) to thereby change a refractive index thereof.

In this case, since it is not required that a refractive index difference between portions of the cladding layer 91 (92) is caused, a procatalyst which is easily activated by heating may be used without using the above cocatalyst.

Examples of such a procatalyst include [Pd(PCy$_3$)$_2$(O$_2$CCH$_3$)(NCCH$_3$)]tetrakis(pentafluorophenyl)borate, [2-methallyl Pd(PCy$_3$)$_2$]tetrakis(pentafluorophenyl)borate, [Pd(PCy$_3$)$_2$H(NCCH$_3$)]tetrakis(pentafluorophenyl)borate, [Pd(P(iPr)$_3$)$_2$(OCOCH$_3$)(NCCH$_3$)]tetrakis(pentafluorophenyl)borate, and the like.

Examples of another additive include the above mentioned anti-oxidizing agent. By mixing the anti-oxidizing agent with the cladding layer forming material, it is possible to prevent deterioration of the clad material (the norbornene-based polymer) due to oxidation thereof.

In this way, the cladding layer 91 (92) is formed on the supporting substrate 952.

Figure 6:
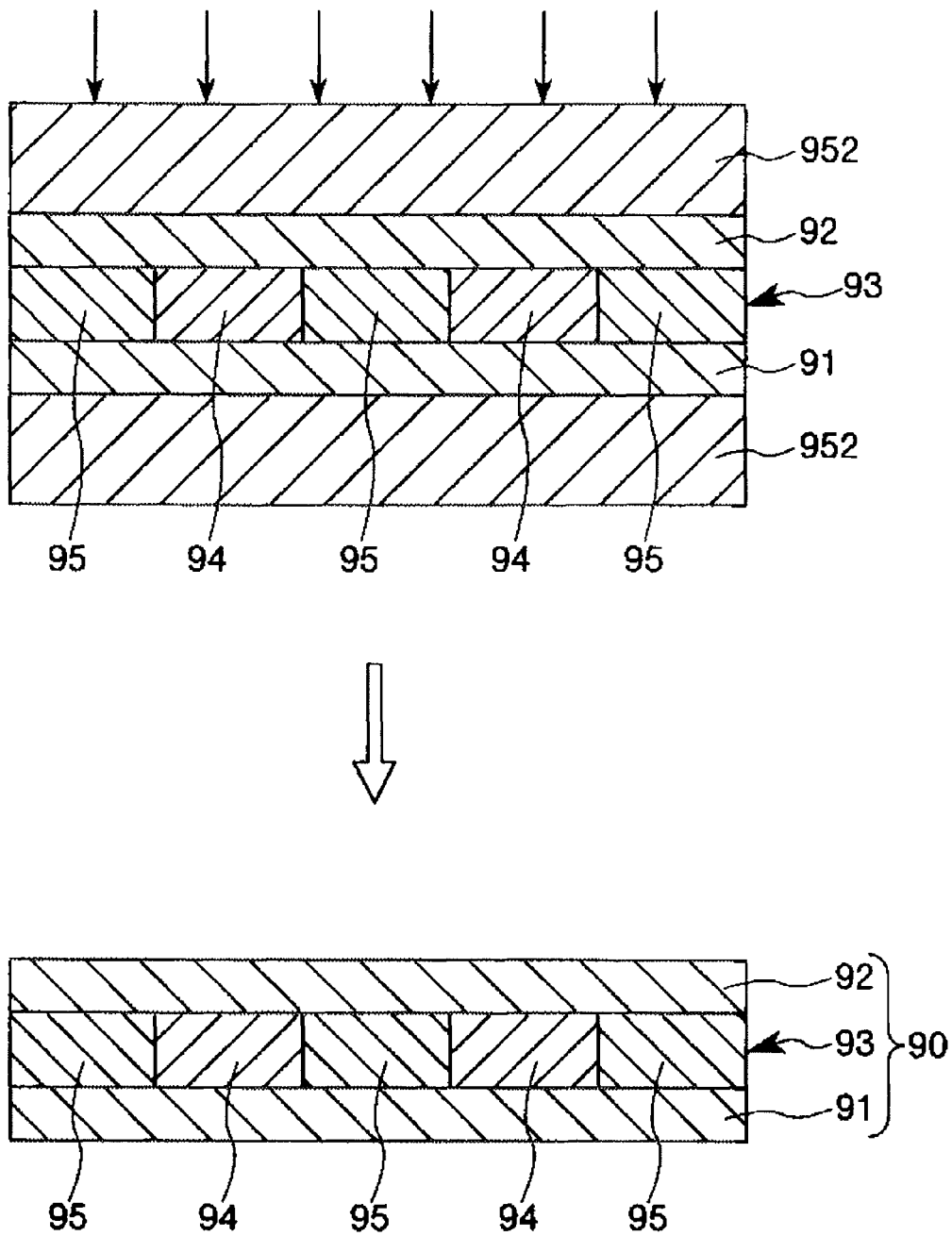
FIG. 6 is a sectional view schematically showing one process example of the first manufacturing method of the optical waveguide structure of the present invention.

[7A] Next, the core layer 93 is peeled off from the supporting substrate 951, and then it is put between the cladding layer 91 formed on the supporting substrate 952 and the cladding layer 92 formed on the supporting substrate 952 (see FIG. 6).

Thereafter, as shown using an arrow in FIG. 6, the supporting substrate 952 is compressed from an upper surface side thereof so that the cladding layers 91 and 92 and the core layer 93 are bonded together.

In this way, the cladding layers 91 and 92 and the core layer 93 are unified.

Further, it is preferred that this compressing operation is carried out under heating. A heating temperature is appropriately selected depending on the constitute materials of the cladding layers 91 and 92 and the core layer 93 or the like, but is, in general, preferably in the range of about 80 to 200° C., and more preferably in the range of about 120 to 180° C.

Next, the supporting substrates 952 are peeled off and removed from the cladding layers 91 and 92, respectively. In this way, the optical waveguide 90 of the present invention is obtained.

Figure 7:
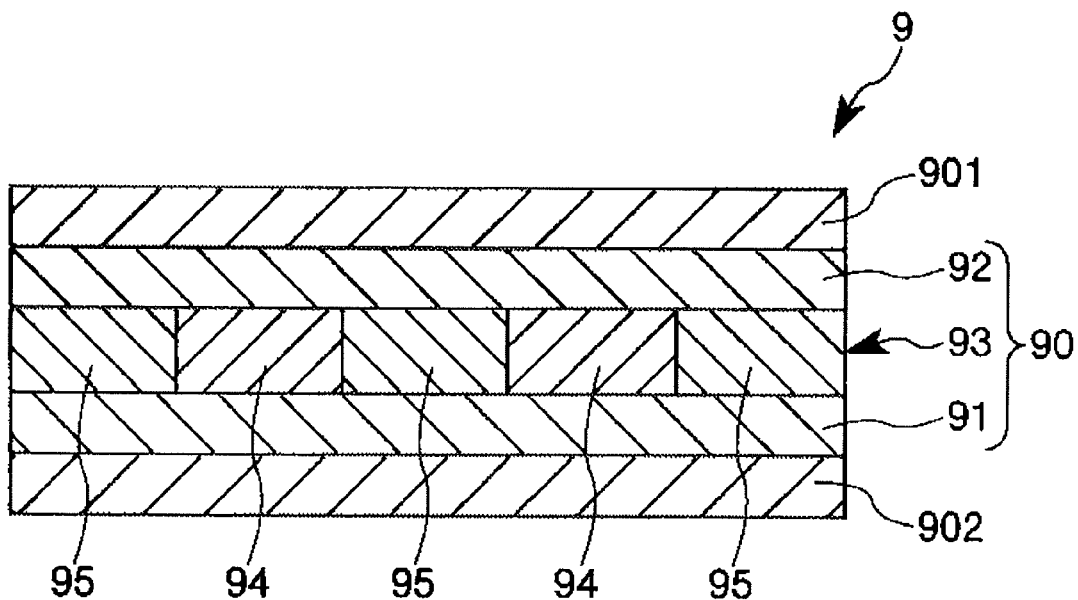
FIG. 7 is a sectional view schematically showing one process example of the first manufacturing method of the optical waveguide structure of the present invention.

[8A] Next, the conductor layers 901 and 902 are formed on upper and lower surfaces of the optical waveguide 90, respectively (see FIG. 7).

As a forming method of each of the conductor layers 901 and 902, it is possible to use at least one method selected from the group comprising a dry type plating method such as a chemical vapor phase deposition method (a CVD method) (e.g., a plasma CVD method, a thermal CVD method or a laser CVD method), a vacuum evaporation method, a sputtering method or an ion plating method; a wet type plating method such as an electrolysis plating method, an immersion plating method or an electroless deposition method; and a method in which a conductive sheet member is bonded to the optical waveguide 90 using a laminating method. Use of these methods makes it possible to high adhesion between the conductor layers 901 and 902 and the optical waveguide 90.

In this way, the optical waveguide structure 9 of the present invention is completed.

In preferred example of such an optical waveguide structure 9, in the core layer 93, each of the core portions 94 is formed of a first norbornene-based material as a major component thereof and each of the cladding portions 95 is formed of a second norbornene-based material having a refractive index lower than that of the first norbornene-based material as a major component thereof, and each of the cladding layers 91 and 92 is formed of a norbornene-based polymer having a refractive index lower than that of the first norbornene-based material (each of the core portions 94 of the core layer 93) as a major component thereof.

Here, each of the first and second norbornene-based materials contain an identical norbornene-based polymer having a refractive index and a reaction product of molecules of a norbornene-based monomer having a refractive index different from that of the norbornene-based polymer. However, the refractive indexes of the first and second norbornene-based materials are different from each other due to a difference between amounts of the reaction products of the molecules of the norbornene-based monomer contained therein.

The norbornene-based polymer has high transparency. Therefore, in the optical waveguide structure 9 having such a structure, the optical waveguide 90 can have a high optical transmission property.

Further, according to such a structure, it is possible to obtain not only high adhesion between the core portions 94 and the cladding portions 95 but also high adhesion between the core layer 93 and the cladding layers 91 and 92. Therefore, even if deformation of the optical waveguide structure 9 such as bending thereof occur, it is hard to cause peeling between the core portions 94 and the cladding portions 95 and delamination between the core layer 93 and the cladding layers 91 and 92, and it is possible to prevent occurrence of microcracks within the core portions 94 and the cladding portions 95. As a result, the optical transmission property of the optical waveguide 90 can be maintained.

In addition, since the norbornene-based polymer has high heat resistance and hydrophobicity, the optical waveguide 90 (the optical waveguide structure 9) having such a structure can have excellent durability.

Further, since the optical waveguide 90 can have the high heat resistance and hydrophobicity, it is possible to reliably form the conductor layers 901 and 902 thereon using the various kinds of methods described above while preventing the properties of the optical waveguide 90 from being lowered (deteriorated). Especially, even in the case where the conductor layers 901 and 902 are formed on the optical waveguide 90 so as to overlap the core portions 94 which are important portions for transmitting light, alteration or deterioration of each of the core portions 94 can be prevented.

Furthermore, according to the above manufacturing method, it is possible to obtain an optical waveguide structure 9 provided with core portions 94 each having a predetermined shape and high dimensional accuracy by carrying out an easy treatment in a short period of time.

<Second Manufacturing Method>

Next, a second manufacturing method of the optical waveguide structure 9 will be described.

Hereinafter, the second manufacturing method will be described by placing emphasis on points differing from the first manufacturing method, with the same matters omitted from description.

The second manufacturing method is the same as the first manufacturing method, except that a core layer forming material 900 having a different composition is used.

Namely, the core layer forming material 900 to be used in the second manufacturing method contains a cleaving agent (a substance) that is activated by being irradiated with actinic radiation, a polymer 915 composed of molecules each including a main chain and cleavable groups (cleavable pendant groups) each branching from the main chain and having a chemical structure in which at least a part of the chemical structure can be cleaved and removed from the main chain under action of the activated cleaving agent.

As the cleaving agent, the same substance as the cocatalyst described in the first manufacturing method can be used.

Examples of the polymer 915 to be used on the second manufacturing method include a polymer composed of molecules each obtained by substituting the substituent groups of the molecules of the polymer 915 described in the first manufacturing method with the cleavable groups, a polymer composed of molecules each obtained by introducing the cleavable groups into the molecules of the polymer 915 described in the first manufacturing method, and the like.

A refractive index of such a polymer 915 is changed (increased or lowered) due to cleavage (breakage) of the cleavable groups.

Each of the cleavable groups may be any one of an acid (cation) cleavable group which is cleaved under action of cations, a base (anion) cleavable group which is cleaved under action of anions and a free radical cleavable group which is cleaved under action of frees radical, but is preferably the acid cleavable group which is cleaved under the action of the cations (protons).

It is preferred that the acid cleavable group includes at least one of a chemical structure of —O—, a chemical structure of —Si-aryl and a chemical structure of —O—Si— in its molecular structure.

Among them, as the acid cleavable group whose cleavage lowers the refractive index of the polymer 915, a substituent group including at least one of a chemical structure of —Si-diphenyl and a chemical structure of —O—Si-diphenyl is preferable.

In this regard, examples of the free radical cleavable group which is cleaved under action of the free radicals include a substituent group having an acetophenone chemical structure at an end thereof, and the like.

For the same reason as described in the first manufacturing method, it is preferable to use the norbornene-based polymer as the polymer 915, and it is more preferable to use the norbornene-based polymer composed of the molecules each including alkyl norbornene repeating units (especially, hexyl norbornene repeating units) as the polymer 915.

In the light of the above matters, a diphenyl methyl norbornene methoxy silane homopolymer or a hexyl norbornene/diphenyl methyl norbornene methoxy silane copolymer can be preferably used as the polymer 915 whose refractive index is lowered due to cleavage of the cleavable groups.

Hereinafter, description will be made on a case that the polymer 915 whose refractive index is lowered due to the cleavage of the cleavable groups (especially, the acid cleavable groups) is used.

Namely, in this case, the irradiated regions 925 onto which the actinic radiation 930 has been irradiated become the cladding portions 95.

[1B] The same step as the step [1A] is carried out.

At this time, the layer (the dried film of the PITDM) 910 has the first refractive index (RI). This first refractive index is obtained under action of the polymer 915 dispersed (distributed) uniformly in the layer 910.

[2B] The same step as the step [2A] is carried out.

When the actinic radiation 930 is irradiated onto the layer 910 through the mask 935, compounds of the cleaving agent existing within each of the irradiated regions 925 onto which the actinic radiation 930 has been irradiated are reacted (bonded) or cleaved under the action of the actinic radiation 930, to thereby extricate (produce) the cations (the protons or the other positive ions) and the weakly coordinating anions (the WCAs).

At this time, the cations remove the cleavable groups themselves from the main chains of the molecules of the polymer 915, or cleave a middle portion of the chemical structure of each of the cleavable groups. This phenomenon is referred to as "photo breaching".

In each of the irradiated regions 925, the number of the cleavable groups, that have not been cleaved, is reduced as compared with that in each of the non-irradiated regions 925. As a result, the refractive index of each of the irradiated regions 925 is lowered up to a second refractive index lower than the first refractive index. At this time, each of the non-irradiated regions 940 maintains the first refractive index.

In this way, a refractive index difference between the irradiated regions 925 and the non-irradiated regions 940 (the second refractive index<the first refractive index) is caused. As a result, the core portions 94 (corresponding to the non-irradiated regions 940) and the cladding portions 95 (corresponding to the irradiated regions 925) are formed.

In this case, an exposure dose of the actinic radiation 930 is preferably in the range of about 0.1 to 9 J/cm$^2$, more preferably in the range of about 0.3 to 6 J/cm$^2$, and even more preferably in the range of about 0.6 to 6 J/cm$^2$. This makes it possible to reliably activate the cleaving agent.

[3B] Next, the layer 910 is subjected to a heat treatment.

At this time, for example, the cleavable groups cleaved (broken) and removed from the main chains of the molecules of the polymer 915 are eliminated from each of the irradiated regions 925, or rearranged or cross-linked in the polymer 915.

In addition, it may be conceived that a part of the cleavable groups remaining within each of the cladding portions 95 (the irradiated regions 925) are further cleaved (broken) at this time.

Therefore, by subjecting the layer 910 to such a heat treatment, it is possible to further increase the refractive index difference between the core portions 94 and the cladding portions 95.

A heating temperature in the heat treatment is not particularly limited to a specific value, but is preferably in the range of about 70 to 195° C., and more preferably in the range of about 85 to 150° C.

Further, a heating time in the heat treatment is set so as to sufficiently eliminate the cleavable groups cleaved (broken) and removed from the main chains of the molecules of the polymer 915 from each of the irradiated regions 925, and is not particularly limited to a specific value. However, the heating time is preferably in the range of about 0.5 to 3 hours, and more preferably in the range of about 0.5 to 2 hours.

In this regard, it is to be noted that in the case where the refractive index difference between the core portions 94 and the cladding portions 95 is sufficiently caused before the layer 910 is subjected to the heat treatment, this step [3B] may be omitted.

Further, if needed, one heat treatment or multiple heat treatments may be additionally carried out. In this regard, a single heat treatment is carried out under a condition of, for example, about 150 to 200° C.×1 to 8 hours.

Through the above steps, the core layer 93 is obtained.

[4B] The same step as the step [6A] is carried out.

[5B] The same step as the step [7A] is carried out.

[6B] The same step as the step [8A] is carried out.

In this way, the optical waveguide structure 9 of the present invention is completed.

In preferred example of such an optical waveguide structure 9, the core layer 93 is formed of a norbornene-based material as a major component thereof, and each of the cladding layers 91 and 92 is formed of a norbornene-based material having a refractive index lower than that of each of the core portions 94 of the core layer 93 as a major component thereof.

Here, each of the core portions 94 and the cladding portions 95 are formed of a norbornene-based polymer composed of molecules each including a main chain and cleavable groups each branching from the main chain and having a chemical structure in which at least a part of the chemical structure can be cleaved and removed from the main chain, as a major component thereof. The refractive indexes of the core portions 94 and the cladding portions 95 are different from each other due to a difference between the numbers of the cleavable groups, that have not been cleaved, in the norbornene-based polymers contained therein.

The norbornene-based polymer has high transparency. Therefore, in the optical waveguide structure 9 having such a structure, the optical waveguide 90 can have a high optical transmission property.

Further, according to such a structure, it is possible to obtain not only high adhesion between the core portions 94 and the cladding portions 95 but also high adhesion between the core layer 93 and the cladding layers 91 and 92. Therefore, even if deformation of the optical waveguide structure 9 such as bending thereof occur, it is hard to cause peeling between the core portions 94 and the cladding portions 95 and delamination between the core layer 93 and the cladding layers 91 and 92, and it is possible to prevent occurrence of microcracks within the core portions 94 and the cladding portions 95. As a result, the optical transmission property of the optical waveguide 90 can be maintained.

In addition, since the norbornene-based polymer has high heat resistance and hydrophobicity, the optical waveguide 90 (the optical waveguide structure 9) having such a structure can have excellent durability.

Further, since the optical waveguide 90 can have the high heat resistance and hydrophobicity, it is possible to reliably form the conductor layers 901 and 902 thereon using the various kinds of methods described above while preventing the properties of the optical waveguide 90 from being lowered (deteriorated). Especially, even in the case where the conductor layers 901 and 902 are formed on the optical waveguide 90 so as to overlap the core portions 94 which are important portions for transmitting light, alteration or deterioration of each of the core portions 94 can be prevented.

Furthermore, according to the above manufacturing method, it is possible to obtain an optical waveguide structure 9 provided with core portions 94 each having a predetermined shape and high dimensional accuracy by carrying out an easy treatment in a short period of time.

Especially, according to the second manufacturing method, the core layer 93 can be formed by at least irradiating the actinic radiation 930 onto the layer 910, that is, it can be obtained using a very easy treatment.

<Third Manufacturing Method>

Next, a third manufacturing method of the optical waveguide structure 9 will be described.

Hereinafter, the third manufacturing method will be described by placing emphasis on points differing from the first and second manufacturing methods, with the same matters omitted from description.

The third manufacturing method is the same as the first and second manufacturing methods, except that as a core layer forming material 900, the core layer forming material 900 used in the first manufacturing method and the core layer forming material 900 used in the second manufacturing method are used in combination.

Namely, the core layer forming material 900 to be used in the third manufacturing method contains the polymer 915 composed of the molecules each having the above mentioned cleavable groups, the monomer, the cocatalyst (the first substance) and the procatalyst (the second substance). Further, the cocatalyst is the same substance as the cleaving agent described in the second manufacturing method and has a function of cleaving the cleavable groups.

According to such a core layer forming material 900, by combining the cleavable groups and the monomer each appropriately selected, it is possible to adjust a refractive index difference between the core portions 94 and the cladding portions 95 of the obtained core layer 93 in a multistep manner.

As described above, in the case where the monomer each having the refractive index lower than that of the polymer 915, the procatalyst whose activation temperature is lowered by being irradiated with the actinic radiation 930, and the polymer 915 whose refractive index is lowered due to the cleavage of the cleavable groups are used, respectively, the irradiated regions 925 can become the cladding portions 95. Further, in this case, it is possible to obtain a core layer 93 including cladding portions 95 each having a refractive index vastly different from that of each of core portions 94.

Hereinafter, description will be made on a case that such a polymer 915, monomer and procatalyst are used in combination.

Namely, in this case, the irradiated regions 925 onto which the actinic radiation 930 has been irradiated become the cladding portions 95.

[1C] The same step as the step [1A] is carried out.

At this time, the layer (the dried film of the PITDM) 910 has the first refractive index (RI). This first refractive index is obtained under action of the polymer 915 and the monomer dispersed (distributed) uniformly in the layer 910.

[2C] The same step as the step [2A] is carried out.

When the actinic radiation 930 is irradiated onto the layer 910 through the mask 935, the compounds of the cocatalyst (the first substance) existing within each of the irradiated regions 925 onto which the actinic radiation 930 has been irradiated are reacted or cleaved under the action of the actinic radiation 930, to thereby extricate (produce) the cations (the protons or the other positive ions) and the weakly coordinating anions (WCAs).

At this time, the cations or the weakly coordinating anions change (cleave) the chemical structures of the compounds of the procatalyst (the second substrate) existing within each of the irradiated regions 925. As a result, the procatalyst is brought into the active but latent state (the latent active state).

Further, at this time, the cations remove the cleavable groups themselves from the main chains of the molecules of the polymer 915, or cleave a middle portion of the chemical structure of each of the cleavable groups.

In each of the irradiated regions 925, the number of the cleavable groups, that have not been cleaved, is reduced as compared with that in each of the non-irradiated regions 925. As a result, the refractive index of each of the irradiated regions 925 is lowered up to the second refractive index lower than the first refractive index. At this time, each of the non-irradiated regions 940 maintains the first refractive index.

In this case, an exposure dose of the actinic radiation 930 is preferably in the range of about 0.1 to 9 $J/cm^2$, more preferably in the range of about 0.2 to 5 $J/cm^2$, and even more preferably in the range of about 0.2 to 4 $J/cm^2$. This makes it possible to reliably activate the cocatalyst.

[3C] The same step as the step [3A] is carried out.

At this time, the procatalyst in the active but latent state is activated (brought into the active state) within each of the irradiated regions 925, as a result of which the molecules of the monomer are reacted (polymerized or cross-linked) due to the activation of the procatalyst.

When the reaction of the molecules of the monomer progresses within each of the irradiated regions 925, the concentration of the monomer therein is gradually lowered. In this way, the difference between the concentration of the monomer in each of the irradiated regions 925 and the concentration of the monomer in each of the non-irradiated regions 940 is caused. In order to eliminate the difference, the monomer contained in each of the non-irradiated regions 940 is diffused and assembled to each of the irradiated regions 925.

Further, by this heat treatment, for example, the cleavable groups cleaved (broken) and removed from the main chains of the molecules of the polymer 915 are eliminated from each of the irradiated regions 925, or rearranged or cross-linked in the polymer 915.

As a result, the molecules of the monomer and/or the reaction product thereof (the polymeric molecules, the cross-linking chemical structures or the branching chemical structures) are increased within each of the irradiated regions 925. The chemical structures each derived from the molecules of the monomer remarkably have the effect on the refractive index of each of the irradiated regions 925. Further, the cleavable groups cleaved (broken) and removed from the main chains of the molecules of the polymer 915 are reduced within each of the irradiated regions 925. For these reasons, the refractive index of each of the irradiated regions 925 is lowered up to the second refractive index which is lower than the first refractive index.

On the other hand, since the monomer is diffused from each of the non-irradiated regions 940 to each of the irradiated regions 925, an amount of the molecules of the monomer contained in each of the non-irradiated regions 940 is lowered. The molecules of the polymer 915 remarkably have the effect on the refractive index of each of the non-irradiated regions 940 so that it is increased up to the third refractive index which is higher than the first refractive index.

In this way, the refractive index difference between the irradiated regions 925 and the non-irradiated regions 940 (the second refractive index<the third refractive index) is caused. As a result, the core portions 94 (corresponding to the non-irradiated regions 940) and the cladding portions 95 (corresponding to the irradiated regions 925) are formed.

[4C] The same step as the step [4A] is carried out.
[5C] The same step as the step [5A] is carried out.
[6C] The same step as the step [6A] is carried out.
[7C] The same step as the step [7A] is carried out.
[8C] The same step as the step [8A] is carried out.

In this way, the optical waveguide structure 9 of the present invention is completed.

In preferred example of such an optical waveguide structure 9, the core layer 93 contains the norbornene-based polymer composed of the molecules each including the main chain and the cleavable groups each branching from the main chain and having the chemical structure in which at least a part of the chemical structure can be cleaved and removed from the main chain. The refractive indexes of the core and cladding portions 94 and 95 are different from each other due to a difference between the numbers of the cleavable groups, that have not been cleaved, in the molecules of the norbornene-based polymers contained therein and a difference between the amounts of the reaction products of the molecules of the norbornene-based polymers contained therein. Further, each of the cladding layers 91 and 92 is formed of the norbornene-based polymer having the refractive index lower than that of each of the core portions 94 of the core layer 93 as the major component thereof.

The norbornene-based polymer has high transparency. Therefore, in the optical waveguide structure 9 having such a structure, the optical waveguide 90 can have a high optical transmission property.

Further, according to such a structure, it is possible to obtain not only high adhesion between the core portions 94 and the cladding portions 95 but also high adhesion between the core layer 93 and the cladding layers 91 and 92. Therefore, even if deformation of the optical waveguide structure 9 such as bending thereof occur, it is hard to cause peeling between the core portions 94 and the cladding portions 95 and delamination between the core layer 93 and the cladding layers 91 and 92, and it is possible to prevent occurrence of microcracks within the core portions 94 and the cladding portions 95. As a result, the optical transmission property of the optical waveguide 90 can be maintained.

In addition, since the norbornene-based polymer has high heat resistance and hydrophobicity, the optical waveguide 90 (the optical waveguide structure 9) having such a structure can have excellent durability.

Further, since the optical waveguide 90 can have the high heat resistance and hydrophobicity, it is possible to reliably form the conductor layers 901 and 902 thereon using the various kinds of methods described above while preventing the properties of the optical waveguide 90 from being lowered (deteriorated). Especially, even in the case where the conductor layers 901 and 902 are formed on the optical waveguide 90 so as to overlap the core portions 94 which are important portions for transmitting light, alteration or deterioration of each of the core portions 94 can be prevented.

Furthermore, according to the above manufacturing method, it is possible to obtain an optical waveguide structure 9 provided with core portions 94 each having a predetermined shape and high dimensional accuracy by carrying out an easy treatment in a short period of time.

Especially, according to the third manufacturing method, it is possible to set the refractive index difference between the core portions 94 and the cladding portions 95 in a multistep manner.

<Fourth Manufacturing Method>

Next, a fourth manufacturing method of the optical waveguide structure 9 will be described.

FIGS. 8 to 13 are sectional views schematically showing one process example of a fourth manufacturing method of the optical waveguide structure of the present invention.

Hereinafter, the fourth manufacturing method will be described by placing emphasis on points differing from the first to third manufacturing methods, with the same matters omitted from description.

The fourth manufacturing method is the same as the first to third manufacturing methods, except that forming steps of the optical waveguide 90 are different from those of the first to third manufacturing methods.

Namely, as the core layer forming material 900 and the cladding layer forming material, the same ones as described in the first to third manufacturing methods can be used, respectively.

Hereinafter, description will be made on a case that the core layer forming material 900 described in the first manufacturing method is used.

Figure 8:
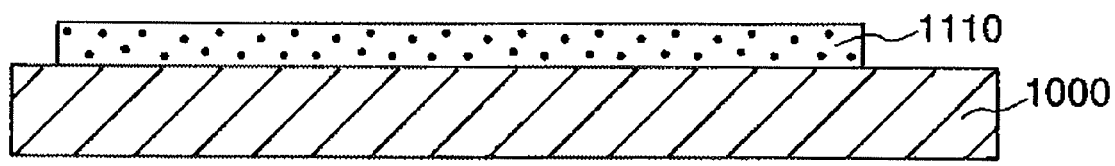
FIG. 8 is a sectional view schematically showing one process example of a fourth manufacturing method of the optical waveguide structure of the present invention.

[1D] First, the cladding layer forming material (a first varnish) is applied onto a supporting substrate 1000 using the same method as described above, to thereby form a first layer 1110 on the supporting substrate 1000 (see FIG. 8).

As the supporting substrate 1000, the same one as the supporting substrate 951 can be used.

An average thickness of the first layer 1110 is not particularly limited to a specific value, but is preferably in the range of about 5 to 200 μm, more preferably in the range of about 10 to 100 μm, and even more preferably in the range of about 15 to 65 μm.

Figure 9:
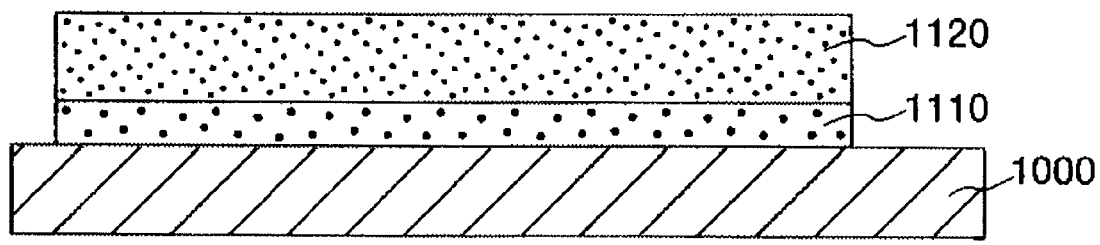
FIG. 9 is a sectional view schematically showing one process example of the fourth manufacturing method of the optical waveguide structure of the present invention.

[2D] Next, the core layer forming material 900 (a second varnish) is applied onto the first layer 1110 using the same method as described above, to thereby form a second layer 1120 on the first layer 1110 (see FIG. 9).

The core layer forming material 900 may be applied onto the first layer 1110 after the first layer 1110 is substantially completely dried or before it is dried.

In the latter case, the first layer 1110 and the second layer 1120 are mixed together in a boundary face therebetween. This makes it possible to improve adhesion between the cladding layer 91 and the core layer 93 in the obtained optical waveguide 90.

Further, in this case, a viscosity (at normal temperature) of each of the first varnish and the second varnish is preferably set to a range of about 100 to 10,000 cP, more preferably to a range of about 150 to 5,000 cP, and even more preferably to a range of about 200 to 3,500 cP. This makes it possible to prevent the first layer 1110 and the second layer 1120 from being needlessly mixed together in the boundary face therebetween and to prevent the first layer 1110 and the second layer 1120 from having unevenness thicknesses.

In this regard, it is preferred that the viscosity of the second varnish is higher than that of the first varnish. This makes it is possible to reliably prevent the first layer 1110 and the second layer 1120 from being needlessly mixed together in the boundary face therebetween.

An average thickness of the second layer 1120 is not particularly limited to a specific value, but is preferably in the range of about 5 to 200 μm, more preferably in the range of about 15 to 125 μm, and even more preferably in the range of about 25 to 100 μm.

Figure 10:
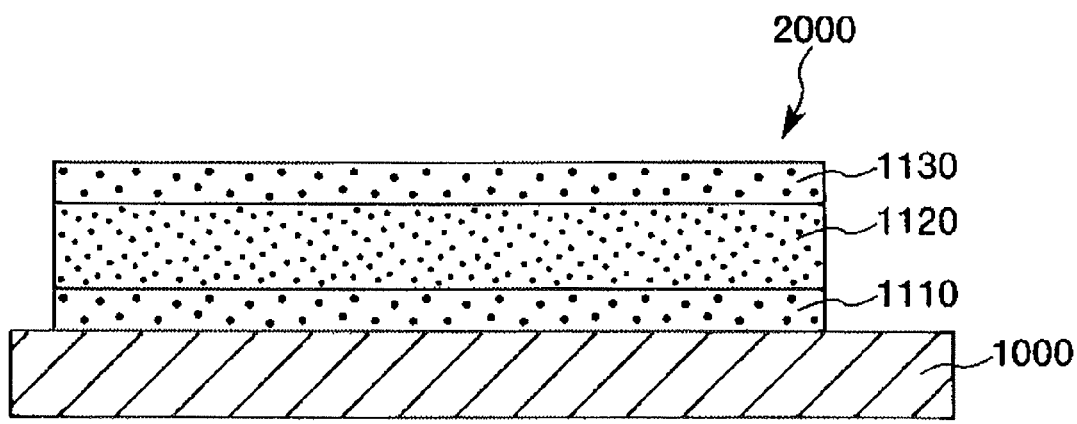
FIG. 10 is a sectional view schematically showing one process example of the fourth manufacturing method of the optical waveguide structure of the present invention.

[3D] Next, the cladding layer forming material (a third varnish) is applied onto the second layer 1120 using the same method as described above, to thereby form a third layer 1130 on the second layer 1120 (see FIG. 10).

The third layer 1130 can be formed in the same manner as the second layer 1120.

An average thickness of the third layer 1130 is not particularly limited to a specific value, but is preferably in the range of about 5 to 200 μm, more preferably in the range of about 10 to 100 μm, and even more preferably in the range of about 15 to 65 μm.

In this way, a laminated body 2000 is obtained.

[4D] Next, a solvent contained in the laminated body 2000 is removed (desolvated) therefrom.

Examples of a method of desolvating the solvent include a method of heating the laminated body 2000, a method of placing the laminated body 2000 under an atmosphere or reduced pressure condition or a method of blowing inert gas to the laminated body 2000, and the like, but it is preferred that the method of heating the laminated body 2000 is used. By using such a method, it is possible to desolvate the solvent from the laminated body 2000 relatively easily in a short period of time.

In this case, a heating temperature is preferably in the range of about 25 to 60° C., and more preferably in the range of about 30 to 45° C.

Further, a heating time is preferably in the range of about 15 to 60 minutes, and more preferably in the range of about 15 to 30 minutes.

Figure 11:
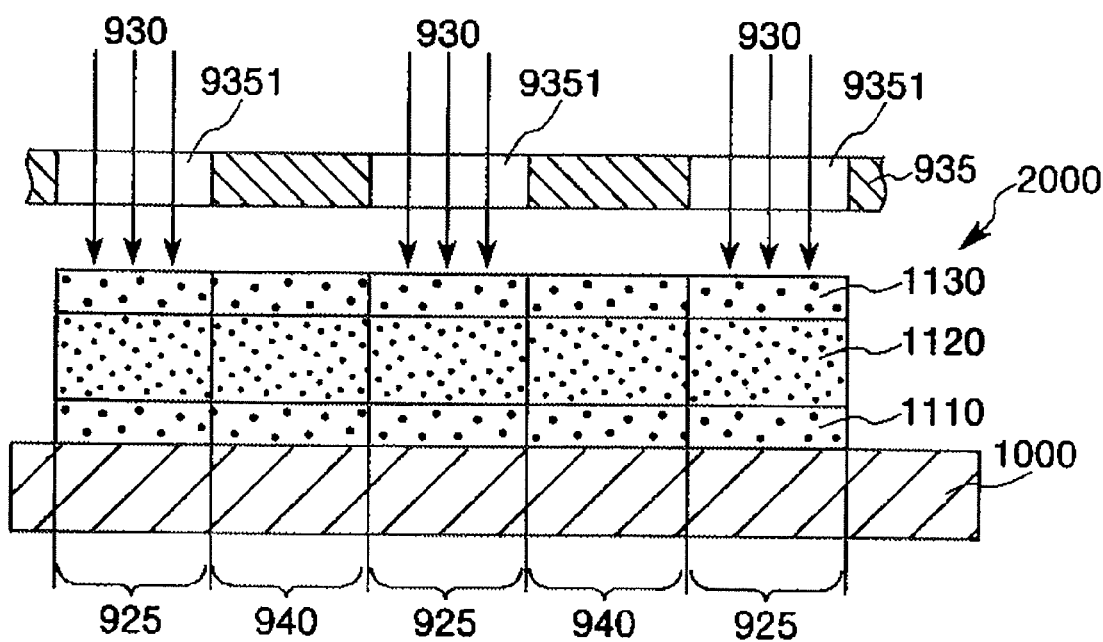
FIG. 11 is a sectional view schematically showing one process example of the fourth manufacturing method of the optical waveguide structure of the present invention.
Figure 12:
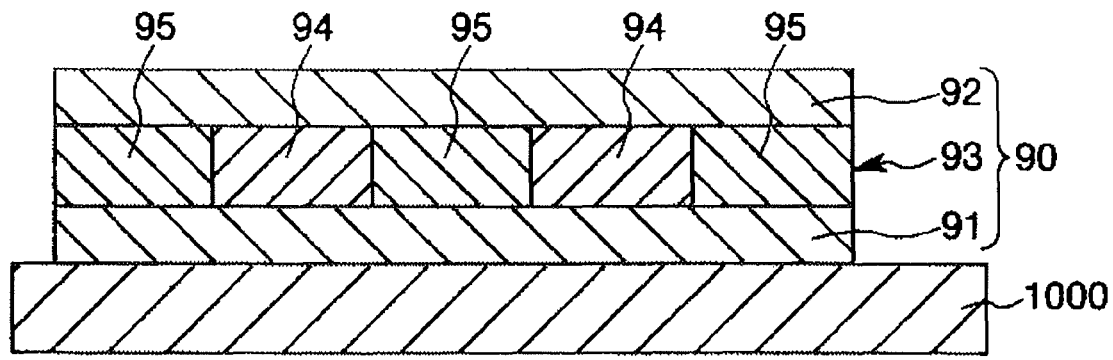
FIG. 12 is a sectional view schematically showing one process example of the fourth manufacturing method of the optical waveguide structure of the present invention.

[5D] Next, the mask (the masking) 935 provided with the openings (the windows) 9351 is prepared, and then the actinic radiation (the activated energy beam) 930 is irradiated onto the laminated body 2000 through the mask 935 (see FIG. 11).

When the actinic radiation 930 is irradiated onto the laminated body 2000 through the mask 935, the compounds of the cocatalyst (the first substance) existing within each of the irradiated regions 925 of the second layer 1120 onto which the actinic radiation 930 has been irradiated are reacted or cleaved under the action of the actinic radiation 930 to thereby extricate (produce) the cations (the protons or the other positive ions) and the weakly coordinating anions (the WCAs).

At this time, the cations or the weakly coordinating anions change (cleave) the chemical structures of the compounds of the procatalyst (the second substrate) existing within each of the irradiated regions 925. As a result, the procatalyst is brought into the active but latent state (the latent active state).

[6D] Next, the laminated body 2000 is subjected to the heat treatment (the first heat treatment).

At this time, the procatalyst in the active but latent state is activated (brought into the active state) within each of the irradiated regions 925, as a result of which the molecules of the monomer are reacted (polymerized or cross-linked) due to the activation of the procatalyst.

When the reaction of the molecules of the monomer progresses within each of the irradiated regions 925, the concentration of the monomer therein is gradually lowered. In this way, the difference between the concentration of the monomer in each of the irradiated regions 925 and the concentration of the monomer in each of the non-irradiated regions 940 is caused. In order to eliminate the difference, the monomer contained in each of the non-irradiated regions 940 is diffused and assembled to each of the irradiated regions 925.

As a result, the molecules of the monomer and/or the reaction product thereof (the polymeric molecules, the cross-linking chemical structures or the branching chemical structures) are increased within each of the irradiated regions 925. The chemical structures each derived from the molecules of the monomer remarkably have the effect on the refractive index of each of the irradiated regions 925 so that it is lowered up to the second refractive index lower than the first refractive index.

On the other hand, since the monomer is diffused from each of the non-irradiated regions 940 to each of the irradiated regions 925, the amount of the molecules of the monomer contained in each of the non-irradiated regions 940 is lowered. The molecules of the polymers 915 remarkably have the effect on the refractive index of each of the non-irradiated regions 940 so that it is increased up to the third refractive index higher than the first refractive index.

In this way, the refractive index difference between the irradiated regions 925 and the non-irradiated regions 940 (the second refractive index<the third refractive index) is caused. As a result, the core portions 94 (corresponding to the non-irradiated regions 940) and the cladding portions 95 (corresponding to the irradiated regions 925) are formed (see FIG. 12).

[7D] Next, the laminated body 2000 is subjected to the second heat treatment.

By doing so, the procatalyst remaining in each of the irradiated regions 925 and each of the non-irradiated regions 940 is activated (brought into the active state) directly or via the activation of the cocatalyst. As a result, the molecules of the monomer remaining in each of the irradiated and non-irradiated regions 925 and 940 are reacted.

In this way, by reacting the molecules of the monomer remaining in each of the irradiated and non-irradiated regions 925 and 940, it is possible to stabilize the obtained core portions 94 and cladding portions 95.

[8D] Next, the laminated body 2000 is subjected to the third heat treatment.

This makes it possible to reduce internal stress which would occur in the obtained core layer 93 and to further stabilize the core portions 94 and cladding portions 95.

Through the above steps, the optical waveguide 90 is obtained.

Figure 13:
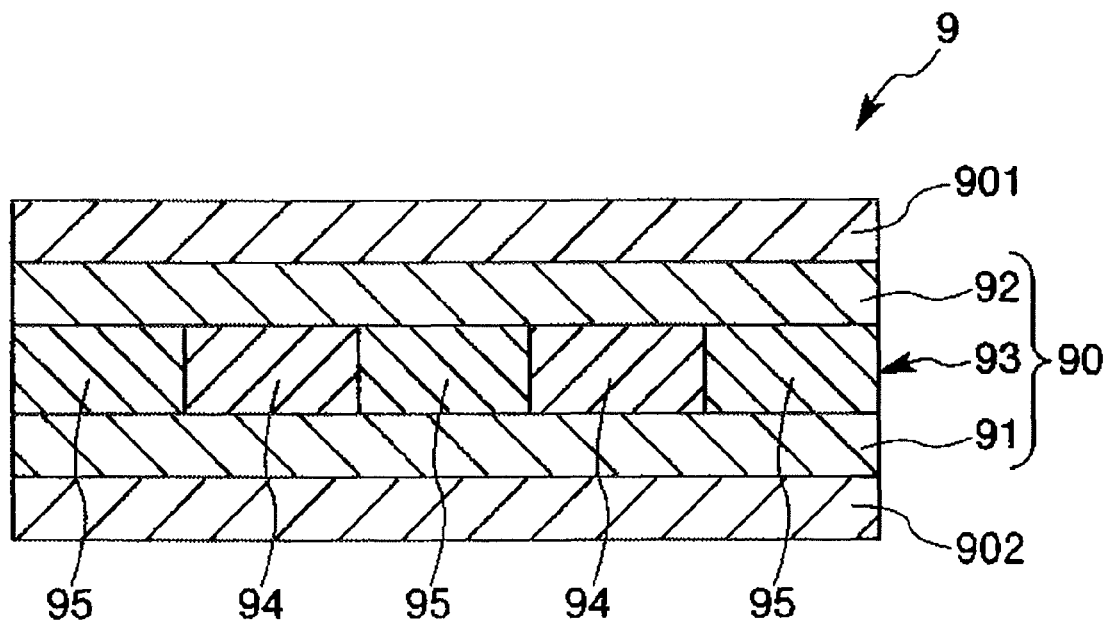
FIG. 13 is a sectional view schematically showing one process example of the fourth manufacturing method of the optical waveguide structure of the present invention.

[9D] Next, the conductor layers 901 and 902 are formed on the upper and lower surfaces of the optical waveguide 90, respectively (see FIG. 13).

This step is carried out in the same manner as in the step [8A].

In this way, the optical waveguide structure 9 of the present invention is completed.

According to such a method, after the first heat treatment is carried out, the core portions 94 can be identified through a visual observation within the laminated body 2000.

Further, as the first varnish and the third varnish, a varnish having the same composition as the second varnish, that is, a varnish containing the polymer 915, the monomer, the cocatalyst and the procatalyst may be used. In this case, the molecules of the monomer are reacted in boundary faces between the first layer 1110 and the second layer 1120 and between the third layer 1130 and the second layer 1120 and/or within the first and third layers 1110 and 1130 beyond the boundary faces. As a result, it is possible to prevent occurrence of peeling between the first layer 1110 (the cladding layer 91) and the second layer 1120 (the core layer 93) and occurrence of peeling between the third layer 1130 (the cladding layer 92) and the second layer 1120 (the core layer 93).

Further, in this case, it is preferred that I: the polymer 915 to be used for the first layer 1110 and the third layer 1130 has a refractive index (RI) relatively lower than that of the polymer 915 to be used for the second layer 1120, or II: even if the monomer to be used for the first layer 1110 and the third layer 1130 is the same as the monomer to be used for the second layer 1120, the amounts of the procatalyst and the monomer contained in the first layer 1110 and the third layer 1130 are lower than those of the procatalyst and the monomer contained in the second layer 1120.

By doing so, it is possible to prevent generation of regions each having a refractive index higher than that of each of the core portions 94 of the core layer 93 within the cladding layers 91 and 92 even if the actinic radiation 930 is irradiated on the second layer 1120 through the first and third layers 1110 and 1130.

In the case where the core layer forming material (the second varnish) containing the polymer 915 composed of the molecules each having the cleavable groups is used, either a cladding layer forming material (the first varnish or the third varnish) containing a polymer 915 composed of molecules each having no cleavable group or a cladding layer forming material containing the polymer 915 composed of the molecules each having the cleavable groups, but containing no cleaving agent may be used.

This makes it possible to prevent the cleavable groups from being cleaved (broken) and removed from the main chains of the molecules of the polymer 915.

Further, in the fourth manufacturing method, it is preferred that the first and third varnishes each containing a norbornene-based polymer composed of molecules each having a substituent group including an epoxy chemical structure at an end thereof and the cocatalyst are used. In this case, when the core portions 94 and the cladding portions 95 are formed, the epoxy chemical structures are cleaved and reacted (polymerized) with the molecules of the polymer 915. This makes it possible to improve adhesion between the core layer 93 and the cladding layer 91 and adhesion between the core layer 93 and the cladding layer 92.

Examples of such a norbornene-based polymer include a hexyl norbornene (HxNB)/methyl glycidyl ether norbornene (AGENB) copolymer and the like.

Further, in this case, a cocatalyst that is not activated when the core layer 93 is formed may be used. As such a cocatalyst, a cocatalyst that does not absorb the actinic radiation suitable to activate the cocatalyst contained in the second varnish or a cocatalyst that can be activated under action of heat instead of the actinic radiation has only to be selected.

Examples of such a cocatalyst include a non-absorbing photo base generator (referred to as "PBG"), a thermal base generator (referred to as "TBG") and the like.

In the optical waveguide structure 9 described above, the core portions 94 have been patterned using the simple method, the irradiation of the actinic radiation. Therefore, it is possible to widen design freedom of the pattern shape of each of the core portions 94 (an optical circuit) and to obtain core portions 94 having high dimensional accuracy.

Further, since the conductor layers 901 and 902 have been, in advance, formed, it is possible to easily wire to elements (to easily form an electrical circuit). Further, it is also possible to appropriately wire various elements regardless of kinds thereof (e.g., positions where terminals are to be provided). In other words, it is possible to freely vary a constitution of the electrical circuit (e.g., the positions where terminals are to be provided). Such an optical waveguide structure 9 has a multiplicity of uses.

In addition, since the optical waveguide structure 9 can have both wirings (the electrical circuit) and core portions 94 (the optical circuit) each formed in a high density, it is possible to effectively make a circuit design of an optical and electrical hybrid circuit and to achieve a high integration thereof.

In the present invention, it is possible to widen design freedom of the optical circuit (the pattern of the optical waveguide) and the electrical circuit, and to manufacture the optical waveguide structure 9 in a high yield rate. Such an optical waveguide structure 9 can maintain the high optical transmission property, have excellent reliability and durability, and have a multiplicity of uses. Therefore, the optical waveguide structure 9 can be employed to various kinds of electronic components, electronic equipments and the like.

In this regard, the supporting substrates 951, 952 and 1000 are removed from the optical waveguide 90 in all the first to fourth manufacturing methods, but in the case where the supporting substrates 951, 952 and 1000 are formed of conductive materials, they are not removed from the optical waveguide 90 and may be directly used as the conductor layers 901 and 902.

Further, if needed, one of or both the cladding layers 91 and 92 may be omitted.

Furthermore, it goes without saying that the forming method of the core layer 93 is not limited to the above mentioned method.

Further, the structure of the optical waveguide 90 is not limited to one described in the FIGs. For example, the optical waveguide 90 may have a structure including two cladding layers and a plurality of core layers laminated together and provided between the cladding layers, a structure including cladding layers and core layers alternately laminated together, a structure including a plurality of laminated bodies, in which a single core layer is provided between two cladding layers, laminated together, or the like.

Further, an inclined plane (a reflective surface) which inclines at about 45° with respect to an optical path, that is, a longitudinal direction of the core portion 94 may be formed in a middle portion thereof. This makes it possible to inflect a direction of light (transmission light) transmitted along the core portion 94 by about 90° due to reflection of the light on the inclined plane.

In this case, by appropriately setting a direction which the inclined plane faces, the optical path of the transmission light can be changed not only within the core layer 90 (to two-dimensional directions) but also to three-dimensional directions including a thickness direction of the optical waveguide 90.

This inclined plane can be formed by cutting or removing (deleting) apart of the core portion 94. In addition, a reflective film such as a multilayer optical film, a metal thin film (e.g., an aluminum vapor deposition film) or the like or a reflective enhanced film may be formed on the inclined plane.

Although the optical waveguide and the optical waveguide structure according to the present invention have been described above based on the embodiments illustrated in the drawings, the present invention is not limited thereto. individual components constituting the optical waveguide and the optical waveguide structure may be replaced by other arbitrary components that can exhibit similar functions. Further, arbitrary components may be added to the optical waveguide and the optical waveguide structure.

EXAMPLES

Next, description will be made on a number of concrete examples of the present invention.

The following description will occasionally abbreviate hexyl norbornene (CAS 22094-83-3) as "HxNB", diphenyl methyl norbornene methoxysilane (CAS 376634-34-3) as "diPhNB", phenyl ethyl norbornene (CAS 29415-09-6) as "PENB", butyl norbornene (CAS 22094-81-1) as "BuNB", decyl norbornene (CAS 22094-85-5) as "DeNB", benzyl norbornene (CAS 265989-73-9) as "BzNB", methyl glycidyl ether norbornene (CAS 3188-75-8) as "AGENB", norbornenyl ethyl trimethoxy silane (CAS 68245-19-2) as "TMSENB", triethoxy silyl norbornene (CAS 18401-43-9) as "TESNB", trimethoxysilylnorbornene (CAS 7538-46-7) as "TMSNB", dimethyl bis(norbornene methoxy)silane (CAS 376609-87-9) as "SiX", and 1,1,3,3-tetramethyl-1,3-bis[2-(5-norbornene-2-yl)ethyl]disiloxane (CAS 198570-39-7) as "$Si_2X$", respectively.

1. Synthesis of Polymer and Preparation of Polymer Solution

Polymers P1 to P5 were synthesized, and polymer solutions each containing one of the polymers P1 to P5 was prepared.

<<Polymer P1: Synthesis of Butyl Norbornene (BuNB)/Methyl Glycidyl Ether Norbornene (AGENB) Copolymer and Preparation of Polymer P1 Solution>>

BuNB (10.52 g, 0.07 mol), AGENB (5.41 g, 0.03 mol) and toluene (58.0 g) were mixed together in a serum bottle, and then the same was heated at 80° C. in an oil bath to obtain a mixture solution.

Next, a toluene solution (5 g) containing ($\eta^6$-toluene)Ni $(C_6F_5)_2$ (0.69 g, 0.0014 mol) was added to the mixture solution.

After addition of the toluene solution, the resulting mixture solution was maintained at room temperature for 4 hours to obtain a reaction solution. Thereafter, a toluene solution (87.0 g) was added to the reaction solution. When methanol was dropped into the reaction solution vigorously stirred, a copolymer was precipitated in the reaction solution.

The precipitated copolymer was collected by filtration and dried in an oven at 60° C. under a vacuum atmosphere. A weight of the copolymer after being dried was 12.74 g (yield: 80%).

A molecular weight of the obtained copolymer was determined using a GPC method (a gel permeation chromatography method) in a THF solvent (polystyrene standard) to be Mw=320,000 and Mn=130,000.

A composition of the copolymer was determined by $^1$H-NMR to be a BuNB/AGENB (78/22) copolymer.

A refractive index of this copolymer was measured by a prism coupling method and determined to be 1.5162 in TE mode and 1.5157 in TM mode at a wavelength of 633 nm.

The dried copolymer was dissolved in toluene to result in a 30 wt % polymer P1 solution.

<<Polymer P2: Synthesis of Hexyl Norbornene (HxNB)/Methyl Glycidyl Ether Norbornene (AGENB) Copolymer and Preparation of Polymer P2 Solution>>

HxNB (12.48 g, 0.07 mol), AGENB (5.41 g, 0.03 mol) and toluene (58.0 g) were mixed together in a serum bottle provided in a drybox, and then the same was stirred at 80° C. in an oil bath to obtain a mixture solution.

Next, a toluene solution (5 g) containing ($\eta^6$-toluene)Ni $(C_6F_5)_2$ (0.69 g, 0.0014 mol) was added to the mixture solution.

After addition of the toluene solution, the resulting mixture solution was maintained at room temperature for 4 hours to obtain a reaction solution. Thereafter, a toluene solution (87.0 g) was added to the reaction solution. When methanol was dropped into the reaction solution vigorously stirred, a copolymer was precipitated in the reaction solution.

The precipitated copolymer was collected by filtration and dried in an oven at 60° C. under a vacuum atmosphere. A weight of the copolymer after being dried was 13.78 g (yield: 77%).

A molecular weight of the obtained copolymer was determined using a GPC method in a THF solvent (polystyrene standard) to be Mw=150,000 and Mn=76,000.

A composition of the copolymer was determined by $^1$H-NMR to be a HxNB/AGENB (79/21) copolymer.

A refractive index of this copolymer was measured by a prism coupling method and determined to be 1.5159 in TE mode and 1.5153 in TM mode at a wavelength of 633 nm.

The dried copolymer was dissolved in toluene to result in a 30 wt % polymer P2 solution.

<<Polymer P3: Synthesis of Decyl Norbornene (DeNB)/Methyl Glycidyl Ether Norbornene (AGENB) Copolymer and Preparation of Polymer P3 Solution>>

DeNB (16.4 g, 0.07 mol), AGENB (5.41 g, 0.03 mol) and toluene (58.0 g) were mixed together in a serum bottle provided in a drybox, and then the same was stirred at 80° C. in an oil bath to obtain a mixture solution.

Next, a toluene solution (5 g) containing ($\eta^6$-toluene)Ni $(C_6F_5)_2$ (0.69 g, 0.0014 mol) was added to the mixture solution.

After addition of the toluene solution, the resulting mixture solution was maintained at room temperature for 4 hours to obtain a reaction solution. Thereafter, a toluene solution (87.0 g) was added to the reaction solution. Thereafter, when methanol was dropped into the reaction solution vigorously stirred, a copolymer was precipitated in the reaction solution.

The precipitated copolymer was collected by filtration and dried in an oven at 60° C. under a vacuum atmosphere. A weight of the copolymer after being dried was 17.00 g (yield: 87%).

A molecular weight of the obtained copolymer was determined using a GPC method in a THF solvent (polystyrene standard) to be Mw=45,000 and Mn=26,000.

A composition of the copolymer was determined by $^1$H-NMR to be a DeNB/AGENB (77/23) copolymer.

A refractive index of this copolymer was measured by a prism coupling method and determined to be 1.5153 in TE mode and 1.5151 in TM mode at a wavelength of 633 nm.

The dried copolymer was dissolved in toluene to result in a 30 wt % polymer P3 solution.

<<Polymer P4: Synthesis of Hexyl Norbornene (HxNB)/Diphenyl Methyl Norbornene Methoxy Silane (diPhNB) Copolymer and Preparation of Polymer P4 Solution>>

HxNB (8.94 g, 0.050 mol), diPhNB (16.1 g, 0.050 mol), 1-hexene (2.95 g, 0.035 mol) and toluene (142 g) were weighed, mixed together in a 250 mL serum bottle, and then heated at 80° C. in an oil bath to obtain a mixture solution.

Next, [Pd (PCy$_3$)$_2$(O$_2$CCH$_3$)(NCCH$_3$)]tetrakis(pentafluorophenyl)borate (hereinafter, simplified to as "Pd1446") (5.8×10$^{-3}$ g, 4.0×10$^{-6}$ mol) and N,N-dimethyl anilinium tetrakis(pentafluorophenyl)borate (hereinafter, simplified to as "DANFABA") (3.2×10$^{-3}$ g, 4.0×10$^{-6}$ mol) were added to the mixture solution.

In this regard, at this time, a ratio of the above monomers/Pd1446/DANFABA was 25,000/1/1.

Next, the mixture solution was maintained at 80° C. for 7 h to obtain a reaction solution, and then 20 mL of acetonitrile was added to the reaction solution to quench activity of the Pd catalyst. When methanol was dropped into the reaction solution, a copolymer was precipitated in the reaction solution.

The precipitated copolymer was collected by filtration and dried in an oven at 60° C. under a vacuum atmosphere. A weight of the copolymer after being dried was 19.8 g (yield: 79%).

A molecular weight of the obtained copolymer was determined using a GPC method in a THF solvent (polystyrene standard) to be Mw=86,000 and Mn=21,000.

A composition of the copolymer was determined by $^1$H-NMR to be a HxNB/diPhNB (46/54) copolymer.

A refractive index of this copolymer was measured by a prism coupling method and determined to be 1.5569 in TE mode and 1.5556 in TM mode at a wavelength of 633 nm.

The dried copolymer was dissolved in toluene to result in a 30 wt % polymer P4 solution.

<<Polymer P5: Synthesis of Butyl Norbornene (BuNB)/Phenyl Ethyl Norbornene (PENB) Copolymer and Preparation of Polymer P5 Solution>>

BuNB (4.78 g, 0.032 mol), PENB (25.22 g, 0.127 mol), 1-hexene (13.36 g, 0.16 mol) and toluene (170.0 g) were mixed together in a 500 mL serum bottle, and then heated at 80° C. in an oil bath to obtain a mixture solution.

Next, Pd1446 (0.0092 g, 6.36×10$^{-6}$ mol) and DANFABA (0.020 g, 2.54×10$^{-5}$ mol) each being in the form of a concentrated solution in dichloromethane were added to the mixture solution.

After addition of the concentrated solutions, the resulting mixture solution was maintained at 80° C. for 50 minutes to obtain a reaction solution. Thereafter, when methanol was dropped into the reaction solution vigorously stirred, a copolymer was precipitated in the reaction solution.

The precipitated copolymer was collected by filtration and dried in an oven at 60° C. under a vacuum atmosphere. A weight of the copolymer after being dried was 23.60 g (yield: 79%).

A molecular weight of the obtained copolymer was determined using a GPC method in a THF solvent (polystyrene standard) to be Mw=73,000 and Mn=28,000.

A composition of the copolymer was determined by $^1$H-NMR to be a BuNB/PENB (15/85) copolymer.

A refractive index of this copolymer was measured by a prism coupling method and determined to be 1.5684 in TE mode and 1.5657 in TM mode at a wavelength of 633 nm.

The dried copolymer was dissolved in toluene to result in a 30 wt % polymer P5 solution.

The respective copolymers synthesized in this way are summarized in the following Table 1.

TABLE 1

| Polymer | Composition ratio<br>Weight average molecular weight |
|---|---|
| P1 | BuNB/AGENB(78/22)<br>Mw = 320,000 |
| P2 | HxNB/AGENB(79/21)<br>Mw = 150,000 |
| P3 | DeNB/AGENB(77/23)<br>Mw = 45,000 |
| P4 | HxNB/diPhNB(46/54)<br>Mw = 86,000 |
| P5 | BuNB/PENB(15/85)<br>Mw = 73,000 |

HxNB: Hexyl norbornene
diPhNB: Diphenyl methyl norbornene methoxy silane
PENB: Phenyl ethyl norbornene
BuNB: Butyl norbornene
DeNB: Decyl norbornene
AGENB: Methyl glycidyl ether norbornene 2. Synthesis of Norbornene Monomer <<Bis(norbornene methyl)acetal (NM$_2$X)>>

Norbornene methanol (100 g, 0.81 mol), formaldehyde (~37%)(32.6 g, 0.40 mol) and p-toluenesulfonic acid (0.2 g) in a catalyst amount were supplied into a flask directly connected to a Dean Stark trap to obtain a mixture solution.

Thereafter, this mixture solution was heated at 100° C. When reaction progressed, an amount of water received in the trap was increased. Within about 3 hours, the reaction was completed, and then a pure product was collected using vacuum distillation (yield: 70 to 72.8%).

3. Preparation of Varnish

Each of varnishes V1 to V4 and V51 to V65 was prepared as follows.

<<Preparation of Varnish V1>>

HxNB (42.03 g, 0.24 mol) and SiX (7.97 g, 0.026 mol) were weighed and put into a glass vial to obtain a monomer solution.

Ciba IRGANOX 1076 produced by Ciba Specialty Chemicals Corporation (0.5 g) as a phenol-based anti-oxidizing agent and Ciba IRGAFOS 168 produced by Ciba Specialty Chemicals Corporation (0.125 g) as an organic phosphorus-based anti-oxidizing agent were added to the monomer solution to obtain a monomer-anti-oxidizing agent solution.

The monomer-anti-oxidizing agent solution (3.0 g), Pd(OAc)$_2$(PCy$_3$)$_2$ (4.93×10$^{-4}$ g, 6.28×10$^{-7}$ mol in 0.1 mL of methylene chloride) as a procatalyst, RHODORSIL PHOTOINITIATOR 2074 produced by Rhodia Inc. (2.55×10$^{-3}$ g, 2.51×10$^{-6}$ mol in 0.1 mL of methylene chloride) as a photo acid generator (a cocatalyst) were added to the above copolymer P4 solution (30.0 g) to obtain a varnish V1.

The varnish V1 was used after being filtered using a filter having a pore size of 0.2 μm.

Hereinafter, the following description will occasionally abbreviate "Ciba IRGANOX 1076 produced by Ciba Specialty Chemicals Corporation" as "IRGANOX 1076", "Ciba IRGAFOS 168 produced by Ciba Specialty Chemicals Corporation" as "IRGAFOS 168" and "RHODORSIL PHOTOINITIATOR 2074 produced by Rhodia Inc." as "RHODORSIL 2074", respectively.

<<Preparation of Varnish V2>>

HxNB (16.64 g, 0.093 mol) and SiX (33.36 g, 0.110 mol) were weighed and put into a glass vial to obtain a monomer solution.

IRGANOX 1076 (0.5 g) as a phenol-based anti-oxidizing agent and IRGAFOS 168 (0.125 g) as an organic phosphorus-based anti-oxidizing agent were added to the monomer solution to obtain a monomer-anti-oxidizing agent solution.

The monomer-anti-oxidizing agent solution (2.16 g), Pd(OAc)$_2$(PCy$_3$)$_2$ (1.47×10$^{-3}$ g, 1.88×10$^{-6}$ mol in 0.1 mL of methylene chloride) as a procatalyst, RHODORSIL 2074 ($7.67 \times 10^{-3}$ g, $7.54 \times 10^{-6}$ mol in 0.1 mL of methylene chloride) as a photo acid generator (a cocatalyst) were added to the above copolymer P5 solution (30.0 g) to obtain a varnish V2.

The varnish V2 was used after being filtered using a filter having a pore size of 0.2 μm.

<<Preparation of Varnish V3>>

Mesitylene (20 g), IRGANOX 1076 (0.05 g) as a phenol-based anti-oxidizing agent, IRGAFOS 168 (0.0125 g) as an organic phosphorus-based anti-oxidizing agent and RHODORSIL 2074 ($4.0 \times 10^{-3}$ g in 0.1 mL of methylene chloride) as a photo acid generator (a cleaving agent) were added to the above copolymer P4 (5 g) to obtain a varnish V3.

The varnish V3 was used after being filtered using a filter having a pore size of 0.2 μm.

<<Preparation of Varnish V4>>

2,2'-bis(trifluoromethyl)-4,4'-diamino biphenyl (6.4 g, 0.02 mol), 2,2-bis(3,4-dicarboxy phenyl)hexafluoropropane 2-anhydrate (4.44 g, 0.01 mol) and pyromellitic acid 2-anhydrate (2.18 g, 0.01 mol) were dissolved into dimethyl acetamide (86.6 g) to obtain a liquid solution. Thereafter, the liquid solution was stirred at room temperature for 2 days under a nitrogen atmosphere so that the above materials were reacted with each other to obtain a varnish V4 containing a polyimide resin precursor.

The varnish V4 was used after being filtered using a filter having a pore size of 0.2 μm.

<<Preparation of Varnish V51>>

TMSENB (0.45 g), IRGANOX 1076 (0.09 g) as a phenol-based anti-oxidizing agent, IRGAFOS 168 (0.023 g) as an organic phosphorus-based anti-oxidizing agent and TAG-372R produced by Toyo Ink Mfg. Co., Ltd. (0.05 g) as a photo acid generator were added to the above copolymer P2 solution (30.0 g), and then dissolved and mixed together by stirring the same for 2 hours using a magnetic stirrer to obtain a varnish V51.

The varnish V51 was used after being filtered using a filter having a pore size of 0.2 μm.

Hereinafter, the following description will occasionally abbreviate "TAG-372R produced by Toyo Ink Mfg. Co., Ltd." as "TAG-372R".

<<Preparation of Varnish V52>>

TESNB (0.9 g), IRGANOX 1076 (0.09 g) as a phenol-based anti-oxidizing agent, IRGAFOS 168 (0.023 g) as an organic phosphorus-based anti-oxidizing agent and RHODORSIL 2074 (0.09 g) as a photo acid generator were added to the above copolymer P2 solution (30.0 g), and then dissolved and mixed together by stirring the same for 2 hours using a magnetic stirrer to obtain a varnish V52.

The varnish V52 was used after being filtered using a filter having a pore size of 0.2 μm.

<<Preparation of Varnish V53>>

TMSNB (0.3 g), IRGANOX 1076 (0.09 g) as a phenol-based anti-oxidizing agent, IRGAFOS 168 (0.023 g) as an organic phosphorus-based anti-oxidizing agent and TAG-372R (0.36 g) as a photo acid generator were added to the above copolymer P2 solution (30.0 g), and then mixed together by stirring the same for 2 hours using a magnetic stirrer to obtain a varnish V53.

The varnish V53 was used after being filtered using a filter having a pore size of 0.2 μm.

<<Preparation of Varnish V54>>

3-glycidoxy propyl trimethoxy silane (GPTMS) (0.2 g), IRGANOX 1076 (0.09 g) as a phenol-based anti-oxidizing agent, IRGAFOS 168 (0.023 g) as an organic phosphorus-based anti-oxidizing agent and TAG-372R (0.02 g) as a photo acid generator were added to the above copolymer P2 solution (30.0 g), and then dissolved and mixed together by stirring the same for 2 hours using a magnetic stirrer to obtain a varnish V54.

The varnish V54 was used after being filtered using a filter having a pore size of 0.2 μm.

<<Preparation of Varnish V55>>

Epoxy silicone ("X-22-169AS", produced by Shin-Etsu Chemical Inc., a number average molecular weight of 1,000) (0.45 g), IRGANOX 1076 (0.09 g) as a phenol-based anti-oxidizing agent, IRGAFOS 168 (0.023 g) as an organic phosphorus-based anti-oxidizing agent and TAG-372R (0.18 g) as a photo acid generator were added to the above copolymer P2 solution (30.0 g), and then dissolved and mixed together by stirring the same for 2 hours using a magnetic stirrer to obtain a varnish V55.

The varnish V55 was used after being filtered using a filter having a pore size of 0.2 μm.

<<Preparation of Varnish V56>>

IRGANOX 1076 (0.05 g) as a phenol-based anti-oxidizing agent, IRGAFOS 168 ($1.25 \times 10^{-2}$ g) as an organic phosphorus-based anti-oxidizing agent and RHODORSIL 2074 (0.1 g) as a photo acid generator were added to the above copolymer P3 solution (16.7 g), and then dissolved and mixed together by stirring the same for 2 hours using a magnetic stirrer to obtain a varnish V56.

The varnish V56 was used after being filtered using a filter having a pore size of 0.2 μm.

<<Preparation of Varnish V57>>

IRGANOX 1076 (0.05 g) as a phenol-based anti-oxidizing agent, IRGAFOS 168 ($1.25 \times 10^{-2}$ g) as an organic phosphorus-based anti-oxidizing agent and TAG-372R (0.1 g) as a photo acid generator were added to the above copolymer P3 solution (16.7 g), and then dissolved and mixed together by stirring the same for 2 hours using a magnetic stirrer to obtain a varnish V57.

The varnish V57 was used after being filtered using a filter having a pore size of 0.2 μm.

<<Preparation of Varnish V58>>

IRGANOX 1076 (0.05 g) as a phenol-based anti-oxidizing agent and IRGAFOS 168 ($1.25 \times 10^{-2}$ g) as an organic phosphorus-based anti-oxidizing agent were added to the above copolymer P3 solution (16.7 g), and then dissolved and mixed together by stirring the same for 2 hours using a magnetic stirrer to obtain a varnish V58.

The varnish V58 was used after being filtered using a filter having a pore size of 0.2 μm.

<<Preparation of Varnish V59>>

2,2'-bis(trifluoromethyl)-4,4'-diamino biphenyl (5 g) and 2,2-bis(3,4-dicarboxy phenyl)hexafluoropropane (10 g) were dissolved into dimethyl acetamide (85 g) to obtain a varnish V59.

The varnish V59 was used after being filtered using a filter having a pore size of 0.2 μm.

<<Preparation of Varnish V60>>

TMSENB (0.32 g, 1.50 mmol) and SiX (0.16 g, 0.525 mmol) were weighed and put into a glass vial to obtain a monomer solution.

IRGANOX 1076 (0.5 g) as a phenol-based anti-oxidizing agent and IRGAFOS 168 (0.125 g) as an organic phosphorus-based anti-oxidizing agent were added to the monomer solution to obtain a monomer-anti-oxidizing agent solution.

The monomer-anti-oxidizing agent solution (a total amount) and [2-methallyl Pd(PCy$_3$)$_2$] tetrakis (pentafluorophenyl)borate (Pd1401) ($9.73 \times 10^{-4}$ g, $6.69 \times 10^{-7}$ mol in 0.1 mL of methylene chloride) as a procatalyst were added to the above copolymer P3 solution (6.7 g) to obtain a varnish V60.

The varnish V60 was used after being filtered using a filter having a pore size of 0.2 μm.

The varnish V60 was applied onto a glass substrate using a doctor blade so as to become a thickness of 70 μm, and then the glass substrate on which the varnish V60 had been applied was placed on a hot plate and heated at 50° C. for 15 minutes to form a film.

A glass transition temperature and a storage elastic modulus of this film were measured. A result of measurement of the glass transition temperature is shown in Table 3. Further, the storage elastic modulus at 200° C. based on a result of DMA measurement was 73 MPa.

In this regard, the measurement of the glass transition temperature (Tg) of the film was carried out using TMA ("TMA/SS120C", produced by Seiko Instruments Inc.) in pull mode (heating speed: 5° C./minute). Hereinafter, the measurements of the glass transition temperature were carried out using the same method.

Further, the measurement of the storage elastic modulus of the film was carried out using a dynamic-viscoelasticity measuring equipment ("EXSTAR6000", produced by Seiko Instruments Inc.). Hereinafter, the measurements of the storage elastic modulus were carried out using the same method.

<<Preparation of Varnish V61>>

HxNB (0.16 g, 0.897 mmol) and SiX (0.32 g, 1.05 mmol) were weighed and put into a glass vial to obtain a monomer solution.

IRGANOX 1076 (0.5 g) as a phenol-based anti-oxidizing agent and IRGAFOS 168 (0.125 g) as an organic phosphorus-based anti-oxidizing agent were added to the monomer solution to obtain a monomer-anti-oxidizing agent solution.

The monomer-anti-oxidizing agent solution (a total amount) and Pd1446 ($6.0 \times 10^{-4}$ g, $4.15 \times 10^{-7}$ mol in 0.1 mL of methylene chloride) as a procatalyst were added to the above copolymer P2 solution (6.7 g) to obtain a varnish V61.

The varnish V61 was used after being filtered using a filter having a pore size of 0.2 μm.

The varnish V61 was applied onto a glass substrate using a doctor blade so as to become a thickness of 70 μm, and then the glass substrate on which the varnish V61 had been applied was placed on a hot plate and heated at 80° C. for 20 minutes and at 150° C. for 1 hour, respectively, to form a film.

A glass transition temperature and a storage elastic modulus of this film were measured. A result of measurement of the glass transition temperature is shown in Table 3. Further, the storage elastic modulus at 200° C. based on a result of DMA measurement was 80 MPa.

<<Preparation of Varnish V62>>

SiX (4.8 g, 0.0158 mol) was weighed and put into a glass vial to obtain a monomer solution.

IRGANOX 1076 (5 g) as a phenol-based anti-oxidizing agent and IRGAFOS 168 (1.25 g) as an organic phosphorus-based anti-oxidizing agent were added to the monomer solution to obtain a monomer-anti-oxidizing agent solution.

The monomer-anti-oxidizing agent solution (a total amount) and [Pd(PCy$_3$)$_2$H(NCCH$_3$)]tetrakis(pentafluorophenyl)borate(Pd1147) ($3.62 \times 10^{-3}$ g, $3.15 \times 10^{-6}$ mol in 0.1 mL of methylene chloride) as a procatalyst were added to the above copolymer P1 solution (30.0 g) to obtain a varnish V62.

The varnish V62 was used after being filtered using a filter having a pore size of 0.2 μm.

The varnish V62 was applied onto a glass substrate using a doctor blade so as to become a thickness of 70 μm, and then the glass substrate on which the varnish V62 had been applied was placed on a hot plate and heated at 80° C. for 20 minutes and at 150° C. for 1 hour, respectively, to form a film.

A glass transition temperature and a storage elastic modulus of this film were measured. A result of measurement of the glass transition temperature is shown in Table 3. Further, the storage elastic modulus at 200° C. based on a result of DMA measurement was 67 MPa.

<<Preparation of Varnish V63>>

TESNB (1.0 g, 0.039 mol) was weighed and put into a glass vial to obtain a monomer solution.

IRGANOX 1076 (5 g) as a phenol-based anti-oxidizing agent and IRGAFOS 168 (1.25 g) as an organic phosphorus-based anti-oxidizing agent were added to the monomer solution to obtain a monomer-anti-oxidizing agent solution.

The monomer-anti-oxidizing agent solution (a total amount) and [Pd(P(iPr)$_3$)$_2$(OCOCH$_3$)(NCCH$_3$)]tetrakis(pentafluorophenyl)borate (Pd1206) ($4.07 \times 10^{-4}$ g, $3.90 \times 10^{-7}$ mol in 0.1 mL of methylene chloride) as a procatalyst were added to the above copolymer P2 solution (30.0 g) to obtain a varnish V63.

The varnish V63 was used after being filtered using a filter having a pore size of 0.2 μm.

The varnish V63 was applied onto a glass substrate using a doctor blade so as to become a thickness of 70 μm, and then the glass substrate on which the varnish V63 had been applied was placed on a hot plate and heated at 80° C. for 20 minutes and at 150° C. for 1 hour, respectively, to form a film.

A glass transition temperature and a storage elastic modulus of this film were measured. A result of measurement of the glass transition temperature is shown in Table 3. Further, the storage elastic modulus at 200° C. based on a result of DMA measurement was 70 MPa.

<<Preparation of Varnish V64>>

Si$_2$X (2.16 g, 4.67 mmol) was weighed and put into a glass vial to obtain a monomer solution.

IRGANOX 1076 (0.5 g) as a phenol-based anti-oxidizing agent and IRGAFOS 168 (0.125 g) as an organic phosphorus-based anti-oxidizing agent were added to the monomer solution to obtain a monomer-anti-oxidizing agent solution.

The monomer-anti-oxidizing agent solution (a total amount) and Pd1446 ($3.22 \times 10^{-3}$ g, $2.23 \times 10^{-6}$ mol in 0.1 mL of methylene chloride) as a procatalyst were added to the above copolymer P3 solution (30.0 g) to obtain a varnish V64.

The varnish V64 was used after being filtered using a filter having a pore size of 0.2 μm.

The varnish V64 was applied onto a glass substrate using a doctor blade so as to become a thickness of 70 μm, and then the glass substrate on which the varnish V64 had been applied was placed on a hot plate and heated at 80° C. for 20 minutes and at 150° C. for 1 hour, respectively, to form a film.

A glass transition temperature and a storage elastic modulus of this film were measured. A result of measurement of the glass transition temperature is shown in Table 3. Further, the storage elastic modulus at 200° C. based on a result of DMA measurement was 82 MPa.

<<Preparation of Varnish V65>>

Bis(norbornenemethyl)acetal (NM$_2$X) (3.00 g, 0.104 mol) was weighed and put into a glass vial to obtain a monomer solution.

IRGANOX 1076 (0.5 g) as a phenol-based anti-oxidizing agent and IRGAFOS 168 (0.125 g) as an organic phosphorus-based anti-oxidizing agent were added to the monomer solution to obtain a monomer-anti-oxidizing agent solution.

The monomer-anti-oxidizing agent solution (a total amount) and Pd1446 ($3.33 \times 10^{-3}$ g, $2.30 \times 10^{-6}$ mol in 0.1 mL of methylene chloride) as a procatalyst were added to the above copolymer P3 solution (30.0 g) to obtain a varnish V65.

The varnish V65 was used after being filtered using a filter having a pore size of 0.2 μm.

The varnish V65 was applied onto a glass substrate using a doctor blade so as to become a thickness of 70 μm, and then the glass substrate on which the varnish V65 had been applied was placed on a hot plate and heated at 80° C. for 20 minutes and at 150° C. for 1 hour, respectively, to form a film.

A glass transition temperature and a storage elastic modulus of this film were measured. A result of measurement of the glass transition temperature is shown in Table 3. Further, the storage elastic modulus at 200° C. based on a result of DMA measurement was 120 MPa.

A composition of each of the varnishes prepared in this way is summarized in the following Tables 2 and 3.

TABLE 2

| Varnish | Polymer (Wt.) | Cross-linker (Wt.) | photo acid generator (R or T[†]) (Wt.) | Glass transition temperature (° C.) |
|---|---|---|---|---|
| V51 | P1 (9 g) | TMSENB (0.45 g) | T (0.05 g) | Incapable measurement |
| V52 | P2 (9 g) | TESNB (0.9 g) | R (0.09 g) | Incapable measurement |
| V53 | P2 (9 g) | TMSNB (0.3 g) | T (0.36 g) | Incapable measurement |
| V54 | P2 (9 g) | γ-GPS (0.2 g) | T (0.02 g) | Incapable measurement |
| V55 | P2 (9 g) | Silicone epoxy resin (0.45 g) | T (0.18 g) | Incapable measurement |
| V56 | P3 (5 g) | No addition | R (0.1 g) | Incapable measurement |
| V57 | P3 (5 g) | No addition | T (0.1 g) | Incapable measurement |
| V58 | P3 (5 g) | No addition | No addition | 97 |

[†]R indicates that Rhodorsil 2074 was used, and T indicates that TAG-372R was used.
TMSENB: Norbornenyl ethyl trimethoxy silane
TESNB: Triethoxy silyl norbornene
TMSNB: Trimethoxy silyl norbornene
γ-GPS: 3-glycidoxy propyl trimethoxy silane

TABLE 3

| Varnish | Polymer (Wt.) | Monomer Mon 1 (mol %) | Monomer Mon 2 (mol %) | Wt. | Procatalyst Wt. (mol) | Glass transition temperature (° C.) | elastic modulus (MPa) |
|---|---|---|---|---|---|---|---|
| V60 | P3 (2 g) | TMSENB (74) | SiX (26) | 0.48 g | Pd1401 $9.37 \times 10^{-4}$ g ($6.69 \times 10^{-7}$ mol) | 180 | 73 |
| V61 | P2 (2 g) | HxNB (46) | SiX (54) | 0.48 g | Pd1446 $6.0 \times 10^{-4}$ g ($4.15 \times 10^{-7}$ mol) | 210 | 80 |
| V62 | P1 (9 g) | SiX (100) | No addition | 4.8 g | Pd1147 $3.62 \times 10^{-3}$ g ($3.15 \times 10^{-6}$ mol) | 250 | 67 |
| V63 | P2 (9 g) | TESNB (100) | No addition | 1.0 g | Pd1206 $4.70 \times 10^{-4}$ g ($3.90 \times 10^{-7}$ mol) | 204 | 70 |
| V64 | P3 (9 g) | Si$_2$X (100) | No addition | 2.16 g | Pd1446 $3.22 \times 10^{-3}$ g ($2.23 \times 10^{-6}$ mol) | 230 | 82 |
| V65 | P3 (9 g) | NM$_2$X (100) | No addition | 3.00 g | Pd1446 $3.33 \times 10^{-3}$ g ($2.30 \times 10^{-6}$ mol) | 260 | 120 |

HxNB: Hexyl norbornene
TMSENB: Norbornenyl ethyl trimethoxy silane
TESNB: Triethoxy silyl norbornene
SiX: Dimethyl bis(norbornene methoxy) silane
Si$_2$X: 1,1,3,3-tetramethyl-1,3-bis[2-(5-norbornene-2-yl)ethyl] disiloxane
NM$_2$X: Bis(norbornene methyl) acetal 4. Manufacture of Optical Waveguide Structure and Evaluation of the Same 4-1. Manufacture of Optical Waveguide Structure In each of the following Examples 1 to 14 and Comparative Example, 10 optical waveguide structures were manufactured. Each of the optical waveguide structures was manufactured as follows.

Example 1

First, the varnish V51 as a cladding layer forming material was applied onto a glass substrate having a thickness of 4 inches, and then spread so as to become an almost uniform thickness using a doctor blade.

Next, the glass substrate on which the varnish V51 had been applied was placed on a hot plate and heated at 50° C. for 15 minutes to form a film, and then an ultraviolet ray was irradiated onto the film using an extra-high pressure mercury lamp without a photo-mask (exposure dose: 3,000 mJ/cm$^2$, wavelength: 365 nm).

Thereafter, the film was cured at 100° C. for 15 minutes and at 160° C. for 1 hour, respectively, using a clean oven to form a lower cladding layer.

Next, the varnish V1 as a core layer forming material was applied onto a surface of the cured lower cladding layer, and then spread so as to become an almost uniform thickness using a doctor blade.

Next, the glass substrate on which the varnish V1 had been applied was placed on a hot plate and heated at 40° C. for 10 minutes so that a solvent contained in the varnish V1 was vapored to form a solid film substantially dried.

Thereafter, an ultraviolet ray was irradiated onto the solid film through a photo-mask (exposure dose: 3,000 mJ/cm$^2$, wavelength: 365 nm), and then the solid film was heated at 45° C. for 30 minutes using a hot plate. At this time, linear patterns which would become core portions appeared within the solid film.

Next, the solid film was further heated in a clean oven at 85° C. for 30 minutes and at 150° C. for 60 minutes, respectively, so that it was cured to thereby obtain a cured layer of the varnish V1 (a core layer) including linear core portions.

Next, an upper cladding layer was formed on the core layer using the varnish V51 as a cladding layer forming material in the same manner as in the lower cladding layer. In this way, an optical waveguide having a linear shape and a width of 0.5 cm and a length of 10 cm was obtained on the glass substrate.

In this regard, it is noted that in the obtained optical waveguide, an average thickness of the core layer was 50 μm (a width of each of the core portions was 50 μm), and an average thickness of each of the upper cladding layer and the lower cladding layer was 50 μm.

Next, the optical waveguide was peeled off from the glass substrate, and then copper layers (conductor layers) each having an average thickness of 45 μm were bonded to both surfaces of the optical waveguide using a roll laminating method to thereby obtain an optical waveguide structure.

Example 2

First, the varnish V52 as a cladding layer forming material was applied onto a silicon wafer substrate, and then spread so as to become an almost uniform thickness using a doctor blade.

Next, the silicon wafer substrate on which the varnish V52 had been applied was placed on a hot plate and heated at 50° C. for 15 minutes to form a film, and then an ultraviolet ray was irradiated onto the film using an extra-high pressure mercury lamp without a photo-mask (exposure dose: 1,500 mJ/cm$^2$, wavelength: 365 nm).

Thereafter, the film was heated at 150° C. for 1 hour using a clean oven to form a lower cladding layer.

Next, the varnish V4 containing the polyimide resin precursor as a core layer forming material was applied onto the lower cladding layer using a bar coater, and then heated at 320° C. for 1 hour using an oven under a nitrogen atmosphere to obtain a core layer.

Next, an aluminum layer having a thickness of 0.3 μm and serving as a mask layer was formed on the core layer by depositing aluminum thereonto. Then, a positive type photoresist (a diazonaphthoquinone-novorak resign based photoresist, "OFPR-800 (product name)", produced by Tokyo Ohka Kogyo Co., Ltd.) was applied onto the aluminum layer using a spin coating method to form a photo-resist layer, and then the photo-resist layer was prebaked at about 95° C.

Next, a photo-mask (made of Ti) for forming linear core portions was placed on the photo-resist layer, and then an ultraviolet ray was irradiated onto the photo-resist layer through the photo-mask using an extra-high pressure mercury lamp. Thereafter, the photo-resist layer was developed using a developing solution for the positive type resist (tetramethyl ammonium hydroxide aqueous solution (TMAH), "NMD-3 (product name)", produced by Tokyo Ohka Kogyo Co., Ltd.) to obtain a patterned photo-resist layer.

The patterned photo-resist layer was postbaked at 135° C. Next, the aluminum layer was processed by a wet etching method so as to have a pattern corresponding to that of the patterned photo-resist layer.

Next, the core layer was patterned by a dry etching method using the patterned aluminum layer as a mask.

Next, the patterned aluminum layer was removed from the patterned core layer to thereby obtain linear core portions.

In this regard, it is to be noted that each of the core portions had a width of 50 μm and a height (an average thickness) of 50 μm.

Next, the varnish V52 as a cladding layer forming material was applied from an upper side of the obtained core portions and an upper cladding layer was formed in the same manner as in the lower cladding layer. In this way, an optical waveguide having a linear shape and a width of 0.5 cm and a length of 10 cm was obtained on the silicon wafer substrate.

In this regard, it is to be noted that in the obtained optical waveguide, an average thickness of each of the upper cladding layer and the lower cladding layer was 50 μm.

Next, the optical waveguide was peeled off from the silicon wafer substrate, and then copper layers (conductor layers) each having an average thickness of 45 μm were bonded to both surfaces of the optical waveguide using a roll laminating method to thereby obtain an optical waveguide structure.

Example 3

First, the varnish V53 as a cladding layer forming material was applied onto a glass substrate subjected to a release treatment, and then spread so as to become an almost uniform thickness using a doctor blade.

Next, the glass substrate on which the varnish V53 had been applied was placed on a hot plate and heated at 50° C. for 15 minutes to form a film, and then an ultraviolet ray was irradiated onto the film using an extra-high pressure mercury lamp without a photo-mask (exposure dose: 2,500 mJ/cm$^2$, wavelength: 365 nm).

Thereafter, the film was heated at 150° C. for 1 hour using a clean oven to form a lower cladding layer.

Next, UV curing type epoxy resin ("E3135", produced by NTT-AT) having a refractive index higher than that of the cladding layer forming material was applied onto the lower cladding layer using a spin coating method, and then it was subjected to a photolithography using a photo-mask to thereby directly form core portions each having a linear pattern thereon.

In this regard, it is to be noted that each of the core portions had a width of 35 μm and a height (an average thickness) of 35 μm.

Thereafter, an upper cladding layer was formed using the varnish V53, which was the same varnish as used for forming the lower cladding layer, as a cladding layer forming material in the same manner as in the lower cladding layer. In this way, an optical waveguide having a linear shape and a width of 0.5 cm and a length of 10 cm was obtained on the glass substrate.

In this regard, it is to be noted that in the obtained optical waveguide, an average thickness of each of the upper cladding layer and the lower cladding layer was 35 μm.

Next, the optical waveguide was peeled off from the glass substrate, and then copper layers (conductor layers) each having an average thickness of 45 μm were bonded to both surfaces of the optical waveguide using a roll laminating method to thereby obtain an optical waveguide structure.

Example 4

First, the varnish V54 as a cladding layer forming material was applied onto a roughened surface of a copper foil having an average thickness of 18 μm, and then spread so as to become an almost uniform thickness using a doctor blade.

Next, the copper foil on which the varnish V54 had been applied was placed on a hot plate and heated at 50° C. for 15 minutes so that the varnish V54 was dried to form a film. Thereafter, an ultraviolet ray was irradiated onto the film using an extra-high pressure mercury lamp without a photo-mask (exposure dose: 3,000 mJ/cm$^2$, wavelength: 365 nm) to obtain a lower cladding layer with the copper foil. Further, an upper cladding layer with a copper foil was prepared using the same material and method as the lower cladding layer with the copper foil.

On the other hand, the filtered varnish V2 as a core layer forming material was applied onto a quartz glass substrate, and then was spread so as to become an almost uniform thickness using a doctor blade.

Next, the quartz glass substrate on which the varnish V2 had been applied was placed on a hot plate and heated at 45° C. for 10 minutes so that a solvent contained in the varnish V2 was vapored to form a solid film substantially dried.

Thereafter, an ultraviolet ray was irradiated onto the solid film through a photo-mask (exposure dose: 3,000 mJ/cm$^2$, wavelength: 365 nm), and then the solid film was heated at 45° C. for 30 minutes using a hot plate. At this time, linear patterns which would become core portions appeared within the solid film.

Next, the solid film was further heated in a clean oven at 85° C. for 30 minutes and at 150° C. for 60 minutes, respectively, so that it was cured to thereby obtain a cured layer of the varnish V2 (a film) including linear core portions.

The film was peeled off from the quartz glass substrate in water, washed using water in a sufficient amount, and then dried in an oven at 45° C. for 1 hour to thereby obtain a single core layer.

This core layer was placed between the lower cladding layer and the upper cladding layer to obtain a laminated body, and then the laminated body was heated at 150° C. for 1 hour while compressing it at a pressure of 10 MPa using an electrothermal pressing machine to thereby obtain an optical waveguide structure including an optical waveguide having a linear shape and a width of 0.5 cm and a length of 10 cm and copper layers (conductor layers) provided on both surfaces of the optical waveguide.

In this regard, it is to be noted that in the obtained optical waveguide, an average thickness of the core layer was 35 μm (a width of each of the core portions was 35 μm), and an average thickness of each of the upper cladding layer and the lower cladding layer was 35 μm.

Example 5

First, the varnish V55 as a cladding layer forming material was applied onto a PET film subjected to a release treatment, and then spread so as to become an almost uniform thickness using a doctor blade.

Next, the PET film on which the varnish V55 had been applied was placed on a hot plate and heated at 50° C. for 15 minutes so that the varnish V55 was dried to form a film. Thereafter, an ultraviolet ray was irradiated onto the film using an extra-high pressure mercury lamp without a photo-mask (exposure dose: 2,000 mJ/cm$^2$, wavelength: 365 nm). Then, the film was peeled off from the PET film to thereby obtain a single lower cladding layer. Further, a single upper cladding layer was prepared using the same material and method as the lower cladding layer.

On the other hand, the filtered varnish V3 as a core layer forming material was applied onto a quartz glass substrate, and then spread so as to become an almost uniform thickness using a doctor blade.

Next, the quartz glass substrate on which the varnish V3 had been applied was placed on a hot plate and heated at 45° C. for 10 minutes so that a solvent contained in the varnish V3 was vapored to form a solid film substantially dried.

Thereafter, an ultraviolet ray was irradiated onto the solid film through a photo-mask (exposure dose: 3,000 mJ/cm$^2$, wavelength: 365 nm), and then the solid film was heated at 80° C. for 30 minutes in a clean oven. At this time, linear patterns which would become core portions appeared within the solid film.

Next, the solid film was further heated at 160° C. for 2 hours so that it was cured to thereby obtain a cured layer of the varnish V3 (a film) including linear core portions.

The film was peeled off from the quartz glass substrate in water, washed using water in a sufficient amount, and then dried in an oven at 45° C. for 1 hour to thereby obtain a single core layer.

This core layer was placed between the lower cladding layer and the upper cladding layer to obtain a laminated body, and then the laminated body was heated at 150° C. for 1 hour while compressing it at a pressure of 6 MPa using an electrothermal pressing machine to thereby obtain an optical waveguide having a linear shape and a width of 0.5 cm and a length of 10 cm.

In this regard, it is to be noted that in the obtained optical waveguide, an average thickness of the core layer was 50 μm (a width of each of the core portions was 50 μm), and an average thickness of each of the upper cladding layer and the lower cladding layer was 50 μm.

Next, copper layers (conductor layers) each having an average thickness of 45 μm were bonded to both surfaces of the optical waveguide using a roll laminating method to thereby obtain an optical waveguide structure.

Example 6

An optical waveguide structure was manufactured in the same manner as in the Example 5 except that the varnish V56 was used as the cladding layer forming material.

Example 7

An optical waveguide structure was manufactured in the same manner as in the Example 1 except that the varnish V57 was used as the cladding layer forming material, and the varnish V2 was used as the core layer forming material.

Example 8

First, the varnish V58 as a cladding layer forming material was applied onto a PET film subjected to a release treatment, and then spread so as to become an almost uniform thickness using a doctor blade.

Next, the PET film on which the varnish V58 had been applied was placed on a hot plate and heated at 50° C. for 15 minutes so that the varnish V58 was dried to form a film. Thereafter, the film was peeled off from the PET film to thereby obtain a single lower cladding layer. Further, a single upper cladding layer was prepared using the same material and method as the lower cladding layer.

On the other hand, the filtered varnish V3 as a core layer forming material was applied onto a quartz glass substrate, and then spread so as to become an almost uniform thickness using a doctor blade.

Next, the quartz glass substrate on which the varnish V3 had been applied was placed on a hot plate and heated at 45° C. for 10 minutes so that a solvent contained in the varnish V3 was vapored to form a solid film substantially dried.

Thereafter, an ultraviolet ray was irradiated onto the solid film through a photo-mask (exposure dose: 3,000 mJ/cm$^2$, wavelength: 365 nm), and then the solid film was heated at 85° C. for 30 minutes in a clean oven. At this time, linear patterns which would become core portions appeared within the solid film.

Next, the solid film was further heated at 160° C. for 2 hours so that it was cured to thereby obtain a cured layer of the varnish V3 (a film) including linear core portions.

The film was peeled off from the quartz glass substrate in water, washed using water in a sufficient amount, and then dried in an oven at 45° C. for 1 hour to thereby obtain a single core layer.

This core layer was placed between the lower cladding layer and the upper cladding layer to obtain a laminated body, and then the laminated body was heated at 150° C. for 1 hour while compressing it at a pressure of 3 MPa using an electro-thermal pressing machine to thereby obtain an optical waveguide having a linear shape and a width of 0.5 cm and a length of 10 cm.

In this regard, it is to be noted that in the obtained optical waveguide, an average thickness of the core layer was 50 μm (a width of each of the core portions was 50 μm), and an average thickness of each of the upper cladding layer and the lower cladding layer was 50 μm.

Next, copper layers (conductor layers) each having an average thickness of 45 μm were bonded to both surfaces of the optical waveguide using a roll laminating method to thereby obtain an optical waveguide structure.

Example 9

An optical waveguide structure was manufactured in the same manner as in the Example 4 except that the varnish V60 was used as the cladding layer forming material.

Example 10

An optical waveguide structure was manufactured in the same manner as in the Example 4 except that the varnish V61 was used as the cladding layer forming material.

Example 11

First, the varnish V62 as a cladding layer forming material was applied onto a glass substrate having a thickness of 4 inches, and then spread so as to become an almost uniform thickness using a doctor blade.

Next, the glass substrate on which the varnish V62 applied had been applied was placed on a hot plate and heated at 50° C. for 15 minutes, and then the varnish V62 was cured at 80° C. for 20 minutes and at 150° C. for 1 hour, respectively, to form a lower cladding layer.

Next, the varnish V3 as a core layer forming material was applied onto a surface of the cured lower cladding layer, and then spread so as to become an almost uniform thickness using a doctor blade.

Thereafter, the glass substrate on which the varnish V3 had been applied was heated at 45° C. for 10 minutes using a hot plate to form a solid film substantially dried.

Next, an ultraviolet ray was irradiated onto the solid film formed of the varnish V3 through a photo-mask (exposure dose: 3,000 mJ/cm$^2$, wavelength: 365 nm), and then the solid film was aged at room temperature for 30 minutes and heated at 85° C. for 30 minutes and at 150° C. for 60 minutes, respectively, to obtain a core layer.

In this regard, just when the solid film had been heated at 85° C. for 30 minutes, linear patterns which would become core portions could be identified through a visual observation.

Next, the varnish V61 as a cladding layer forming material was applied onto a surface of the core layer (a cured layer of the varnish V3), and then spread so as to become an almost uniform thickness using a spin coater.

Next, the glass substrate on which the varnish V61 had been applied was placed on a hot plate and heated at 50° C. for 15 minutes, and then the varnish V61 was cured at 80° C. for 20 minutes and at 150° C. for 1 hour, respectively, to form an upper cladding layer. In this way, an optical waveguide having a linear shape and a width of 0.5 cm and a length of 10 cm was obtained on the glass substrate.

In this regard, it is to be noted that in the obtained optical waveguide, an average thickness of the core layer was 35 μm (a width of each of the core portions was 35 μm), and an average thickness of each of the upper cladding layer and the lower cladding layer was 35 μm.

Next, the optical waveguide was peeled off from the glass substrate, and then copper layers (conductor layers) each having an average thickness of 45 μm were bonded to both surfaces of the optical waveguide using a roll laminating method to thereby obtain an optical waveguide structure.

Example 12

An optical waveguide structure was manufactured in the same manner as in the Example 11 except that the varnish V63 was used as the cladding layer forming material.

Example 13

An optical waveguide structure was manufactured in the same manner as in the Example 11 except that the varnish V64 was used as the cladding layer forming material, the varnish V1 was used as the core layer forming material, and when the core layer was formed, the solid film was heated at 45° C. for 30 minutes after the ultraviolet ray had been irradiated thereonto and before the solid film would be heated at 80° C. for 30 minutes.

Example 14

An optical waveguide structure was manufactured in the same manner as in the Example 4 except that the varnish V65 was used as the cladding layer forming material.

Comparative Example

First, the varnish V59 as a cladding layer forming material was applied onto a silicon wafer so as to become an almost uniform thickness using a spin coater, and then heated at 350° C. for 1 hour in a nitrogen oven to form a lower cladding layer.

Next, the varnish V1 as a core layer forming material was applied onto a surface of the lower cladding layer, and then spread so as to become an almost uniform thickness using a doctor blade.

Next, the silicon wafer on which the varnish V1 had been applied was placed on a hot plate and heated at 45° C. for 10 minutes so that a solvent contained in the varnish V1 was vapored to form a solid film substantially dried.

Thereafter, an ultraviolet ray was irradiated onto the solid film through a photo-mask (exposure dose: 3,000 mJ/cm$^2$, wavelength: 365 nm), and then the solid film was heated at 45° C. for 30 minutes on a hot plate. At this time, linear patterns which would become core portions appeared within the solid film.

Next, the solid film was further heated at 85° C. for 30 minutes and at 150° C. for 60 minutes, respectively, in a clean oven so that it was cured to thereby obtain a cured layer of the varnish V1 (a core layer) including linear core portions.

Next, an upper cladding layer was formed using the same varnish as used for forming the lower cladding layer as a cladding layer forming material in the same manner as in the lower cladding layer. In this way, an optical waveguide having a linear shape and a width of 0.5 cm and a length of 10 cm was obtained on the glass substrate.

In this regard, it is to be noted that in the obtained optical waveguide, an average thickness of the core layer was 50 μm (a width of each of the core portions was 50 μm), and an average thickness of each of the upper cladding layer and the lower cladding layer was 50 μm.

Next, the optical waveguide was peeled off from the glass substrate, and then copper layers (conductor layers) each having an average thickness of 45 μm were bonded to both surfaces of the optical waveguide using a roll laminating method to thereby obtain an optical waveguide structure.

4-2. Evaluation 4-2-1. Measurement of Light Transmission Loss

Light transmission loss was measured using a "cut back method" for each of the optical waveguide structures manufactured in the Examples 1 to 14 and the Comparative Example.

In this cut back method, light generated from a laser diode was input into one end of each of the core portions of the optical waveguide through an optical fiber, and then power of the light output from the other end thereof was measured. At this time, each of the core portions was cut to a predetermined length and the power of the light output was measured for each of the core portions.

Total light loss for each of the core portions is represented by the following formula.

Total Light Loss (dB)=−10 log($Pn/Po$)

wherein Pn is the measured power of the light output from the other end of each of the core portions having lengths $P_1$, $P_2$, ... $P_n$, and Po is the measured power of the light of the laser diode output from an end of the optical fiber before it is coupled to the one end of each of the core portions.

Figure 14:
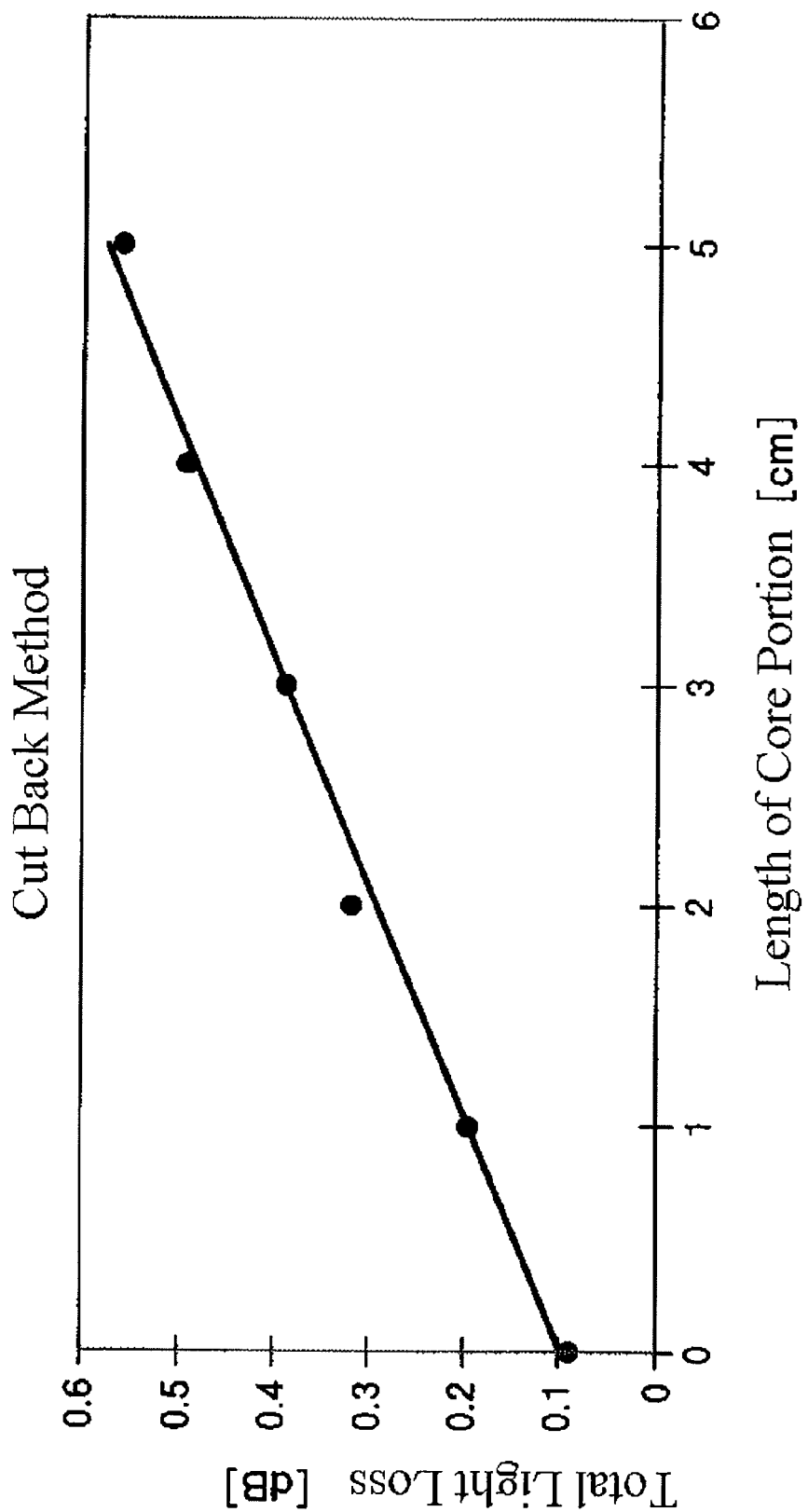
FIG. 14 is a chart showing a change of total light loss according to a change of a length of a core portion.

The total light loss is then plotted as exemplified in FIG. 14 (Chart 1). A regression line of this data is represented by the following formula.

$y=mx+b$ wherein "m" is the light transmission loss and b is coupling loss.

In this regard, it is to be noted that a light having a wavelength of 1,300 nm was used for the measurement of the light transmission loss of the optical waveguide structure manufactured in the Example 2. On the other hand, a light having a wavelength of 850 nm was used for the measurement of the light transmission loss of the optical waveguide structures manufactured in the Examples other than Example 2 and the Comparative Example.

4-2-2. Adhesion Test

Adhesion between the core layer and the cladding layer was checked for each of the optical waveguide structures manufactured in the Examples 1 to 14 and the Comparative Example.

This test was carried out by a peel test in which the cladding layer was peeled off from the core layer in a 90° upper direction thereto.

Results of The measurement of the light transmission loss and the adhesion test are shown in the following table 4, respectively.

TABLE 4

| | Varnish | | Measurement of light | |
| | Core layer | Cladding layer | transmission loss (dB/cm) | Adhesion test (gf/cm) |
| --- | --- | --- | --- | --- |
| Ex. 1 | V1 | V51 | 0.05 | 900 |
| Ex. 2 | V4 | V52 | 0.30* | 750 |
| Ex. 3 | Epoxy | V53 | 0.12 | 1100 |
| Ex. 4 | V2 | V54 | 0.10 | 800 |
| Ex. 5 | V3 | V55 | 0.09 | 830 |
| Ex. 6 | V3 | V56 | 0.09 | 680 |
| Ex. 7 | V2 | V57 | 0.08 | 650 |
| Ex. 8 | V3 | V58 | 0.15 | 720 |
| Ex. 9 | V2 | V60 | 0.09 | 860 |
| Ex. 10 | V2 | V61 | 0.10 | 750 |
| Ex. 11 | V3 | V62 | 0.08 | 710 |
| Ex. 12 | V3 | V63 | 0.10 | 690 |
| Ex. 13 | V1 | V64 | 0.09 | 650 |
| Ex. 14 | V2 | V65 | 0.08 | 780 |
| Comp. Ex. | V1 | V59 | 0.63 | 3 |

In the measurement of light transmission loss, the value to which the symbol * was given was measured using a light having a wavelength of 1,300 nm, and the other values were measured using a light having a wave length of 850 nm.

Each of values shown in Table 4 is an average of values measured for 5 optical waveguide structures.

As can be seen from Table 4, each of the optical waveguide structures manufactured in the Examples 1 to 14 has little light transmission loss, that is, high light transmission ability, and excellent adhesion between the core layer and the cladding layer.

On the other hand, each of the optical waveguide structures manufactured in the Comparative Example has high light transmission loss and low adhesion between the core layer and the cladding layer. This means that each of the optical waveguide structures has inferior property. It may be conceived that increase of the light transmission loss is attributable to occurrence of peeling of a part of the boundary surface between the core layer and the cladding layer due to the low adhesion therebetween.

Further, after the optical waveguide structures manufactured in the Examples 1 to 14 and the Comparative Example were placed under a high humidity environment (60° C., 90% RH and 2,000 hours), the light transmission loss thereof was measured in the same manner as described above. As a result, in each of the optical waveguide structures manufactured in the Examples 1 to 14, measured values of the light transmission loss thereof before and after being placed under the high humidity environment were hardly changed. On the other hand, in each of the optical waveguide structures manufactured in the Comparative Example, a measured value of the light transmission loss thereof after being placed under the high humidity environment was remarkably increased as compared with that before being placed under the high humidity environment.

Furthermore, the conductor layers of each of the optical waveguide structures manufactured in the Examples 1 to 14 and the Comparative Example (before being placed under the high humidity environment) were patterned to form wirings, and then a light emitting element and a light receiving element were mounted on predetermined portions of the wirings to thereby manufacture hybrid devices.

Thereafter, these obtained hybrid devices were actuated. As a result, it was confirmed that all the hybrid devices obtained using the optical waveguide structures manufactured in the Examples 1 to 14 could be rapidly actuated as compared with the hybrid device obtained using the optical waveguide structure manufactured in the Comparative Example.

INDUSTRIAL APPLICABILITY

In the optical waveguide of the present invention, the cladding layer is formed of the norbornene-based polymer as the major component thereof. Therefore, even if the optical waveguide is subjected to a heat treatment such as a solder treatment when it is mounted onto a circuit board, it is possible to prevent softening of the cladding layer. Further, even if the optical waveguide is placed under a high humidity environment, dimensional change of the cladding layer due to water absorption thereof is hard to occur. Therefore, regardless of an environment in which the optical waveguide is used, it can stably perform light transmission. In addition, a material cost for the cladding layer can be reduced.

Further, in the case where the norbornene-based polymer is composed of the molecules each including the norbornene repeating units, each of the norbornene repeating units having the substituent group including the polymerizable group, it is possible to cross-link the polymerizable groups of at least a part of the molecules of the norbornene-based polymer directly or via compounds of a cross-linking agent within the cladding layer. In addition, the molecules of the norbornene-based polymer and molecules of the polymer to be used for forming the core layer can be cross-linked depending on kinds of the polymerizable group, kinds of the cross-linking agent, kinds of the polymer to be used for forming the core layer or the like. As a result, it is possible to improve strength of the cladding layer itself and to improve adhesion between the cladding layer and the core layer.

Especially, in the case where the norbornene-based polymer is composed of molecules each including epoxy groups as the polymerizable groups, it is possible to further improve the above effects.

Further, the optical waveguide structure of the present invention in which the conductor layer is formed on a side of at least one of surfaces of the optical waveguide can be electrically connected to electronic components using the conductor layer. This makes it possible to easily obtain a circuit board in which the electronic components and the optical waveguide coexist. Thus, the optical waveguide and the optical waveguide structure of the present invention have industrial applicability.

What is claimed is:

1. An optical waveguide, comprising:
   a core layer including core portions each having a refractive index, and cladding portions each provided adjacent to the core portions and having a refractive index lower than that of each of the core portions, the core layer containing a norbornene-based polymer, the core layer having two surfaces; and
   a cladding layer provided so as to make contact with at least one of the two surfaces of the core layer and having a refractive index lower than that of each of the core portions, the cladding layer formed of a material obtained by cross-linking epoxy groups of at least a part of molecules of a norbornene-based polymer directly or via compounds of a cross-linking agent as a major component thereof,
   wherein each of the molecules of the norbornene-based polymer of the cladding layer is represented by the following formula 1:

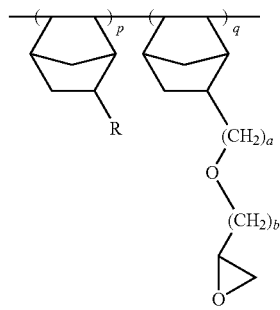

[formula 1]

where R is an alkyl group having a carbon number of 1 to 10, "a" is an integer of 0 to 3, "b" is an integer of 1 to 3, "p" is an integer of 1 or more, "q" is an integer of 1 or more and "p"/"q" is 20 or less.

2. The optical waveguide as claimed in claim 1, wherein the cross-linking agent is norbornenyl ethyl trimethoxy silane, triethoxy silyl norbornene, trimethoxy silyl norbornene, 3-glycidoxy propyl trimethoxy silane or a silicone epoxy resin.

3. The optical waveguide as claimed in claim 1, wherein an average thickness of the cladding layer is 0.1 to 1.5 times an average thickness of the core layer.

4. The optical waveguide as claimed in claim 1, wherein the core layer is formed through the steps:
   forming a layer containing the norbornene-based polymer, a monomer having compatibility with the norbornene-based polymer and a refractive index different from that of the norbornene-based polymer, a first substance that is activated by being irradiated with actinic radiation and a second substance that is activated by heating and can react molecules of the monomer due to activation thereof, wherein activation temperature of the second substance is changed under action of the activated first substance;
   irradiating selectively the actinic radiation onto the layer, so that the first substance is activated within irradiated regions of the layer onto which the actinic radiation is irradiated, to thereby change the activation temperature of the second substance under the action of the activated first substance within the irradiated regions; and
   subjecting the layer to a heat treatment at such a temperature that any one having a low activation temperature between the second substance and the second substance whose activation temperature is changed is activated, so that the molecules of the monomer are reacted within either the irradiated regions or non-irradiated regions onto which the actinic radiation is not irradiated, to thereby cause a refractive index difference therebetween due to reaction of the molecules of the monomer, whereby one of the irradiated regions and the non-irradiated regions becomes the core portions and the other regions become the cladding portions.

5. The optical waveguide as claimed in claim 4, wherein when the reaction of the molecules of the monomer progresses within one of the irradiated regions and the non-irradiated regions, the molecules of the monomer which are contained in the other regions and have not been reacted are diffused to the one regions.

6. The optical waveguide as claimed in claim 4, wherein the first substance contains compounds that produce cations and weakly coordinating anions by being irradiated with the actinic radiation, and the activation temperature of the second substance is changed under action of the weakly coordinating anions produced.

7. The optical waveguide as claimed in claim 4, wherein the activation temperature of the second substance is lowered under the action of the activated first substance, and the second substance is activated by heating at a temperature higher than that of the heat treatment without irradiating the activated actinic radiation.

8. The optical waveguide as claimed in claim 7, wherein the second substance contains compounds each represented by the following formula (Ia):

wherein $E(R)_3$ is a Group 15 neutral electron donor ligand, E is an element selected from the group comprising elements of Group 15 of the Periodic Table, R is one of a hydrogen atom, an isotope thereof and a hydrocarbyl group-containing moiety, and Q is an anionic ligand selected from the group comprising carboxylate, thiocarboxylate and dithiocarboxylate.

9. The optical waveguide as claimed in claim 7, wherein the second substance contains compounds each represented by the following formula (Ib):

wherein $E(R).sub.3$ is a Group 15 neutral electron donor ligand, E is an element selected from the group comprising elements of Group 15 of the Periodic Table, R is one of a hydrogen atom, an isotope thereof and a hydrocarbyl group-containing moiety, Q is an anionic ligand selected from the group comprising carboxylate, thiocarboxylate and dithiocarboxylate, LB is a Lewis base, WCA is a weakly coordinating anion, "a" is an integer of 1 to 3, "b" is an integer of 0 to 2, a total number of "a" and "b" is 1 to 3, and "p" and "r" are integers for maintaining balance between an electronic charge of a palladium cation and an electronic charge of the weakly coordinating anion.

10. The optical waveguide as claimed in claim 9, wherein each of "p" and "r" is independently selected from an integer of 1 or 2.

11. The optical waveguide as claimed in claim 4, wherein the core layer is obtained by subjecting the layer to a heat treatment at a second temperature higher than that of the heat treatment after the heat treatment is carried out.

12. The optical waveguide as claimed in claim 11, wherein the core layer is obtained by subjecting the layer to a heat treatment at a third temperature higher than the second temperature after the heat treatment is carried out at the second temperature.

13. The optical waveguide as claimed in claim 12, wherein a difference between the second temperature and the third temperature is 20° C. or higher.

14. The optical waveguide as claimed in claim 4, wherein the monomer contains a cross-linkable monomer.

15. The optical waveguide as claimed in claim 4, wherein the monomer contains a norbornene-based monomer as a major component thereof.

16. The optical waveguide as claimed in claim 14, wherein the monomer contains a norbornene-based monomer as a major component thereof, and further contains dimethyl bis(norbornene methoxy)silane as the cross-linkable monomer.

17. The optical waveguide as claimed in claim 4, wherein the norbornene-based polymer is composed of molecules each including a main chain and cleavable groups each branching from the main chain and having a chemical structure in which at least a part of the chemical structure can be cleaved and removed from the main chain under the action of the activated first substance, and wherein when the actinic radiation is selectively irradiated onto the irradiated regions of the layer, the cleavable groups of the molecules of the norbornene-based polymer are cleaved therewithin.

18. The optical waveguide as claimed in claim 17, wherein the first substance contains compounds that produce cations and weakly coordinating anions by being irradiated with the actinic radiation, and wherein the cleavable groups are acid cleavable groups that can be cleaved under action of the cations.

19. The optical waveguide as claimed in claim 18, wherein each of the acid cleavable groups includes at least one of a chemical structure of —O—, a chemical structure of —Si-aryl and a chemical structure of —O—Si—.

20. The optical waveguide as claimed in claim 17, wherein the refractive index of the norbornene-based polymer is lowered due to cleavage of the cleavable groups of the molecules thereof.

21. The optical waveguide as claimed in claim 20, wherein each of the cleavable groups includes at least one of a chemical structure of —Si-diphenyl and a chemical structure of —O—Si-diphenyl.

22. The optical waveguide as claimed in claim 4, wherein the actinic radiation has a peak wavelength in the range of 200 to 450 nm.

23. The optical waveguide as claimed in claim 4, wherein an exposure dose of the actinic radiation is in the range of 0.1 to 9 $J/cm^2$.

24. The optical waveguide as claimed in claim 4, wherein the actinic radiation is irradiated onto the layer through a mask.

25. The optical waveguide as claimed in claim 4, wherein the layer further contains an anti-oxidizing agent.

26. The optical waveguide as claimed in claim 4, wherein the layer further contains a sensitizing agent.

27. The optical waveguide as claimed in claim 4, wherein the core layer is formed of the norbornene-based polymer as a major component thereof.

28. The optical waveguide as claimed in claim 27, wherein the norbornene-based polymer is an addition-type norbornene-based polymer.

29. The optical waveguide as claimed in claim 1, wherein the core layer is formed through the following steps:

forming a layer containing a substance that is activated by being irradiated with actinic radiation and the norborene-based polymer, wherein the norbornene-based polymer is composed of molecules each including a main chain and cleavable groups each branching from the main chain and having a chemical structure in which at least a part of the chemical structure can be cleaved and removed from the main chain under action of the activated substance; and irradiating selectively the actinic radiation onto the layer, so that the substance is activated within irradiated regions of the layer onto which the actinic radiation is irradiated and the cleavable groups of the molecules of the norbornene-based polymer are cleaved under the action of the activated substance therewithin, to thereby cause a refractive index difference between the irradiated regions and non-irradiated regions onto which the actinic radiation is not irradiated due to cleavage of the cleavable groups of the molecules of the norbornene-based polymer, whereby one of the irradiated regions and the non-irradiated regions becomes the core portions and the other regions become the cladding portions.

30. The optical waveguide as claimed in claim 29, wherein the core layer is obtained by subjecting the layer to a heat treatment after the actinic radiation is irradiated thereonto.

31. The optical waveguide as claimed in claim 29, wherein the substance contains compounds that produce cations and weakly coordinating anions by being irradiated with the actinic radiation, and wherein the cleavable groups are acid cleavable groups that can be cleaved under action of the cations.

32. The optical waveguide as claimed in claim 31, wherein each of the acid cleavable groups includes at least one of a chemical structure of —O—, a chemical structure of —Si-aryl and a chemical structure of —O—Si—.

33. The optical waveguide as claimed in claim 29, wherein the refractive index of the norbornene-based polymer is lowered due to cleavage of the cleavable groups of the molecules thereof.

34. The optical waveguide as claimed in claim 33, wherein each of the cleavable groups includes at least one of a chemical structure of —Si-diphenyl and a chemical structure of —O—Si-diphenyl.

35. The optical waveguide as claimed in claim 29, wherein the actinic radiation has a peak wavelength in the range of 200 to 450 nm.

36. The optical waveguide as claimed in claim 29, wherein an exposure dose of the actinic radiation is in the range of 0.1 to 9 J/cm$^2$.

37. The optical waveguide as claimed in claim 29, wherein the actinic radiation is irradiated onto the layer through a mask.

38. The optical waveguide as claimed in claim 29, wherein the layer further contains an anti-oxidizing agent.

39. The optical waveguide as claimed in claim 29, wherein the layer further contains a sensitizing agent.

40. The optical waveguide as claimed in claim 29, wherein the core layer is formed of the norbornene-based polymer as a major component thereof.

41. The optical waveguide as claimed in claim 40, wherein the norbornene-based polymer is an addition-type norbornene-based polymer.

42. The optical waveguide as claimed in claim 1, wherein each of the core portions is formed of a first norbornene-based material having a refractive index as a major component thereof, and each of the cladding portions is formed of a second norbornene-based material having a refractive index lower than that of the first norbornene-based material as a major component thereof.

43. The optical waveguide as claimed in claim 42, wherein each of the first and second norbornene-based materials contain the norbornene-based polymer and a reaction product of molecules of a norbornene-based monomer having a refractive index different from that of the norbornene-based polymer, and wherein the refractive indexes of the first and second norbornene-based materials are different from each other due to a difference between amounts of the reaction products of the molecules of the norbornene-based monomer contained therein.

44. The optical waveguide as claimed in claim 43, wherein the reaction product contains at least one kind selected from the group comprising polymeric molecules each polymerizing the molecules of the norbornene-based monomer, cross-linking chemical structures each cross-linking molecules of the norbornene-based polymer, and branching chemical structures each branching from the molecules of the norbornene-based polymer.

45. The optical waveguide as claimed in claim 43, wherein the norbornene-based polymer is composed of molecules each including aralkyl norbornene repeating units.

46. The optical waveguide as claimed in claim 43, wherein the norbornene-based polymer is composed of molecules each including benzyl norbornene repeating units.

47. The optical waveguide as claimed in claim 43, wherein the norbornene-based polymer is composed of molecules each including phenyl ethyl norbornene repeating units.

48. The optical waveguide as claimed in claim 43, wherein the norbornene-based polymer is composed of molecules each including a main chain and cleavable groups each branching from the main chain and having a chemical structure in which at least a part of the chemical structure can be cleaved and removed from the main chain, and wherein the refractive indexes of the first and second norbornene-based materials are different from each other due to a difference between the numbers of the cleavable groups, that have not been cleaved, in the molecules of the norbornene-based polymers contained therein and a difference between the amounts of the reaction products of the molecules of the norbornene-based monomers contained therein.

49. The optical waveguide as claimed in claim 48, wherein the norbornene-based polymer is composed of molecules each including diphenyl methyl norbornene repeating units.

50. The optical waveguide as claimed in claim 43, wherein the norbornene-based polymer is composed of molecules each including alkyl norbornene repeating units.

51. The optical waveguide as claimed in claim 43, wherein the norbornene-based polymer is composed of molecules each including hexyl norbornene repeating units.

52. The optical waveguide as claimed in claim 43, wherein the norbornene-based polymer is an addition-type norbornene-based polymer.

53. The optical waveguide as claimed in claim 42, wherein the core layer is formed of the norbornene-based polymer as a major component thereof, and the norbornene-based polymer is composed of molecules each including a main chain and cleavable groups each branching from the main chain and having a chemical structure in which at least a part of the chemical structure can be cleaved and removed from the main chain, and wherein the refractive indexes of the first and second norbornene-based materials are different from each other due to a difference between the numbers of the cleavable groups, that have not been cleaved, in the molecules of the norbornene-based polymers contained therein.

54. The optical waveguide as claimed in claim 53, wherein the norbornene-based polymer is composed of molecules each including diphenyl methyl norbornene repeating units.

55. The optical waveguide as claimed in claim 53, wherein the norbornene-based polymer is composed of molecules each including alkyl norbornene repeating units.

56. The optical waveguide as claimed in claim 53, wherein the norbornene-based polymer is composed of molecules each including hexyl norbornene repeating units.

57. The optical waveguide as claimed in claim 53, wherein the norbornene-based polymer is an addition-type norbornene-based polymer.

58. An optical waveguide structure, comprising: the optical waveguide defined by claim 1 and having two surfaces; and a conductor layer provided on a side of at least one of the two surfaces of the optical waveguide.

59. The optical waveguide structure as claimed in claim 58, wherein a ratio of an average thickness of the conductor layer with respect to an average thickness of the optical waveguide is in the range of 10 to 90%.

60. The optical waveguide structure as claimed in claim 58, wherein the conductor layer is formed using at least one method selected from the group comprising a dry plating method, a wet plating method and a method of bonding a conductive sheet member to the at least one of the two surfaces.

* * * * *